(12) United States Patent
Tsalik et al.

(10) Patent No.: US 12,473,597 B2
(45) Date of Patent: Nov. 18, 2025

(54) METHODS AND SYSTEMS FOR PROCESSING A NUCLEIC ACID SAMPLE

(71) Applicant: Duke University, Durham, NC (US)

(72) Inventors: Ephraim L. Tsalik, Cary, NC (US); Ricardo Henao Giraldo, Durham, NC (US); Thomas W. Burke, Durham, NC (US); Geoffrey S. Ginsburg, Durham, NC (US); Christopher W. Woods, Durham, NC (US); Micah T. McClain, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 18/324,445

(22) Filed: May 26, 2023

(65) Prior Publication Data

US 2024/0401107 A1 Dec. 5, 2024

Related U.S. Application Data

(63) Continuation of application No. 15/738,339, filed as application No. PCT/US2016/040437 on Jun. 30, 2016, now abandoned.

(Continued)

(51) Int. Cl.
*C12Q 1/6883* (2018.01)
*A61K 31/00* (2006.01)
*A61K 39/00* (2006.01)
*C12Q 1/6806* (2018.01)
*C12Q 1/6844* (2018.01)
(Continued)

(52) U.S. Cl.
CPC .......... *C12Q 1/6883* (2013.01); *A61K 31/00* (2013.01); *A61K 39/00* (2013.01); *C12Q 1/6806* (2013.01); *C12Q 1/6846* (2013.01); *C12Q 1/689* (2013.01); *C12Q 1/70* (2013.01); *G01N 21/6428* (2013.01); *G01N 21/6486* (2013.01); *C12Q 2600/106* (2013.01); *C12Q 2600/118* (2013.01);
(Continued)

(58) Field of Classification Search
CPC . C12Q 1/6806; C12Q 1/6846; G01N 21/6486
USPC ...................................................... 435/6.12
See application file for complete search history.

(56) References Cited

U.S. PATENT DOCUMENTS 8,476,200 B2 7/2013 Russwurm et al.
8,821,876 B2 9/2014 Ginsburg et al.
(Continued)

FOREIGN PATENT DOCUMENTS

EP 3316875 A1 5/2018
JP 2007522819 A 8/2007
(Continued)

OTHER PUBLICATIONS

Gliddon, Harriet D., et al. "Genome-wide host RNA signatures of infectious diseases: discovery and clinical translation." Immunology 153.2 (2018): 171-178. (Year: 2018).*

(Continued)

*Primary Examiner* — Jill A Warden
*Assistant Examiner* — Jacqueline Brazin
(74) *Attorney, Agent, or Firm* — Myers Bigel, P.A.

(57) ABSTRACT

The present disclosure provides methods and systems for processing a nucleic acid sample. The present disclosure also provides methods and systems for detecting (e.g., optically detecting) a pathogen in a sample. The methods provided herein may use nucleic acid amplification.

32 Claims, 11 Drawing Sheets

Related U.S. Application Data

(60) Provisional application No. 62/257,406, filed on Nov. 19, 2015, provisional application No. 62/187,683, filed on Jul. 1, 2015.

(51) Int. Cl.
*C12Q 1/689* (2018.01)
*C12Q 1/70* (2006.01)
*G01N 21/64* (2006.01)

(52) U.S. Cl.
CPC ............. *C12Q 2600/158* (2013.01); *G01N 2021/6439* (2013.01)

(56) References Cited

U.S. PATENT DOCUMENTS

| | | | |
|---|---|---|---|
| 9,791,446 B2 | 10/2017 | Eden et al. | |
| 2005/0209785 A1 | 9/2005 | Wells et al. | |
| 2008/0171323 A1 | 7/2008 | Banchereau et al. | |
| 2009/0311269 A1* | 12/2009 | Allen | A61K 31/7088 435/6.14 |
| 2011/0076685 A1* | 3/2011 | Moeller | C12Q 1/6883 435/6.16 |
| 2011/0312521 A1 | 12/2011 | Chaussabel | |
| 2011/0318726 A1 | 12/2011 | Shah et al. | |
| 2014/0141986 A1* | 5/2014 | Spetzler | G01N 33/50 435/7.1 |
| 2014/0234854 A1* | 8/2014 | Blume | G16B 20/00 435/7.1 |
| 2014/0323391 A1 | 10/2014 | Tsalik et al. | |
| 2015/0227681 A1 | 8/2015 | Courchesne et al. | |
| 2016/0304953 A1* | 10/2016 | Chen | C12Q 1/6874 |
| 2017/0218455 A1* | 8/2017 | Steelman | C12Q 1/6886 |

FOREIGN PATENT DOCUMENTS

| | | |
|---|---|---|
| JP | 7002037 B2 | 2/2022 |
| WO | 2014067943 A1 | 5/2014 |
| WO | 2015048098 A1 | 4/2015 |

OTHER PUBLICATIONS

Labatut, Vincent, and Hocine Cherifi. "Accuracy measures for the comparison of classifiers." arXiv preprint arXiv:1207.3790 (2012). (Year: 2012).*
Tang, Collin HH, et al. "Non-invasive classification of severe sepsis and systemic inflammatory response syndrome using a nonlinear support vector machine: a preliminary study." Physiological measurement 31.6 (2010): 775. (Year: 2010).*
Canadian Office Action corresponding to CA 2,989,199; mailed Aug. 8, 2023 (5 pages).
Japanese Decision of Rejection corresponding to JP 2021-135662; issued Apr. 21, 2023 (9 pages, including English translation).
Bustin, S.A., "Quantification of mRNA using real-time reverse transcription PCR (RT-PCR): trends and problems", Journal of molecular endocrinology, 29, 2002, 23-39.
Colvin, Joshua M., et al., "Detection of Viruses in Young Children With Fever Without an Apparent Source", Pediatrics 130(6): e1455-e1462 (2012).
Goerke, Christiane, et al., "Quantification of Bacterial Transcripts during Infection Using Competitive Reverse Transcription-PCR (RT-PCR) and LightCycler RT-PCR", Clinical and Diagnostic Laboratory Immunology, 2001, 279-282.
Greijer, Astrid E., et al., "Multiplex real-time NASBA for monitoring expression dynamics of human cytomegalovirus encoded IE1 and pp67 RNA", Journal of Clinical Virology, 24(1-2), 2002, 57-66.
Rao, Sakshi, et al., "Recent trends in molecular techniques for food pathogen detection", Chemical Analysis of Food, Techniques and Applications, 2020, 177-285 (abstract only).
Australian Examination Report corresponding to AU 2016288208; dated Oct. 27, 2020 (6 pages).
Australian Examination Report corresponding to AU 2016288208; dated Sep. 29, 2021 (4 pages).
Canadian Office Action corresponding to CA 2,989,199; mailed Sep. 21, 2022 (7 pages).
Chinese Office Action corresponding to CN 201680038489.9; dated Oct. 19, 2020 (12 pages, including English translation.
Chinese Office Action corresponding to CN 201680038489.9; mailed Mar. 31, 2020 (20 pages including English translation).
Chinese Rejection Decision corresponding to 201680038489.9; issued Mar. 2, 2022 (15 pages, including English translation).
European Search Report corresponding to European Patent Application No. 16818801.9, dated Nov. 22, 2018, 12 pages.
Extended European Search Report corresponding to EP 21207860.4; dated Feb. 25, 2022 (11 pages).
International Search Report and Written Opinion, PCTUS2016/040437, mailed Oct. 4, 2016.
Japanese Office Action corresponding to JP 2017-568212; dated Jul. 17, 2020 (11 pages, including English translation).
Japanese Office Action corresponding to JP 2017-568212; dated Apr. 23, 2021 (20 pages, including English translation).
Japanese Office Action corresponding to JP 2021-135662; dated Aug. 9, 2022 (8 pages, including English translation).
Hu, Xinran, et al., "Gene expression profiles in febrile children with defined viral and bacterial infection", PNAS, 110 (31), 2013, 12792-12797.
Parnell, Grant P., et al., "A distinct influenza infection signature in the blood transcriptome of patients with severe community-acquired pneumonia", Critical Care, Biomed Central Ltd., 16(4); 1-27 (2012).
Ramilo, Octavio, et al., "Gene expression patterns in blood leukocytes discriminate patients with acute infections", Blood, 109 (5): 2066-2077; including Supplemental Data: Table S2: Influenza A versus bacterial infection; class comparison results (22 pages), 2007.
Ramilo, Octavio, et al., "Gene expression patterns in blood leukocytes discriminate patients with acute infections", Blood, American Society of Hematology, US, 109(5), Mar. 2007, 2066-2077.
Stone, Judy, "Under The Weather? A Drop Of Blood Can Tell If Antibiotics Are Needed", Retrieved from Forbes: http://onforb.es/1ZBQ9MM, Jan. 20, 2016; 5 pp.
Tsalik, Ephraim L., et al., "Host gene expression classifiers diagnose acute respiratory illness etiology", Science Translational Medicine, 8(322): 322ra11, Jan. 20, 2016, 10 pp.
Tsalik, Ephraim L., et al., "Supplementary Materials for "Host gene expression classifiers diagnose acute respiratory illness etiology"", Science Translational Medicine, 8(322): 322ra11/DC1, Jan. 20, 2016, 24 pp.
Zaas, Aimee K., et al., "A host-based RT-PCR gene expression signature to identify acute respiratory viral infection", Science Translational Medicine, 5(203), Sep. 18, 2013, 1-10.
Zaas, Aimee K., et al., "Gene expression signatures diagnose influenza and other symptomatic respiratory viral infections in humans", Cell Host & Microbe, Elsevier, NL, 6(3), 2009, 207-217.
Zaas, Aimee K., et al., "Supplementary Materials for "Gene Expression Signatures Diagnose Influenza and Other Symptomatic Respiratory Viral Infections in Humans"", Cell Host & Microbe, Elsevier, NL, 6(3), 2009, 207-217.
Zaas, Aimee K., et al., "The current epidemiology and clinical decisions surrounding acute respiratory infections", Trends in Molecular Medicine, 20(10), 2014, 579-588.
European Office Action corresponding to EP Application No. 21207860.4; dated Nov. 3, 2023 (4 pages).
Madan, Ichchha, et al., "The peripheral whole-blood transcriptome of acute pyelonephritis in human pregnancy", J Perinat. Med. 42(1): 31-53, 2014.
Subramanian, T., et al., "Interaction of CtBP with adenovirus E1A suppresses immortalization of primary epithelial cells and enhances virus replication during productive infection", Virology. 443(2): 313-320, 2013.
Australian Examination Report corresponding to Australian Application No. 2016288208 (2 pages) (dated Jun. 2, 2021).
Australian Examination Report corresponding to Australian Application No. 2021254546 (2 pages) (dated Jun. 26, 2023).

(56) References Cited

OTHER PUBLICATIONS

Australian Examination Report corresponding to Australian Application No. 2021254546 (3 pages) (dated Dec. 6, 2022).
Chinese Office Action corresponding to Chinese Application No. 201680038489.9 (9 pages, including English translation) (dated Oct. 11, 2021).
European Office Action corresponding to European Application No. 16818801.9 (4 pages) (dated Apr. 30, 2020).
European Office Action corresponding to European Application No. 21207860.4 (4 pages) (dated Mar. 15, 2023).
Canadian Office Action corresponding to CA 2989199; dated Nov. 18, 2024 (3 pages).
Notification of Reexamination corresponding to CN 201680038489.9; dated Jan. 25, 2025 (17 pages, including English translation).
Japanese Office Action corresponding to JP 2023-134150; dated Jul. 9, 2024 (5 pages, including English translation).
Reexamination Decision corresponding to CN Application No. 201680038489.9 dated Apr. 11, 2025 (30 pages, including English translation).
Extended European Search Report corresponding to EP 25154480.5; dated Jul. 9, 2025 (14 pages).
Notice of Reasons for Refusal corresponding to JP 2021135662; dated Aug. 26, 2025 (19 pages, including English machine translation).
Tolle, et al., "Identification of microRNAs in blood and urine as tumour markers for the detection of urinary bladder cancer", Oncology Reports, 30(4): 1949-1956, 2013.
Zubakov, et al., "Stable RNA markers for identification of blood and saliva stains revealed from whole genome expression analysis of time-wise degraded samples", International Journal of Legal Medicine, 122(2): 135-142, 2008.

* cited by examiner

METHODS AND SYSTEMS FOR PROCESSING A NUCLEIC ACID SAMPLE

RELATED APPLICATIONS

This application is a continuation of U.S. applicant Ser. No. 15/738,339, filed Dec. 20, 2017, which is a National Phase Entry Application of PCT/US2016/040437, filed Jun. 30, 2016, which claims the benefit of U.S. Provisional Patent Application Ser. No. 62/187,683, filed Jul. 1, 2015, and United States Provisional patent Application Ser. No. 62/257,406, filed Nov. 19, 2015, the disclosure of each of which is incorporated by reference herein in its entirety.

FEDERAL FUNDING LEGEND

This invention was made with Government Support under Federal Grant Nos. U01AI066569, $\beta_{20}$RR016480 and HHSN266200400064C awarded by the National Institutes of Health (NIH) and Federal Grant Nos. N66001-07-C-2024 and N66001-09-C-2082 awarded by the Defense Advanced Research Projects Agency (DARPA). The U.S. Government has certain rights to this invention.

BACKGROUND

Acute respiratory infection is common in acute care environments and results in significant mortality, morbidity, and economic losses worldwide. Respiratory tract infections, or acute respiratory infections (ARI) caused 3.2 million deaths around the world and 164 million disability-adjusted life years lost in 2011, more than any other cause (World Health Organization., 2013a, 2013b). In 2012, the fourth leading cause of death worldwide was lower respiratory tract infections, and in low and middle income countries, where less supportive care is available, lower respiratory tract infections are the leading cause of death (WHO factsheet, accessed Aug. 22, 2014). These illnesses are also problematic in developed countries. In the United States in 2010, the Centers for Disease Control (CDC) determined that pneumonia and influenza alone caused 15.1 deaths for every 100,000 people in the US population. The aged and children under the age of 5 years are particularly vulnerable to poor outcomes due to ARIs. For example, in 2010, pneumonia accounted for 18.3% of all deaths, or almost 1.4 million deaths, worldwide in children aged 5 years or younger.

Pneumonia and other lower respiratory tract infections can be due to many different pathogens that are primarily viral, bacterial, or less frequently fungal. Among viral pathogens, influenza is among the most notorious based on numbers of affected individuals, variable severity from season to season, and the ever-present worry about new strains causing much higher morbidity and mortality (e.g., Avian flu). However, among viral pathogens, influenza is only one of many that cause significant human disease. Respiratory Syncytial Virus (RSV) is the leading cause of hospitalization of children in developed countries during the winter months. Worldwide, about 33 million new cases of RSV infections were reported in 2005 in children under 5, with 3.4 million severe enough for hospitalization. It is estimated that this viral infection alone kills between 66,000 and 199,000 children each year. And, in the United States alone, about 10,000 deaths annually are associated with RSV infections in the over-65 population. In addition to known viral pathogens, history has shown that new and emerging infections can manifest at any time, spreading globally within days or weeks. Recent examples include SARS-coronavirus, which had a 10% mortality rate when it appeared in 2003-2004. More recently, Middle East respiratory syndrome (MERS) coronavirus continues to simmer in the Middle East and has been associated with a 30% mortality rate. Both of these infections present with respiratory symptoms and may at first be indistinguishable from any other ARI.

Although viral infections cause the majority of ARI, bacterial etiologies are also prominent especially in the context of lower respiratory tract infections. Specific causes of bacterial ARI vary geographically and by clinical context but include *Streptococcus pneumoniae, Staphylococcus aureus, Haemophilus influenzae, Chlamydia pneumoniae, Mycoplasma pneumoniae, Klebsiella pneumoniae, Escherichia coli*, and *Pseudomonas aeruginosa*. The identification of these pathogens relies on their growth in culture, which typically requires days and has limited sensitivity for detection of the infectious agent. Obtaining an adequate sample to test is problematic: In a study of 1669 patients with community-acquired pneumonia, only 14% of patients could provide a "good-quality" sputum sample that resulted in a positive culture (Garcia-Vazquez et al., 2004). Clinicians are aware of the limitations of these tests, which drives uncertainty and, consequently, antibacterial therapies are frequently prescribed without any confirmation of a bacterial infection.

The ability to rapidly diagnose the etiology of ARIs is an urgent global problem with far-reaching consequences at multiple levels: optimizing treatment for individual patients; epidemiological surveillance to identify and track outbreaks; and guiding appropriate use of antimicrobials to stem the rising tide of antimicrobial resistance. It has been well established that early and appropriate antimicrobial therapy improves outcomes in patients with severe infection. This in part drives the over-utilization of antimicrobial therapies. Up to 73% of ambulatory care patients with acute respiratory illness are prescribed an antibiotic, accounting for approximately 40% of all antibiotics prescribed to adults in this setting. It has, however, been estimated that only a small fraction of these patients require anti-bacterial treatment (Cantrell et al. 2003, *Clin. Ther*. Jan; 24(1):170-82). A similar trend is observed in emergency departments. Even if the presence of a viral pathogen has been microbiologically confirmed, it does not preclude the possibility of a concurrent bacterial infection. As a result, antibacterials are often prescribed "just in case." This spiraling empiricism contributes to the rising tide of antimicrobial resistance (Gould, 2009; Kim & Gallis, 1989), which is itself associated with higher mortality, length of hospitalization, and costs of health care (Cosgrove 2006, *Clin. Infect. Dis*., Jan 15; 42 Suppl 2:S82-9). In addition, the inappropriate use of antibiotics may lead to drug-related adverse effects and other complications, e.g., *Clostridium difficile*-associated diarrhea (Zaas et al., 2014).

Acute respiratory infections are frequently characterized by non-specific symptoms (such as fever or cough) that are common to many different illnesses, including illnesses that are not caused by an infection. Existing diagnostics for ARI fall short in a number of ways. Conventional microbiological testing is limited by poor sensitivity and specificity, slow turn-around times, or by the complexity of the test (Zaas et al. 2014, *Trends Mol Med* 20(10):579-88). One limitation of current tests that detect specific viral pathogens, for example the multiplex PCR-based assays, is the inability to detect emergent or pandemic viral strains. Influenza pandemics arise when new viruses circulate against which populations have no natural resistance. Influenza pandemics are frequently devastating. For example, in 1918-1919 the Spanish flu affected about 20% to 40% of the world's population and killed about 50 million people; in 1957-1958, Asian flu killed about 2 million people; in 1968-1969 the Hong Kong flu killed about 1 million people; and in 2009-2010, the Centers for Disease Control estimates that approximately 43 million to 89 million people contracted swine flu resulting in 8,870 to 18,300 related deaths. The emergence of these new strains challenges existing diagnostics which are not designed to detect them. This was particularly evident during the 2009 influenza pandemic where confirmation of infection required days and only occurred at specialized testing centers such as state health departments or the CDC (Kumar & Henrickson 2012, *Clin Microbiol Rev* 25(2):344-61). The Ebola virus disease outbreak in West Africa poses similar challenges at the present time. Moreover, there is every expectation we will continue to face this issue as future outbreaks of infectious diseases are inevitable.

A further limitation of diagnostics that use the paradigm of testing for specific viruses or bacteria is that even though a pathogenic microbe may be detected, this is not proof that the patient's symptoms are due to the detected pathogen. A microorganism may be present as part of the individual's normal flora, known as colonization, or it may be detected due to contamination of the tested sample (e.g., a nasal swab or wash). Although recently-approved multiplex PCR assays, including those that detect viruses and bacteria, offer high sensitivity, these tests do not differentiate between asymptomatic carriage of a virus and true infection. For example, there is a high rate of asymptomatic viral shedding in ARI, particularly in children (Jansen et al. 2011, *J Clin Microbiol* 49(7):2631-2636). Similarly, even though one pathogen is detected, illness may be due to a second pathogen for which there was no test available or performed.

Reports have described host gene expression profiles differentiating viral ARI from healthy controls (Huang et al. 2011 *PLoS Genetics* 7(8): e1002234; Mejias et al., 2013; Thach et al. 2005 *Genes and Immunity* 6:588-595; Woods et al., 2013; A. K. Zaas et al., 2013; A. K. Zaas et al., 2009). However, few among these differentiate viral from bacterial ARI, which is a more clinically meaningful distinction than is detection of viral infection versus healthy or bacterial infection versus healthy (Hu, Yu, Crosby, & Storch, 2013; Parnell et al., 2012; Ramilo et al., 2007).

Current diagnostics methods are thus limited in their ability to differentiate between a bacterial and viral infection, and symptoms arising from non-infectious causes, or to identify co-infections with bacteria and virus.

SUMMARY

The present disclosure provides methods or systems for processing a sample that overcomes many of the limitations of current methods for processing a sample for pathogen detection.

In an aspect, the present disclosure provides a method of processing a blood sample of a subject, comprising: (a) providing the blood sample of the subject having or suspected of having a viral or bacterial infection, wherein the blood sample comprises a plurality of messenger ribonucleic (mRNA) molecules; (b) subjecting the plurality of mRNA molecules to reverse transcription to generate a plurality of complementary deoxyribonucleic acid (cDNA) molecules; and (c) optically detecting the plurality of cDNA molecules or derivative thereof.

In some embodiments, the method further comprises, prior to (b), separating the plurality of mRNA molecules from the blood sample.

In some embodiments, the method further comprises, prior to (c), subjecting the plurality of cDNA molecules to nucleic acid amplification.

In some embodiments, the nucleic acid amplification comprises polymerase chain reaction (PCR) or isothermal amplification.

In some embodiments, the PCR comprises subjecting the plurality of cDNA molecules to thermocycling.

In some embodiments, the isothermal amplification comprises subjecting the plurality of cDNA molecules to heating at a constant temperature.

In some embodiments, the plurality of mRNA molecules comprises at least five different mRNA molecules.

In some embodiments, the optically detecting in (c) comprises detecting an optical signal from a probe coupled to a cDNA molecule of the plurality of cDNA molecule or a derivative thereof.

In some embodiments, the optical signal is a fluorescent signal.

In some embodiments, (c) comprises detecting an optical signal from a cDNA molecule of the plurality of cDNA molecules, or a derivative thereof, in a sequencing reaction.

In another aspect, the present disclosure provides a system, comprising: one or more computer processors programmed to execute machine executable code that implements a method comprising: (a) providing a blood sample of a subject having or suspected of having a viral or bacterial infection, wherein the blood sample comprises a plurality of messenger ribonucleic (mRNA) molecules; (b) subjecting the plurality of mRNA molecules to reverse transcription to generate a plurality of complementary deoxyribonucleic acid (cDNA) molecules; and (c) optically detecting the plurality of cDNA molecules or derivative thereof.

The present disclosure provides, in part, a molecular diagnostic test that overcomes many of the limitations of current methods for the determination of the etiology of respiratory symptoms. The test detects the host's response to an infectious agent or agents by measuring and analyzing the patterns of co-expressed genes, or signatures. These gene expression signatures may be measured in a blood sample in a human or animal presenting with symptoms that are consistent with an acute respiratory infection or in a human or animal that is at risk of developing (e.g., presymptomatic) an acute respiratory infection (e.g., during an epidemic or local disease outbreak). Measurement of the host response as taught herein differentiates between bacterial ARI, viral ARI, and a non-infectious cause of illness, and may also detect ARI resulting from co-infection with bacteria and virus.

This multi-component test performs with unprecedented accuracy and clinical applicability, allowing health care providers to use the response of the host (the subject or patient) to reliably determine the nature of the infectious agent, to the level of pathogen class, or to exclude an infectious cause of symptoms in an individual patient presenting with symptoms that, by themselves, are not specific. In some embodiments, the results are agnostic to the species of respiratory virus or bacteria (i.e., while differentiating between virus or bacteria, it does not differentiate between particular genus or species of virus or bacteria). This offers an advantage over current tests that include probes or reagents directed to specific pathogens and thus are limited to detecting only those specific pathogens.

One aspect of the present disclosure provides a method for determining whether acute respiratory symptoms in a subject are bacterial in origin, viral in origin, or non-infectious in origin comprising, consisting of, or consisting essentially of: (a) obtaining a biological sample from the subject; (b) determining the gene expression profile of the subject from the biological sample by evaluating the expression levels of pre-defined sets of genes, termed signatures; (c) normalizing gene expression levels for the technology (i.e., platform) used to make said measurement to generate a normalized value; (d) entering the normalized values into a bacterial classifier, a viral classifier and/or a non-infectious illness classifier that have pre-defined weighting values (coefficients) for each of the genes in each signature; (e) comparing the output of the classifiers to pre-defined thresholds, cut-off values, or ranges of values that indicate likelihood of infection; and (f) using the output to determine whether the patient providing the sample has an infection of bacterial origin, viral origin, or has a non-infectious illness, or some combination of these conditions.

Another aspect of the present disclosure provides a method for determining whether an acute respiratory infection (ARI) in a subject is bacterial in origin, viral in origin, or non-infectious in origin comprising, consisting of, or consisting essentially of: (a) obtaining a biological sample from the subject; (b) determining the gene expression profile of the subject from the biological sample by evaluating the expression levels of pre-defined sets of genes; (c) normalizing gene expression levels for the technology (i.e., platform) used to make said measurement to generate a normalized value; (d) entering the normalized value into classifiers that have pre-defined weighting values for each of the genes in each signature; e) comparing the output of the classifiers to pre-defined thresholds, cut-off values, or ranges of values that indicate likelihood of infection; (f) if the sample is negative for bacteria, repeating step (d) using only the viral classifier and non-infectious classifier, and (g) classifying the sample as being of viral etiology or noninfectious illness.

Another aspect of the present disclosure provides a method for determining whether an acute respiratory infection (ARI) in a subject is bacterial in origin, viral in origin, or non-infectious in origin comprising, consisting of, or consisting essentially of: (a) obtaining a biological sample from the subject; (b) determining the gene expression profile of the subject from the biological sample by evaluating the expression levels of pre-defined sets of genes; (c) normalizing gene expression levels for the technology (i.e., platform) used to make said measurement to generate a normalized value; (d) entering the normalized values into classifiers that have pre-defined weighting values for each of the genes in each signature; (e) comparing the output of the classifiers to pre-defined thresholds, cut-off values, or ranges of values that indicate likelihood of infection; (f) if the sample is negative for virus, repeating step (d) using only the bacteria classifier and non-infectious classifier, and (g) classifying the sample as being of bacterial etiology or noninfectious illness.

Another aspect of the present disclosure provides a method for determining whether an acute respiratory infection (ARI) in a subject is bacterial in origin, viral in origin, or non-infectious in origin comprising, consisting of, or consisting essentially of: (a) obtaining a biological sample from the subject; (b) determining the gene expression profile of the subject from the biological sample by evaluating the expression levels of pre-defined sets of genes; (c) normalizing gene expression levels for the technology (i.e., platform) used to make said measurement to generate a normalized value; (d) entering the normalized values into classifiers that have pre-defined weighting values for each of the genes in each signature; (e) comparing the output of the classifiers to pre-defined thresholds, cut-off values, or ranges of values that indicate likelihood of infection; (f) if the sample is negative for non-infectious illness, repeating step (d) using only the viral classifier and bacterial classifier; and (g) classifying the sample as being of viral etiology or bacterial etiology.

Yet another aspect of the present disclosure provides a method of treating an acute respiratory infection (ARI) whose etiology is unknown in a subject, said method comprising, consisting of, or consisting essentially of: (a) obtaining a biological sample from the subject; (b) determining the gene expression profile of the subject from the biological sample by evaluating the expression levels of pre-defined sets of genes (e.g., one, two or three or more signatures); (c) normalizing gene expression levels for the technology (i.e., platform) used to make said measurement to generate a normalized value; (d) entering the normalized values into a bacterial classifier, a viral classifier and non-infectious illness classifier that have pre-defined weighting values for each of the genes in each signature; (e) comparing the output of the classifiers to pre-defined thresholds, cut-off values, or ranges of values that indicate likelihood of infection; (f) classifying the sample as being of bacterial etiology, viral etiology, or noninfectious illness; and (g) administering to the subject an appropriate treatment regimen as identified by step (e). In some embodiments, step (g) comprises administering an antibacterial therapy when the etiology of the ARI is determined to be bacterial. In other embodiments, step (g) comprises administering an antiviral therapy when the etiology of the ARI is determined to be viral.

Another aspect is a method of monitoring response to a vaccine or a drug in a subject suffering from or at risk of an acute respiratory illness selected from bacterial, viral and/or non-infectious, comprising determining a host response of said subject, said determining carried out by a method as taught herein. In some embodiments, the drug is an antibacterial drug or an antiviral drug.

In some embodiments of the aspects, the methods further comprise generating a report assigning the subject a score indicating the probability of the etiology of the ARI.

Further provided is a system for determining an etiology of an acute respiratory illness in a subject selected from bacterial, viral and/or non-infectious, comprising one or more of (inclusive of combinations thereof): at least one processor, a sample input circuit configured to receive a biological sample from the subject; a sample analysis circuit coupled to the at least one processor and configured to determine gene expression levels of the biological sample; an input/output circuit coupled to the at least one processor, a storage circuit coupled to the at least one processor and configured to store data, parameters, and/or classifiers; and a memory coupled to the processor and comprising computer readable program code embodied in the memory that when executed by the at least one processor causes the at least one processor to perform operations comprising: controlling/performing measurement via the sample analysis circuit of gene expression levels of a pre-defined set of genes (i.e., signature) in said biological sample; normalizing the gene expression levels to generate normalized gene expression values; retrieving from the storage circuit a bacterial acute respiratory infection (ARI) classifier, a viral ARI classifier and a non-infectious illness classifier, said classifier(s) comprising pre-defined weighting values (i.e., coefficients) for each of the genes of the pre-defined set of genes; entering the normalized gene expression values into one or more acute respiratory illness classifiers selected from the bacterial acute respiratory infection (ARI) classifier, the viral ARI classifier and the non-infectious illness classifier; calculating an etiology probability for one or more of a bacterial ARI, viral ARI and non-infectious illness based upon said classifier(s); and controlling output via the input/output circuit of a determination whether the acute respiratory illness in the subject is bacterial in origin, viral in origin, non-infectious in origin, or some combination thereof.

In some embodiments, the system comprises computer readable code to transform quantitative, or semi-quantitative, detection of gene expression to a cumulative score or probability of the etiology of the ARI.

In some embodiments, the system comprises an array platform, a thermal cycler platform (e.g., multiplexed and/or real-time PCR platform), a hybridization and multi-signal coded (e.g., fluorescence) detector platform, a nucleic acid mass spectrometry platform, a nucleic acid sequencing platform, or a combination thereof.

In some embodiments of the aspects, the pre-defined sets of genes comprise at least three genetic signatures.

In some embodiments of the aspects, the biological sample comprises a sample selected from the group consisting of peripheral blood, sputum, nasopharyngeal swab, nasopharyngeal wash, bronchoalveolar lavage, endotracheal aspirate, and combinations thereof.

In some embodiments of the aspects, the bacterial classifier comprises expression levels of 5, 10, 20, 30 or 50, to 80, 100, 150 or 200 of the genes (measurable, e.g., with oligonucleotide probes homologous to said genes or gene transcripts) listed as part of a bacterial classifier in Table 1, Table 2, Table 9, Table 10 and/or Table 12. In some embodiments, the viral classifier comprises expression levels of 5, 10, 20, 30 or 50, to 80, 100, 150 or 200 of the genes (measurable, e.g., with oligonucleotide probes homologous to said genes or gene transcripts) listed as part of a viral classifier in Table 1, Table 2, Table 9, Table 10 and/or Table 12. In some embodiments, the non-infectious illness classifier comprises expression levels of 5, 10, 20, 30 or 50, to 80, 100, 150 or 200 of the genes (measurable, e.g., with oligonucleotide probes homologous to said genes or gene transcripts) listed as part of a non-infectious illness classifier in Table 1, Table 2, Table 9, Table 10 and/or Table 12.

A kit for determining the etiology of an acute respiratory infection (ARI) in a subject is also provided, comprising, consisting of, or consisting essentially of (a) a means for extracting mRNA from a biological sample; (b) a means for generating one or more arrays consisting of a plurality of synthetic oligonucleotides with regions homologous to transcripts from of 5, 10, 20, 30 or 50, to 80, 100, 150 or 200 of the genes from Table 1, Table 2, Table 9, Table 10 and/or Table 12; and (c) instructions for use.

Another aspect of the present disclosure provides a method of using a kit for assessing the acute respiratory infection (ARI) classifier comprising, consisting of, or consisting essentially of: (a) generating one or more arrays consisting of a plurality of synthetic oligonucleotides with regions homologous to of 5, 10, 20, 30 or 50, to 80, 100, 150 or 200 of the genes from Table 1, Table 2, Table 9, Table 10 and/or Table 12; (b) adding to said array oligonucleotides with regions homologous to normalizing genes; (c) obtaining a biological sample from a subject suffering from an acute respiratory infection (ARI); (d) isolating RNA from said sample to create a transcriptome; (e) measuring said transcriptome on said array (e.g., by measuring fluorescence or electric current proportional to the level of gene expression, etc.); (f) normalizing the measurements of said transcriptome to the normalizing genes, electronically transferring normalized measurements to a computer to implement the classifier(s), (g) generating a report; and optionally (h) administering an appropriate treatment based on the results.

In some embodiments, the method further comprises externally validating an ARI classifier against a known dataset comprising at least two relevant clinical attributes. In some embodiments, the dataset is selected from the group consisting of GSE6269, GSE42026, GSE40396, GSE20346, GSE42834 and combinations thereof.

Yet another aspect of the present disclosure provides all that is disclosed and illustrated herein.

Also provided is the use of an ARI classifier as taught herein in a method of treatment for acute respiratory infection (ARI) in a subject of unknown etiology.

BRIEF DESCRIPTION OF THE DRAWINGS

The foregoing aspects and other features of the disclosure are explained in the following description, taken in connection with the accompanying drawings, herein.

DETAILED DESCRIPTION

Figure 1:
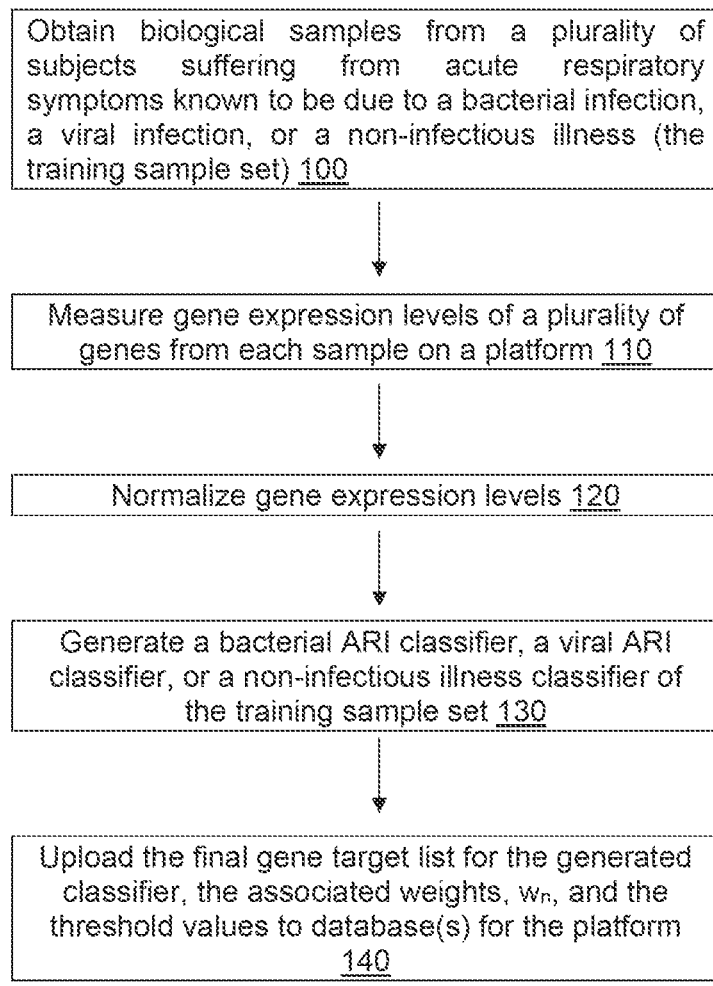
FIG. 1 is a schematic showing a method of obtaining classifiers (training 10) according to some embodiments of the present disclosure, where each classifier is composed of a weighted sum of all or a subset of normalized gene expression levels. This weighted sum defines a probability that allows for a decision (classification), particularly when compared to a threshold value or a confidence interval. The exact combination of genes, their weights and the threshold for each classifier obtained by the training are particular to a specific platform. The classifier (or more precisely its components, namely weights and threshold or confidence interval (values)) go to a database. Weights with a nonzero value determine the subset of genes used by the classifier. Repeat to obtain all three classifiers (bacterial ARI, viral ARI and non-infectious ARI) within a specified platform matching the gene expression values.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

The present disclosure provides that alterations in gene, protein and metabolite expression in blood in response to pathogen exposure that causes acute respiratory infections can be used to identify and characterize the etiology of the ARI in a subject with a high degree of accuracy.

Definitions

As used herein, the term "acute respiratory infection" or "ARI" refers to an infection, or an illness showing symptoms and/or physical findings consistent with an infection (e.g., symptoms such as coughing, wheezing, fever, sore throat, congestion; physical findings such as elevated heart rate, elevated breath rate, abnormal white blood cell count, low arterial carbon dioxide tension ($PaCO_2$), etc.), of the upper or lower respiratory tract, often due to a bacterial or viral pathogen, and characterized by rapid progression of symptoms over hours to days. ARIs may primarily be of the upper respiratory tract (URIs), the lower respiratory tract (LRIs), or a combination of the two. ARIs may have systemic effects due to spread of the infection beyond the respiratory tract or due to collateral damage induced by the immune response. An example of the former includes *Staphylococcus aureus* pneumonia that has spread to the blood stream and can result in secondary sites of infection, including endocarditis (infection of the heart valves), septic arthritis (joint infection), or osteomyelitis (bone infection). An example of the latter includes influenza pneumonia leading to acute respiratory distress syndrome and respiratory failure.

The term "signature" as used herein refers to a set of biological analytes and the measurable quantities of said analytes whose particular combination signifies the presence or absence of the specified biological state. These signatures are discovered in a plurality of subjects with known status (e.g., with a confirmed respiratory bacterial infection, respiratory viral infection, or suffering from non-infectious illness), and are discriminative (individually or jointly) of one or more categories or outcomes of interest. These measurable analytes, also known as biological markers, can be (but are not limited to) gene expression levels, protein or peptide levels, or metabolite levels. See also US 2015/0227681 to Courchesne et al.; US 2016/0153993 to Eden et al.

In some embodiments as disclosed herein, the "signature" is a particular combination of genes whose expression levels, when incorporated into a classifier as taught herein, discriminate a condition such as a bacterial ARI, viral ARI or non-infectious illness. See, for example, Table 1, Table 2, Table 9, Table 10 and Table 12 hereinbelow. In some embodiments, the signature is agnostic to the species of respiratory virus or bacteria (i.e., while differentiating between virus or bacteria, it does not differentiate between particular genus or species of virus or bacteria) and/or agnostic to the particular cause of the non-infectious illness.

As used herein, the terms "classifier" and "predictor" are used interchangeably and refer to a mathematical function that uses the values of the signature (e.g., gene expression levels for a defined set of genes) and a pre-determined coefficient (or weight) for each signature component to generate scores for a given observation or individual patient for the purpose of assignment to a category. The classifier may be linear and/or probabilistic. A classifier is linear if scores are a function of summed signature values weighted by a set of coefficients. Furthermore, a classifier is probabilistic if the function of signature values generates a probability, a value between 0 and 1.0 (or 0 and 100%) quantifying the likelihood that a subject or observation belongs to a particular category or will have a particular outcome, respectively. Probit regression and logistic regression are examples of probabilistic linear classifiers that use probit and logistic link functions, respectively, to generate a probability.

A classifier as taught herein may be obtained by a procedure known as "training," which makes use of a set of data containing observations with known category membership (e.g., bacterial ARI, viral ARI, and/or non-infection illness). See FIG. 1. Specifically, training seeks to find the optimal coefficient (i.e., weight) for each component of a given signature (e.g., gene expression level components), as well as an optimal signature, where the optimal result is determined by the highest achievable classification accuracy.

"Classification" refers to a method of assigning a subject suffering from or at risk for acute respiratory symptoms to one or more categories or outcomes (e.g., a patient is infected with a pathogen or is not infected, another categorization may be that a patient is infected with a virus and/or infected with a bacterium). See FIG. 3. In some cases, a subject may be classified to more than one category, e.g., in case of bacterial and viral co-infection. The outcome, or category, is determined by the value of the scores provided by the classifier, which may be compared to a cut-off or threshold value, confidence level, or limit. In other scenarios, the probability of belonging to a particular category may be given (e.g., if the classifier reports probabilities).

As used herein, the term "indicative" when used with gene expression levels, means that the gene expression levels are up-regulated or down-regulated, altered, or changed compared to the expression levels in alternative biological states (e.g., bacterial ARI or viral ARI) or control. The term "indicative" when used with protein levels means that the protein levels are higher or lower, increased or decreased, altered, or changed compared to the standard protein levels or levels in alternative biological states.

The term "subject" and "patient" are used interchangeably and refer to any animal being examined, studied or treated. It is not intended that the present disclosure be limited to any particular type of subject. In some embodiments of the present invention, humans are the preferred subject, while in other embodiments non-human animals are the preferred subject, including, but not limited to, mice, monkeys, ferrets, cattle, sheep, goats, pigs, chicken, turkeys, dogs, cats, horses and reptiles. In certain embodiments, the subject is suffering from an ARI or is displaying ARI-like symptoms.

"Platform" or "technology" as used herein refers to an apparatus (e.g., instrument and associated parts, computer, computer-readable media comprising one or more databases as taught herein, reagents, etc.) that may be used to measure a signature, e.g., gene expression levels, in accordance with the present disclosure. Examples of platforms include, but are not limited to, an array platform, a thermal cycler platform (e.g., multiplexed and/or real-time PCR platform), a nucleic acid sequencing platform, a hybridization and multi-signal coded (e.g., fluorescence) detector platform, etc., a nucleic acid mass spectrometry platform, a magnetic resonance platform, and combinations thereof.

In some embodiments, the platform is configured to measure gene expression levels semi-quantitatively, that is, rather than measuring in discrete or absolute expression, the expression levels are measured as an estimate and/or relative to each other or a specified marker or markers (e.g., expression of another, "standard" or "reference," gene).

In some embodiments, semi-quantitative measuring includes "real-time PCR" by performing PCR cycles until a signal indicating the specified mRNA is detected, and using the number of PCR cycles needed until detection to provide the estimated or relative expression levels of the genes within the signature.

A real-time PCR platform includes, for example, a TaqMan® Low Density Array (TLDA), in which samples undergo multiplexed reverse transcription, followed by real-time PCR on an array card with a collection of wells in which real-time PCR is performed. See Kodani et al. 2011, *J. Clin. Microbiol.* 49(6):2175-2182. A real-time PCR platform also includes, for example, a Biocartis Idylla™ sample-to-result technology, in which cells are lysed, DNA/RNA extracted and real-time PCR is performed and results detected.

A magnetic resonance platform includes, for example, T2 Biosystems® T2 Magnetic Resonance (T2MR®) technology, in which molecular targets may be identified in biological samples without the need for purification.

The terms "array," "microarray" and "micro array" are interchangeable and refer to an arrangement of a collection of nucleotide sequences presented on a substrate. Any type of array can be utilized in the methods provided herein. For example, arrays can be on a solid substrate (a solid phase array), such as a glass slide, or on a semi-solid substrate, such as nitrocellulose membrane. Arrays can also be presented on beads, i.e., a bead array. These beads are typically microscopic and may be made of, e.g., polystyrene. The array can also be presented on nanoparticles, which may be made of, e.g., particularly gold, but also silver, palladium, or platinum. See, e.g., Nanosphere Verigene® System, which uses gold nanoparticle probe technology. Magnetic nanoparticles may also be used. Other examples include nuclear magnetic resonance microcoils. The nucleotide sequences can be DNA, RNA, or any permutations thereof (e.g., nucleotide analogues, such as locked nucleic acids (LNAs), and the like). In some embodiments, the nucleotide sequences span exon/intron boundaries to detect gene expression of spliced or mature RNA species rather than genomic DNA. The nucleotide sequences can also be partial sequences from a gene, primers, whole gene sequences, non-coding sequences, coding sequences, published sequences, known sequences, or novel sequences. The arrays may additionally comprise other compounds, such as antibodies, peptides, proteins, tissues, cells, chemicals, carbohydrates, and the like that specifically bind proteins or metabolites.

An array platform includes, for example, the TaqMan® Low Density Array (TLDA) mentioned above, and an Affymetrix® microarray platform.

A hybridization and multi-signal coded detector platform includes, for example, NanoString nCounter® technology, in which hybridization of a color-coded barcode attached to a target-specific probe (e.g., corresponding to a gene expression transcript of interest) is detected; and Luminex® xMAP® technology, in which microsphere beads are color coded and coated with a target-specific (e.g., gene expression transcript) probe for detection; and Illumina® BeadArray, in which microbeads are assembled onto fiber optic bundles or planar silica slides and coated with a target-specific (e.g., gene expression transcript) probe for detection.

A nucleic acid mass spectrometry platform includes, for example, the Ibis Biosciences Plex-ID® Detector, in which DNA mass spectrometry is used to detect amplified DNA using mass profiles.

A thermal cycler platform includes, for example, the FilmArray® multiplex PCR system, which extract and purifies nucleic acids from an unprocessed sample and performs nested multiplex PCR; and the RainDrop Digital PCR System, which is a droplet-based PCR platform using microfluidic chips.

The term "computer readable medium" refers to any device or system for storing and providing information (e.g., data and instructions) to a computer processor. Examples of computer readable media include, but are not limited to, DVDs, CDs hard disk drives, magnetic tape and servers for streaming media over networks, and applications, such as those found on smart phones and tablets. In various embodiments, aspects of the present invention including data structures and methods may be stored on a computer readable medium. Processing and data may also be performed on numerous device types, including but not limited to, desk top and lap top computers, tablets, smart phones, and the like.

As used herein, the term "biological sample" comprises any sample that may be taken from a subject that contains genetic material that can be used in the methods provided herein. For example, a biological sample may comprise a peripheral blood sample. The term "peripheral blood sample" refers to a sample of blood circulating in the circulatory system or body taken from the system of body. Other samples may comprise those taken from the upper respiratory tract, including but not limited to, sputum, nasopharyngeal swab and nasopharyngeal wash. A biological sample may also comprise those samples taken from the lower respiratory tract, including but not limited to, bronchoalveolar lavage and endotracheal aspirate. A biological sample may also comprise any combinations thereof.

The term "genetic material" refers to a material used to store genetic information in the nuclei or mitochondria of an organism's cells. Examples of genetic material include, but are not limited to, double-stranded and single-stranded DNA, cDNA, RNA, and mRNA.

The term "plurality of nucleic acid oligomers" refers to two or more nucleic acid oligomers, which can be DNA or RNA.

As used herein, the terms "treat", "treatment" and "treating" refer to the reduction or amelioration of the severity, duration and/or progression of a disease or disorder or one or more symptoms thereof resulting from the administration of one or more therapies. Such terms refer to a reduction in the replication of a virus or bacteria, or a reduction in the spread of a virus or bacteria to other organs or tissues in a subject or to other subjects. Treatment may also include therapies for ARIs resulting from non-infectious illness, such as allergy treatment, asthma treatments, and the like.

The term "effective amount" refers to an amount of a therapeutic agent that is sufficient to exert a physiological effect in the subject. The term "responsivity" refers to a change in gene expression levels of genes in a subject in response to the subject being infected with a virus or bacteria or suffering from a non-infectious illness compared to the gene expression levels of the genes in a subject that is not infected with a virus, bacteria or suffering from a non-infectious illness or a control subject.

The term "appropriate treatment regimen" refers to the standard of care needed to treat a specific disease or disorder. Often such regimens require the act of administering to a subject a therapeutic agent(s) capable of producing a curative effect in a disease state. For example, a therapeutic agent for treating a subject having bacteremia is an antibiotic which include, but are not limited to, penicillins, cephalosporins, fluroquinolones, tetracyclines, macrolides, and aminoglycosides. A therapeutic agent for treating a subject having a viral respiratory infection includes, but is not limited to, oseltamivir, RNAi antivirals, inhaled ribavirin, monoclonal antibody respigam, zanamivir, and neuraminidase blocking agents. The invention contemplates the use of the methods of the invention to determine treatments with antivirals or antibiotics that are not yet available. Appropriate treatment regimes also include treatments for ARIs resulting from non-infectious illness, such as allergy treatments, including but not limited to, administration of antihistamines, decongestants, anticholinergic nasal sprays, leukotriene inhibitors, mast cell inhibitors, steroid nasal sprays, etc.; and asthma treatments, including, but not limited to, inhaled corticosteroids, leukotriene modifiers, long-acting beta agonists, combinations inhalers (e.g., fluticasone-salmeterol; budesonide-formoterol; mometasone-formoterol, etc.), theophylline, short-acting beta agonists, ipratropium, oral and intravenous corticosteroids, omalizumab, and the like.

Often such regimens require the act of administering to a subject a therapeutic agent(s) capable of producing reduction of symptoms associated with a disease state. Examples such therapeutic agents include, but are not limited to, NSAIDS, acetaminophen, anti-histamines, beta-agonists, anti-tussives or other medicaments that reduce the symptoms associated with the disease process.

Methods of Generating Classifiers (Training)

The present disclosure provides methods of generating classifiers (also referred to as training 10) for use in the methods of determining the etiology of an acute respiratory illness in a subject. Gene expression-based classifiers are developed that can be used to identify and characterize the etiology of an ARI in a subject with a high degree of accuracy.

Hence, and as shown in FIG. 1, one aspect of the present disclosure provides a method of making an acute respiratory infection (ARI) classifier comprising, consisting of, or consisting essentially of: (i) obtaining a biological sample (e.g., a peripheral blood sample) from a plurality of subjects suffering from bacterial, viral or non-infectious acute respiratory infection 100; (ii) optionally, isolating RNA from said sample (e.g., total RNA to create a transcriptome) (105, not shown in FIG. 1); (iii) measuring gene expression levels of a plurality of genes 110 (i.e., some or all of the genes expressed in the RNA); (iv) normalizing the gene expression levels 120; and (v) generating a bacterial ARI classifier, a viral ARI classifier or a non-infectious illness classifier 130 based on the results.

In some embodiments, the sample is not purified after collection. In some embodiments, the sample may be purified to remove extraneous material, before or after lysis of cells. In some embodiments, the sample is purified with cell lysis and removal of cellular materials, isolation of nucleic acids, and/or reduction of abundant transcripts such as globin or ribosomal RNAs.

In some embodiments, measuring gene expression levels may include generating one or more microarrays using said transcriptomes; measuring said transcriptomes using a plurality of primers; analyzing and correcting batch differences.

In some embodiments, the method further includes uploading 140 the final gene target list for the generated classifier, the associated weights ($w_n$), and threshold values to one or more databases.

Figure 2:
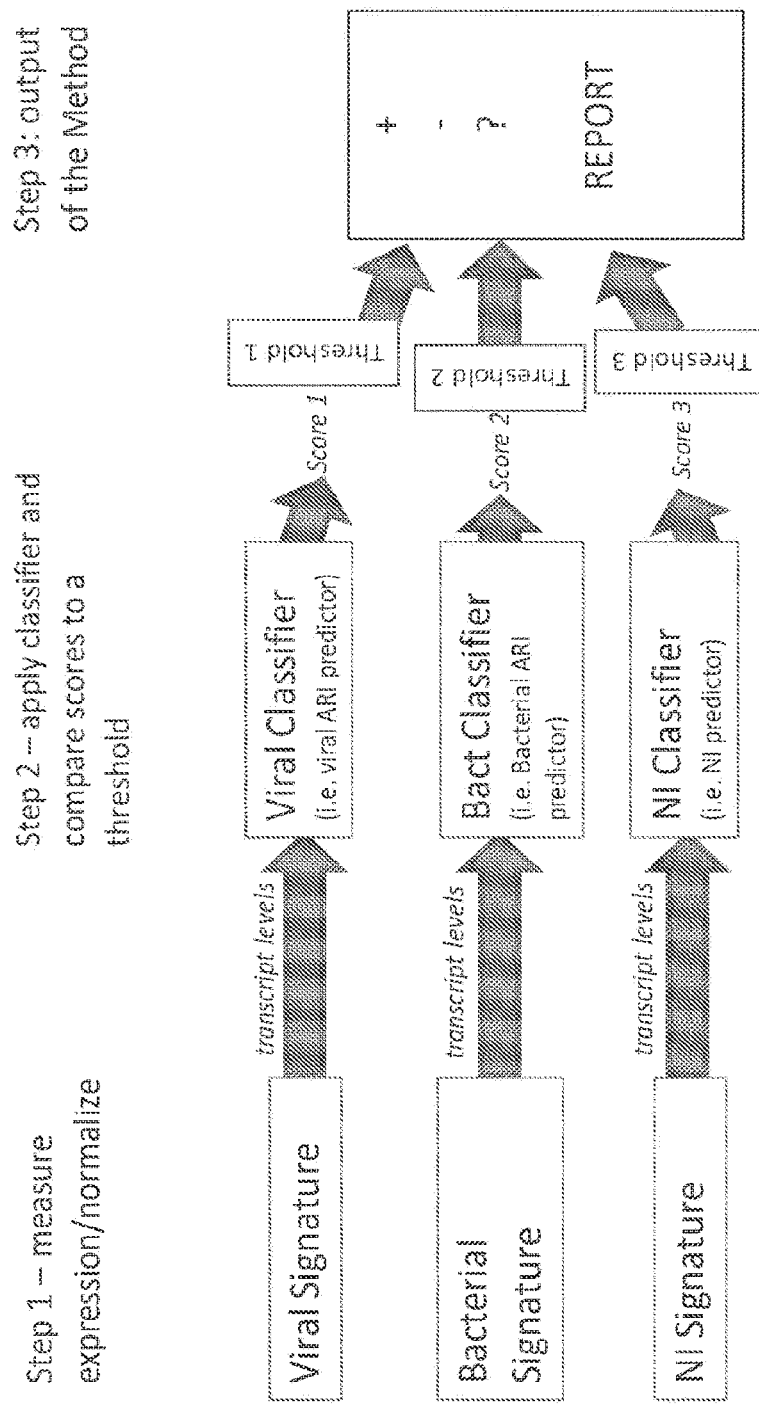
FIG. 2 is a diagram showing an example of generating and/or using classifiers in accordance with some embodiments of the present disclosure.

An example of generating said classifiers is detailed in FIG. 2. As shown in FIG. 2, biological samples from a cohort of patients encompassing bacterial ARI, viral ARI, or non-infectious illness are used to develop gene expression-based classifiers for each condition (i.e., bacterial acute respiratory infection, viral acute respiratory infection, or non-infectious cause of illness). Specifically, the bacterial ARI classifier is obtained to positively identifying those with bacterial ARI vs. either viral ARI or non-infectious illnesses. The viral ARI classifier is obtained to positively identifying those with viral ARI vs. bacterial ARI or non-infectious illness (NI). The non-infectious illness classifier is generated to improve bacterial and viral ARI classifier specificity. Next, signatures for bacterial ARI classifiers, viral ARI classifiers, and non-infectious illness classifiers are generated (e.g., by applying a sparse logistic regression model).

These three classifiers may then be combined, if desired, into a single classifier termed "the ARI classifier" by following a one-versus-all scheme whereby largest membership probability assigns class label. See also FIG. 5. The combined ARI classifier may be validated in some embodiments using leave-one-out cross-validation in the same population from which it was derived and/or may be validated in some embodiments using publically available human gene expression datasets of samples from subjects suffering from illness of known etiology. For example, validation may be performed using publically available human gene expression datasets (e.g., GSE6269, GSE42026, GSE40396, GSE20346, and/or GSE42834), the datasets chosen if they included at least two clinical groups (bacterial ARI, viral ARI, or non-infectious illness).

The classifier may be validated in a standard set of samples from subjects suffering from illness of known etiology, i.e., bacterial ARI, viral ARI, or non-infectious illness.

The methodology for training described herein may be readily translated by one of ordinary skill in the art to different gene expression detection (e.g., mRNA detection and quantification) platforms.

The methods and assays of the present disclosure may be based upon gene expression, for example, through direct measurement of RNA, measurement of derived materials (e.g., cDNA), and measurement of RNA products (e.g., encoded proteins or peptides). Any method of extracting and screening gene expression may be used and is within the scope of the present disclosure.

In some embodiments, the measuring comprises the detection and quantification (e.g., semi-quantification) of mRNA in the sample. In some embodiments, the gene expression levels are adjusted relative to one or more standard gene level(s) ("normalized"). As known in the art, normalizing is done to remove technical variability inherent to a platform to give a quantity or relative quantity (e.g., of expressed genes).

In some embodiments, detection and quantification of mRNA may first involve a reverse transcription and/or amplification step, e.g., RT-PCR such as quantitative RT-PCR. In some embodiments, detection and quantification may be based upon the unamplified mRNA molecules present in or purified from the biological sample. Direct detection and measurement of RNA molecules typically involves hybridization to complementary primers and/or labeled probes. Such methods include traditional northern blotting and surface-enhanced Raman spectroscopy (SERS), which involves shooting a laser at a sample exposed to surfaces of plasmonic-active metal structures with gene-specific probes, and measuring changes in light frequency as it scatters.

Similarly, detection of RNA derivatives, such as cDNA, typically involves hybridization to complementary primers and/or labeled probes. This may include high-density oligonucleotide probe arrays (e.g., solid state microarrays and bead arrays) or related probe-hybridization methods, and polymerase chain reaction (PCR)-based amplification and detection, including real-time, digital, and end-point PCR methods for relative and absolute quantitation of specific RNA molecules.

Additionally, sequencing-based methods can be used to detect and quantify RNA or RNA-derived material levels. When applied to RNA, sequencing methods are referred to as RNAseq, and provide both qualitative (sequence, or presence/absence of an RNA, or its cognate cDNA, in a sample) and quantitative (copy number) information on RNA molecules from a sample. See. e.g., Wang et al. 2009 Nat. Rev. Genet. 10(1):57-63. Another sequence-based method, serial analysis of gene expression (SAGE), uses cDNA "tags" as a proxy to measure expression levels of RNA molecules.

Moreover, use of proprietary platforms for mRNA detection and quantification may also be used to complete the methods of the present disclosure. Examples of these are Pixel™ System, incorporating Molecular Indexing™, developed by CELLULAR RESEARCH, INC., NanoString® Technologies nCounter gene expression system; mRNA-Seq, Tag-Profiling, BeadArray™ technology and VeraCode from Illumina, the ICEPlex System from PrimeraDx, and the QuantiGene 2.0 Multiplex Assay from Affymetrix.

As an example, RNA from whole blood from a subject can be collected using RNA preservation reagents such as PAXgene™ RNA tubes (PreAnalytiX, Valencia, Calif.). The RNA can be extracted using a standard PAXgene™ or Versagene™ (Gentra Systems, Inc, Minneapolis, Minn.) RNA extraction protocol. The Versagene™ kit produces greater yields of higher quality RNA from the PAXgene™ RNA tubes. Following RNA extraction, one can use GLOBINClear™ (Ambion, Austin, Tex.) for whole blood globin reduction. (This method uses a bead-oligonucleotide construct to bind globin mRNA and, in our experience, we are able to remove over 90% of the globin mRNA.) Depending on the technology, removal of abundant and non-interesting transcripts may increase the sensitivity of the assay, such as with a microarray platform.

Quality of the RNA can be assessed by several means. For example, RNA quality can be assessed using an Agilent 2100 Bioanalyzer immediately following extraction. This analysis provides an RNA Integrity Number (RIN) as a quantitative measure of RNA quality. Also, following globin reduction the samples can be compared to the globin-reduced standards. In addition, the scaling factors and background can be assessed following hybridization to microarrays.

Real-time PCR may be used to quickly identify gene expression from a whole blood sample. For example, the isolated RNA can be reverse transcribed and then amplified and detected in real time using non-specific fluorescent dyes that intercalate with the resulting ds-DNA, or sequence-specific DNA probes labeled with a fluorescent reporter which permits detection only after hybridization of the probe with its complementary DNA target.

Hence, it should be understood that there are many methods of mRNA quantification and detection that may be used by a platform in accordance with the methods disclosed herein.

The expression levels are typically normalized following detection and quantification as appropriate for the particular platform using methods routinely practiced by those of ordinary skill in the art.

With mRNA detection and quantification and a matched normalization methodology in place for platform, it is simply a matter of using carefully selected and adjudicated patient samples for the training methods. For example, the cohort described hereinbelow was used to generate the appropriate weighting values (coefficients) to be used in conjunction with the genes in the three signatures in the classifier for a platform. These subject-samples could also be used to generate coefficients and cut-offs for a test implemented using a different mRNA detection and quantification platform.

In some embodiments, the individual categories of classifiers (i.e., bacterial ARI, viral ARI, non-infectious illness) are formed from a cohort inclusive of a variety of such causes thereof. For instance, the bacterial ARI classifier is obtained from a cohort having bacterial infections from multiple bacterial genera and/or species, the viral ARI classifier is obtained from a cohort having viral infections from multiple viral genera and/or species, and the non-infectious illness classifier is obtained from a cohort having a non-infectious illness due to multiple non-infectious causes. See, e.g., Table 8. In this way, the respective classifiers obtained are agnostic to the underlying bacteria, virus, and non-infectious cause. In some embodiments, some or all of the subjects with non-infectious causes of illness in the cohort have symptoms consistent with a respiratory infection.

In some embodiments, the signatures may be obtained using a supervised statistical approach known as sparse linear classification in which sets of genes are identified by the model according to their ability to separate phenotypes during a training process that uses the selected set of patient samples. The outcomes of training are gene signatures and classification coefficients for the three comparisons. Together the signatures and coefficients provide a classifier or predictor. Training may also be used to establish threshold or cut-off values. Threshold or cut-off values can be adjusted to change test performance, e.g., test sensitivity and specificity. For example, the threshold for bacterial ARI may be intentionally lowered to increase the sensitivity of the test for bacterial infection, if desired.

In some embodiments, the classifier generating comprises iteratively: (i) assigning a weight for each normalized gene expression value, entering the weight and expression value for each gene into a classifier (e.g., a linear regression classifier) equation and determining a score for outcome for each of the plurality of subjects, then (ii) determining the accuracy of classification for each outcome across the plurality of subjects, and then (iii) adjusting the weight until accuracy of classification is optimized. Genes having a non-zero weight are included in the respective classifier.

In some embodiments, the classifier is a linear regression classifier and said generating comprises converting a score of said classifier to a probability using a link function. As known in the art, the link function specifies the link between the target/output of the model (e.g., probability of bacterial infection) and systematic components (in this instance, the combination of explanatory variables that comprise the predictor) of the linear model. It says how the expected value of the response relates to the linear predictor of explanatory variable.

Methods of Classification

The present disclosure further provides methods for determining whether a patient has a respiratory illness due to a bacterial infection, a viral infection, or a non-infectious cause. The method for making this determination relies upon the use of classifiers obtained as taught herein. The methods may include: a) measuring the expression levels of pre-defined sets of genes (i.e., for one or more of the three signatures); b) normalizing gene expression levels for the technology used to make said measurement; c) taking those values and entering them into a bacterial classifier, a viral classifier and/or non-infectious illness classifier (i.e., predictors) that have pre-defined weighting values (coefficients) for each of the genes in each signature; d) comparing the output of the classifiers to pre-defined thresholds, cut-off values, confidence intervals or ranges of values that indicate likelihood of infection; and optionally e) jointly reporting the results of the classifiers.

Figure 3:
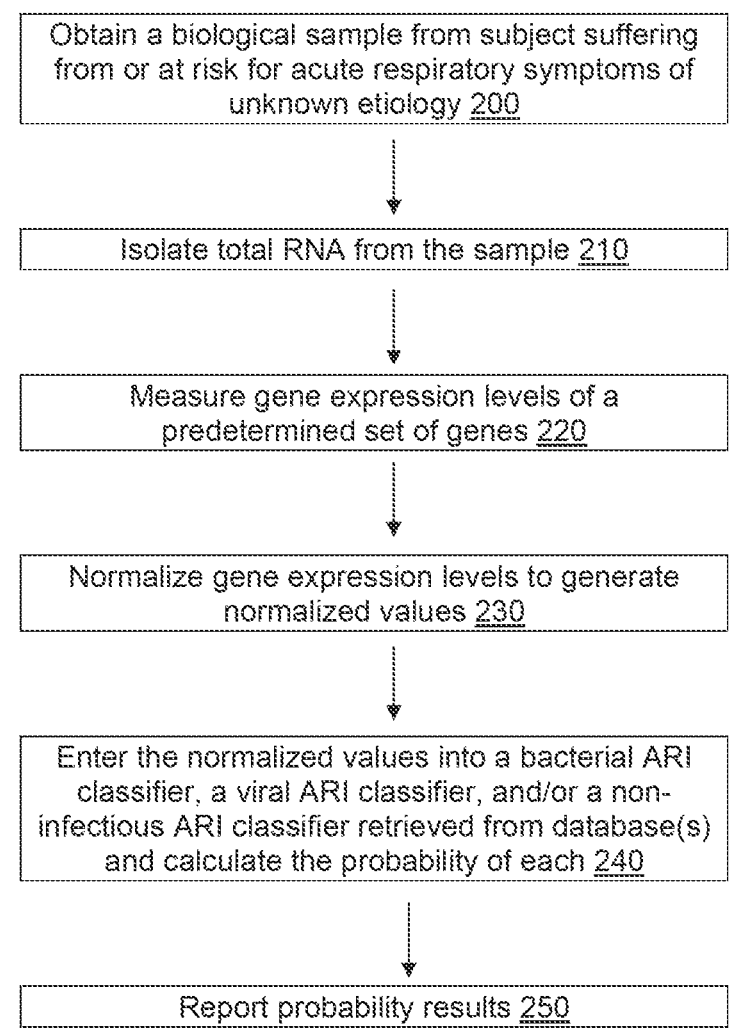
FIG. 3 is a schematic showing a method of classification 20 of an etiology of acute respiratory symptoms suffered by a subject making use of classifiers according to some embodiments of the present disclosure.

A simple overview of such methods is provided in FIG. 3. In this representation, each of the three gene signatures is informative of the patient's host response to a different ARI etiology (bacterial or viral) or to an ill, but not infected, state (NI). These signatures are groups of gene transcripts which have consistent and coordinated increased or decreased levels of expression in response to one of three clinical states: bacterial ARI, viral ARI, or a non-infected but ill state. These signatures are derived using carefully adjudicated groups of patient samples with the condition(s) of interest (training 10).

With reference to FIG. 3, after obtaining a biological sample from the patient (e.g., a blood sample), in some embodiments the mRNA is extracted. The mRNA (or a defined region of each mRNA), is quantified for all, or a subset, of the genes in the signatures. Depending upon the apparatus that is used for quantification, the mRNA may have to be first purified from the sample.

The signature is reflective of a clinical state and is defined relative to at least one of the other two possibilities. For example, the bacterial ARI signature is identified as a group of biomarkers (here, represented by gene mRNA transcripts) that distinguish patients with bacterial ARI and those without bacterial ARI (including patients with viral ARI or non-infectious illness as it pertains to this application). The viral ARI signature is defined by a group of biomarkers that distinguish patients with viral ARI from those without viral ARI (including patients with either bacterial ARI or non-infectious illness). The non-infectious illness signature is defined by a group of biomarkers that distinguish patients with non-infectious causes of illness relative to those with either bacterial or viral ARI.

The normalized expression levels of each gene of the signature (e.g., first column Table 9) are the explanatory or independent variables or features used in the classifier. As an example, the classifier may have a general form as a probit regression formulation:

$$P(\text{having condition}) = \Phi(\beta_1 X_1 + \beta_1 X_2 + \ldots + \beta_d X_d) \quad \text{(equation 1)}$$

where the condition is bacterial ARI, viral ARI, or non-infection illness; $\Phi(\cdot)$ is the probit (or logistic, etc.) link function; $\{\beta_1, \beta_2, \ldots, \beta_d\}$ are the coefficients obtained during training (e.g., second, third and fourth columns from Table 9) (coefficients may also be denoted $\{w_1, w_2, \ldots, w_d\}$ as "weights" herein); $\{X_1, X_2, \ldots, X_d\}$ are the normalized gene expression levels of the signature; and d is the size of the signature (i.e., number of genes).

As would be understood by one skilled in the art, the value of the coefficients for each explanatory variable will change for each technology platform used to measure the expression of the genes or a subset of genes used in the probit regression model. For example, for gene expression measured by Affymetrix U133A 2.0 microarray, the coefficients for each of the features in the classifier algorithm are shown in Table 9.

The sensitivity, specificity, and overall accuracy of each classifier may be optimized by changing the threshold for classification using receiving operating characteristic (ROC) curves.

Another aspect of the present disclosure provides a method for determining whether an acute respiratory infection (ARI) in a subject is bacterial in origin, viral in origin, or non-infectious in origin comprising, consisting of, or consisting essentially of a) obtaining a biological sample from the subject; b) determining the gene expression profile of the subject from the biological sample by evaluating the expression levels of pre-defined sets of genes (i.e., three signatures); c) normalizing gene expression levels for the technology used to make said measurement to generate a normalized value; d) entering the normalized value into a bacterial classifier, a viral classifier and non-infectious illness classifier (i.e., predictors) that have pre-defined weighting values (coefficients) for each of the genes in each signature; e) comparing the output of the classifiers to pre-defined thresholds, cut-off values, or ranges of values that indicate likelihood of infection; and e) classifying the sample as being of bacterial etiology, viral etiology, or noninfectious illness. In some embodiments, the method further comprises generating a report assigning the patient a score indicating the probability of the etiology of the ARI.

The classifiers that are developed during training and using a training set of samples are applied for prediction purposes to diagnose new individuals ("classification"). For each subject or patient, a biological sample is taken and the normalized levels of expression (i.e., the relative amount of mRNA expression) in the sample of each of the genes specified by the signatures found during training are the input for the classifiers. The classifiers also use the weighting coefficients discovered during training for each gene. As outputs, the classifiers are used to compute three probability values. Each probability value may be used to determine the likelihood of the three considered clinical states: bacterial ARI, viral ARI, and non-infectious illness.

In some embodiments, the results of each of the classifiers—the probability a new subject or patient has a bacterial ARI, viral ARI, or non-infectious illness—are reported. In final form, the three signatures with their corresponding coefficients are applied to an individual patient to obtain three probability values, namely probability of having a bacterial ARI, viral ARI, and a non-infectious illness. In some embodiments, these values may be reported relative to a reference range that indicates the confidence with which the classification is made. In some embodiments, the output of the classifier may be compared to a threshold value, for example, to report a "positive" in the case that the classifier score or probability exceeds the threshold indicating the presence of one or more of a bacterial ARI, viral ARI, or non-infectious illness. If the classifier score or probability fails to reach the threshold, the result would be reported as "negative" for the respective condition. Optionally, the values for bacterial and viral ARI alone are reported and the report is silent on the likelihood of ill but not infected.

It should be noted that a classifier obtained with one platform may not show optimal performance on another platform. This could be due to the promiscuity of probes or other technical issues particular to the platform. Accordingly, also described herein are methods to adapt a signature as taught herein from one platform for another.

For example, a signature obtained from an Affymetrix platform may be adapted to a TLDA platform by the use of corresponding TLDA probes for the genes in the signature and/or substitute genes correlated with those in the signature, for the Affymetrix platform. Table 1 shows a list of Affymetrix probes and the genes they measure, plus "replacement genes" that are introduced as replacements for gene probes that either may not perform well on the TLDA platform for technical reasons or to replace those Affymetrix probes for which there is no cognate TLDA probe. These replacements may indicate highly correlated genes or may be probes that bind to a different location in the same gene transcript. Additional genes may be included, such as pan-viral gene probes. The weights shown in Table 1 are weights calculated for a classifier implemented on the microarray platform. Weights that have not been estimated are indicated by "NA" in the table. (Example 4 below provides the completed translation of these classifiers to the TLDA platform.) Reference probes for TLDA (i.e., normalization genes, e.g., TRAP1, PPIB, GAPDH and 18S) also have "NA" in the columns for weights and Affymetrix probeset ID (these are not part of the classifier). Additional gene probes that do not necessarily correspond to the Affymetrix probeset also have "NA" in the Affymetrix probeset ID column.

TABLE 1

Preliminary Gene List for TLDA platform Columns are as follows:
Column 1: Affymetrix probeset ID - this was the probeset identified in the Affy discovery analyses (primary probeset)
Columns 2, 3, 4: estimated coefficients (weights) for contribution of each probates to the 3 classifiers from Affymetrix weights
Column 5: Gene name

| AFFXProbeSet | Bacterial | Viral | NI | Gene |
|---|---|---|---|---|
| 216867_s_at | 0.0534745 | 0 | 0 | PDGFA |
| 203313_s_at | 1.09463 | 0 | 0 | TGIF1 |
| NA | NA | NA | NA | TRAP1 |
| NA | NA | NA | NA | PPIB |
| 202720_at | 0 | 0.0787402 | 0 | TES |
| 210657_s_at | NA | NA | NA | SEPT4 |
| NA | NA | NA | NA | EPHB3 |
| NA | NA | NA | NA | SYDE1 |
| 202864_s_at | 0 | 0.100019 | 0 | SP100 |
| 213633_at | 1.01336 | 0 | 0 | SH3BP1 |
| NA | NA | NA | NA | 18S |

TABLE 1-continued

Preliminary Gene List for TLDA platform Columns are as follows:
Column 1: Affymetrix probeset ID - this was the probeset identified in the Affy discovery analyses (primary probeset)
Columns 2, 3, 4: estimated coefficients (weights) for contribution of each probates to the 3 classifiers from Affymetrix weights
Column 5: Gene name

| AFFXProbeSet | Bacterial | Viral | NI | Gene |
|---|---|---|---|---|
| NA | NA | NA | NA | 18S |
| NA | NA | NA | NA | GIT2 |
| 205153_s_at | 0.132886 | 0 | 0 | CD40 |
| 202709_at | 0.427849 | 0 | 0 | FMOD |
| 202973_x_at | 0.112081 | 0 | 0 | FAM13A |
| 204415_at | NA | NA | NA | IFI6 |
| 202509_s_at | 0 | 0 | 0.416714 | TNFAIP2 |
| 200042_at | 0 | 0.0389975 | 0 | RTCB |
| 206371_at | 0.0439022 | 0 | 0 | FOLR3 |
| 212914_at | 0 | 0 | 0.0099678 | CBX7 |
| 215804_at | 1.94364 | 0 | 0 | EPHA1 |
| 215268_at | 0.0381782 | 0 | 0 | KIAA0754 |
| 203153_at | NA | NA | NA | IFIT1 |
| 217502_at | NA | NA | NA | IFIT2 |
| 205569_at | NA | NA | NA | LAMP3 |
| 218943_s_at | NA | NA | NA | DDX58 |
| NA | NA | NA | NA | GAPDH |
| 213300_at | 0.578303 | 0 | 0 | ATG2A |
| 200663_at | 0.176027 | 0 | 0 | CD63 |
| 216303_s_at | 0.31126 | 0 | 0 | MTMR1 |
| NA | NA | NA | NA | ICAM2 |
| NA | NA | NA | NA | EXOSC4 |
| 208702_x_at | 0 | 0 | 0.0426262 | APLP2 |
| NA | NA | NA | NA | 18S |
| NA | NA | NA | NA | 18S |
| NA | NA | NA | NA | FPGS |
| 217408_at | 0 | 1.089 | 0.0690681 | MRPS18B |
| 206918_s_at | 1.00926 | 0 | 0 | CPNE1 |
| 208029_s_at | 0.020511 | 0 | 0.394049 | LAPTM4B |
| 203153_at | 0.133743 | 0 | 0 | IFIT1 |
| NA | NA | NA | NA | DECR1 |
| 200986_at | NA | NA | NA | SERPING1 |
| 214097_at | 0.211804 | 0.576801 | 0 | RPS21 |
| 204392_at | 0 | 0.129465 | 0 | CAMK1 |
| 219382_at | 0.866643 | 0 | 0 | SERTAD3 |
| 205048_s_at | 0.0114514 | 0 | 0 | PSPH |
| 205552_s_at | NA | NA | NA | OAS1 |
| 219684_at | NA | NA | NA | RTP4 |
| 221491_x_at | 0.651431 | 0 | 0 | HLA-DRB3 |
| NA | NA | NA | NA | TRAP1 |
| NA | NA | NA | NA | PPIB |
| 216571_at | 0.878426 | 0 | 0 | SMPD1 |
| 215606_s_at | 0.479765 | 0 | 0 | ERC1 |
| 44673_at | 0.0307987 | 0 | 0 | SIGLEC1 |
| 222059_at | 0 | 0.112261 | 0 | ZNF335 |
| NA | NA | NA | NA | MRC2 |
| 209031_at | 0 | 0 | 0.237916 | CADM1 |
| 209919_x_at | 0.613197 | 0 | 0 | GGT1 |
| 214085_x_at | 0.367611 | 0 | 0 | GLIPR1 |
| NA | NA | NA | NA | ELF4 |
| 200947_s_at | 1.78944 | 0 | 0 | GLUD1 |
| 206676_at | 0 | 0 | 0.0774651 | CEACAM8 |
| NA | NA | NA | NA | IFNGR2 |
| 207718_x_at | 0.0392962 | 0 | 0 | CYP2A7 |
| 220308_at | 0 | 0.0345586 | 0 | CCDC19 |
| 205200_at | 0.87833 | 0 | 0 | CLEC3B |
| 202284_s_at | 0.356457 | 0 | 0 | CDKN1A |
| 213223_at | 0.686657 | 0 | 0 | RPL28 |
| 205312_at | 0 | 0 | 0.394304 | SPI1 |
| 212035_s_at | 2.0241 | 0 | 1.3618 | EXOC7 |
| 218306_s_at | 0 | 0 | 0.784894 | HERC1 |
| 205008_s_at | 0 | 0.223868 | 0 | CIB2 |
| 219777_at | 0 | 0.25509 | 0 | GIMAP6 |
| 218812_s_at | 0.967987 | 0 | 0 | ORAI2 |
| NA | NA | NA | NA | GAPDH |
| 208736_at | 0 | 0.582264 | 0.0862941 | ARPC3 |
| 203455_s_at | 0 | 0 | 0.0805395 | SAT1 |
| 208545_x_at | 0.265408 | 0 | 0 | TAF4 |
| NA | NA | NA | NA | TLDC1 |
| 202509_s_at | NA | NA | NA | TNFAIP2 |
| 205098_at | 0.116414 | 0 | 0 | CCR1 |
| 222154_s_at | NA | NA | NA | SPATS2L |
| 201188_s_at | 0.606326 | 0 | 0 | ITPR3 |
| NA | NA | NA | NA | FPGS |
| 205483_s_at | NA | NA | NA | ISG15 |
| 205965_at | 0.02668 | 0 | 0 | BATF |
| 220059_at | 0.86817 | 0 | 0 | STAP1 |
| 214955_at | 0.100645 | 0 | 0 | TMPRSS6 |
| NA | NA | NA | NA | DECR1 |
| 218595_s_at | 0 | 0 | 0.422722 | HEATR1 |
| 221874_at | 0.40581 | 0 | 0.017015 | KIAA1324 |
| 205001_s_at | 0 | 0.067117 | 0 | DDX3Y |
| 219211_at | NA | NA | NA | USP18 |
| 209605_at | 0.499338 | 0 | 0 | TST |
| 212708_at | 0.0325637 | 0 | 0 | MSL1 |
| 203392_s_at | 0 | 0.0139199 | 0 | CTBP1 |
| 202688_at | 0 | 0.0050837 | 0 | TNFSF10 |
| NA | NA | NA | NA | TRAP1 |
| NA | NA | NA | NA | PPIB |
| 203979_at | 0.00999102 | 0 | 0.301178 | CYP27A1 |
| 204490_s_at | 0.00732794 | 0 | 0 | CD44 |
| 206207_at | 0.0852924 | 0 | 0 | CLC |
| 216289_at | 0 | 0.00074607 | 0 | GPR144 |
| 201949_x_at | 0 | 0 | 0.034093 | CAPZB |
| NA | NA | NA | NA | EXOG |
| 216473_x_at | 0 | 0.0769736 | 0 | DUX4 |
| 212900_at | 0.0573273 | 0 | 0 | SEC24A |
| 204439_at | NA | NA | NA | IFI44L |
| 212162_at | 0 | 0.0102331 | 0 | KIDINS220 |
| 209511_at | 0 | 0.031194 | 0 | POLR2F |
| 214175_x_at | 0 | 0 | 0.266628 | PDLIM4 |
| 219863_at | NA | NA | NA | HERC5 |
| 206896_s_at | 0.482822 | 0 | 0 | GNG7 |
| 208886_at | 0.149103 | 0 | 0 | H1FO |
| 212697_at | 0 | 0 | 1.02451 | FAM134C |
| NA | NA | NA | NA | FNBP4 |
| 202672_s_at | NA | NA | NA | ATF3 |
| 201341_at | 0.109677 | 0 | 0 | ENC1 |
| 210797_s_at | 0 | 0.188667 | 0 | OASL |
| 206647_at | 0.0650386 | 0 | 0 | HBZ |
| 215848_at | 0 | 0.326241 | 0 | SCAPER |
| 213573_at | 0 | 0 | 0.50859 | KPNB1 |
| NA | NA | NA | NA | GAPDH |
| NA | NA | NA | NA | POLR1C |
| 214582_at | 0 | 0 | 0.0377349 | PDE3B |
| 218700_s_at | 0 | 0.00086067 | 0 | RAB7L1 |
| 203045_at | 0.850903 | 0 | 0 | NINJ1 |
| NA | NA | NA | NA | ZER1 |
| 206133_at | NA | NA | NA | XAF1 |
| 213797_at | NA | NA | NA | RSAD2 |
| 219437_s_at | 0 | 0.405445 | 0.217428 | ANKRD11 |
| NA | NA | NA | NA | FPGS |
| 212947_at | 0.286979 | 0 | 0 | SLC9A8 |
| NA | NA | NA | NA | SOX4 |
| 202145_at | 0 | 0.166043 | 0 | LY6E |
| 213633_at | 1.01336 | 0 | 0 | SH3BP1 |
| NA | NA | NA | NA | DECR1 |
| 210724_at | 0 | 0 | 0.482166 | EMR3 |
| 220122_at | 0.399475 | 0 | 0 | MCTP1 |
| 218400_at | NA | NA | NA | OAS3 |
| 201659_s_at | 0.110991 | 0 | 0 | ARL1 |
| 214326_x_at | 0.698109 | 0 | 0.261075 | JUND |
| NA | NA | NA | NA | MRPS31 |
| 217717_s_at | 0.638943 | 0 | 0 | YWHAB |
| 218095_s_at | 0.00541128 | 0.613773 | 0 | TMEM165 |
| NA | NA | NA | NA | TRAP1 |
| NA | NA | NA | NA | PPIB |
| 219066_at | 0 | 0.221446 | 0 | PPCDC |
| 214022_s_at | 0 | 0 | 0.0380438 | IFITM1 |
| 214453_s_at | NA | NA | NA | IFI44 |
| 215342_s_at | 0.0497241 | 0 | 0 | RABGAP1L |
| 204545_at | 0.342478 | 0 | 0 | PEX6 |

TABLE 1-continued

Preliminary Gene List for TLDA platform Columns are as follows:
Column 1: Affymetrix probeset ID - this was the probeset identified
in the Affy discovery analyses (primary probeset)
Columns 2, 3, 4: estimated coefficients (weights) for contribution
of each probates to the 3 classifiers from Affymetrix weights
Column 5: Gene name

| AFFXProbeSet | Bacterial | Viral | NI | Gene |
|---|---|---|---|---|
| 220935_s_at | 0.170358 | 0 | 0 | CDK5RAP2 |
| 201802_at | 0.00859629 | 0 | 0 | SLC29A1 |
| 202086_at | NA | NA | NA | MX1 |
| 209360_s_at | 0.319632 | 0 | 0 | RUNX1 |
| NA | NA | NA | NA | LY75-CD302 |
| 203275_at | 0 | 0.118256 | 0 | IRF2 |
| NA | NA | NA | NA | MYL10 |
| 203882_at | 0 | 0.0776936 | 0 | IRF9 |
| 206934_at | 0.151959 | 0 | 0 | SIRPB1 |
| 207860_at | 0.376517 | 0 | 0 | NCR1 |
| 207194_s_at | 0.3162 | 0 | 0 | ICAM4 |
| 209396_s_at | 0 | 0 | 0.0355749 | CHI3L1 |
| 204750_s_at | 0.537475 | 0 | 0 | DSC2 |
| 207840_at | 0 | 0.118889 | 0 | CD160 |
| 202411_at | 0.0522361 | 0 | 0 | IFI27 |
| 215184_at | 0 | 0.0650331 | 0 | DAPK2 |
| 202005_at | 0.680527 | 0 | 0 | ST14 |
| 214800_x_at | 0 | 0.103261 | 0 | BTF3 |
| NA | NA | NA | NA | GAPDH |
| 207075_at | 0.0627344 | 0 | 0 | NLRP3 |
| 206026_s_at | NA | NA | NA | TNFAIP6 |
| 219523_s_at | 0 | 0 | 0.07715 | TENM3 |
| 217593_at | 0.0747507 | 0 | 0 | ZSCAN18 |
| 204747_at | NA | NA | NA | IFIT3 |
| 212657_s_at | 0 | 0 | 0.254507 | IL1RN |
| 204972_at | NA | NA | NA | OAS2 |
| 207606_s_at | 0.299775 | 0 | 0 | ARHGAP12 |
| NA | NA | NA | NA | FPGS |
| 205033_s_at | 0 | 0.0878603 | 0 | DEFA3 |
| 219143_s_at | 0.415444 | 0 | 0 | RPP25 |
| 208601_s_at | 0.270581 | 0 | 0 | TUBB1 |
| 216713_at | 0.510039 | 0 | 0 | KRIT1 |
| NA | NA | NA | NA | DECR1 |
| 214617_at | 0.261957 | 0 | 0 | PRF1 |
| 201055_s_at | 0 | 0 | 1.25363 | HNRNPAO |
| 219055_at | 0.0852367 | 0 | 0 | SRBD1 |
| 219130_at | 0 | 0.150771 | 0 | TRMT13 |
| 202644_s_at | 0.340624 | 0 | 0 | TNFAIP3 |
| 205164_at | 0.46638 | 0 | 0 | GCAT |

Further discussion of this example signature for a TLDA platform is provided below in Examples 3 and 4.

This method of determining the etiology of an ARI may be combined with other tests. For example, if the patient is determined to have a viral ARI, a follow-up test may be to determine if influenza A or B can be directly detected or if a host response indicative of such an infection can be detected. Similarly, a follow-up test to a result of bacterial ARI may be to determine if a Gram positive or a Gram negative bacterium can be directly detected or if a host response indicative of such an infection can be detected. In some embodiments, simultaneous testing may be performed to determine the class of infection using the classifiers, and also to test for specific pathogens using pathogen-specific probes or detection methods. See, e.g., US 2015/0284780 to Eley et al. (method for detecting active tuberculosis); US 2014/0323391 to Tsalik et al. (method for classification of bacterial infection).

Methods of Determining a Secondary Classification of an ARI in a Subject

The present disclosure also provides methods of classifying a subject using a secondary classification scheme. Accordingly, another aspect of the present invention provides a method for determining whether an acute respiratory infection (ARI) in a subject is bacterial in origin, viral in origin, or non-infectious in origin comprising, consisting of, or consisting essentially of (a) obtaining a biological sample from the subject; (b) determining the gene expression profile of the subject from the biological sample by evaluating the expression levels of pre-defined sets of genes (i.e., three signatures); (c) normalizing gene expression levels as required for the technology used to make said measurement to generate a normalized value; (d) entering the normalized value into classifiers (i.e., predictors) that have pre-defined weighting values (coefficients) for each of the genes in each signature; (e) comparing the output of the classifiers to pre-defined thresholds, cut-off values, or ranges of values that indicate likelihood of infection; (f) if the sample is negative for bacteria, repeating step (d) using only the viral classifier and non-infectious classifier; and (g) classifying the sample as being of viral etiology or non-infectious illness.

Another aspect of the present provides a method for determining whether an acute respiratory infection (ARI) in a subject is bacterial in origin, viral in origin, or non-infectious in origin comprising, consisting of, or consisting essentially of (a) obtaining a biological sample from the subject; (b) determining the gene expression profile of the subject from the biological sample by evaluating the expression levels of pre-defined sets of genes (i.e., three signatures); (c) normalizing gene expression levels for the technology used to make said measurement to generate a normalized value; (d) entering the normalized value into classifiers (i.e., predictors) that have pre-defined weighting values (coefficients) for each of the genes in each signature; (e) comparing the output of the classifiers to pre-defined thresholds, cut-off values, or ranges of values that indicate likelihood of infection; (f) if the sample is negative for virus, repeating step (d) using only the bacteria classifier and non-infectious classifier; and (g) classifying the sample as being of bacterial etiology or noninfectious illness.

Yet another aspect of the present provides a method for determining whether an acute respiratory infection (ARI) in a subject is bacterial in origin, viral in origin, or non-infectious in origin comprising, consisting of, or consisting essentially of (a) obtaining a biological sample from the subject; (b) determining the gene expression profile of the subject from the biological sample by evaluating the expression levels of pre-defined sets of genes (i.e., three signatures); (c) normalizing gene expression levels for the technology used to make said measurement to generate a normalized value; (d) entering the normalized value into classifiers (i.e., predictors) that have pre-defined weighting values (coefficients) for each of the genes in each signature; (e) comparing the output of the classifiers to pre-defined thresholds, cut-off values, or ranges of values that indicate likelihood of infection; (f) if the sample is negative for non-infectious illness, repeating step (d) using only the viral classifier and bacterial classifier; and (g) classifying the sample as being of viral etiology or bacterial etiology.

In some embodiments, the method further comprises generating a report assigning the patient a score indicating the probability of the etiology of the ARI.

Figure 4:
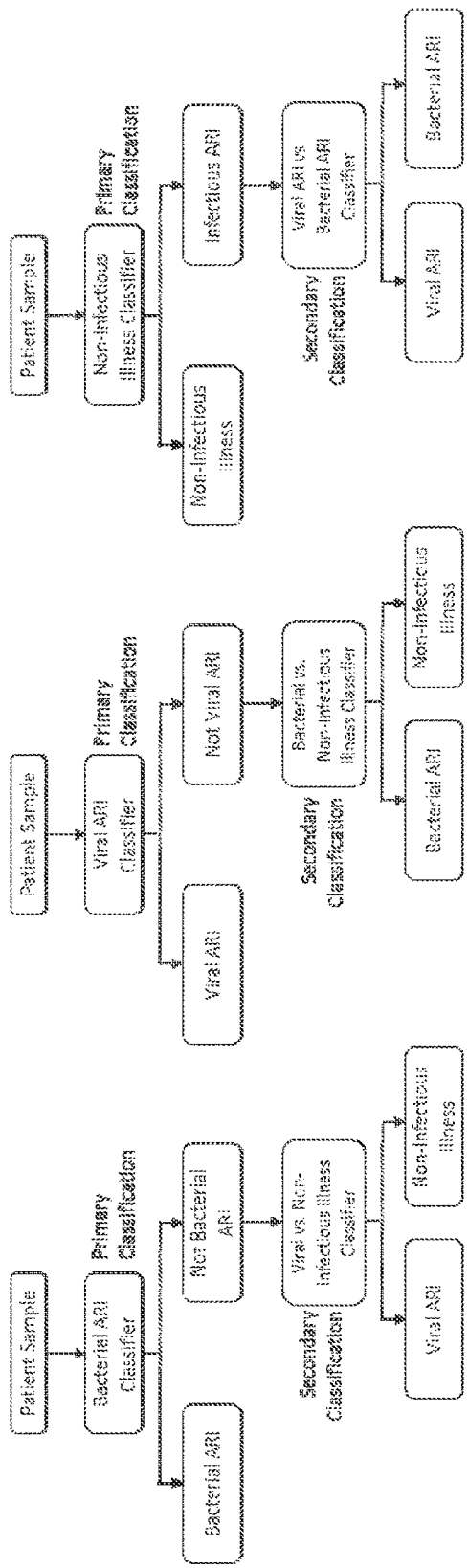
FIG. 4 presents schematics showing the decision pattern for using secondary classification to determine the etiology of an ARI in a subject in accordance with some embodiments of the present disclosure.

Classifying the status of a patient using a secondary classification scheme is shown in FIG. 4. In this example, the bacterial ARI classifier will distinguish between patients with a bacterial ARI from those without a bacterial ARI, which could, instead, be a viral ARI or a non-infectious cause of illness. A secondary classification can then be imposed on those patients with non-bacterial ARI to further discriminate between viral ARI and non-infectious illness. This same process of primary and secondary classification can also be applied to the viral ARI classifier where patients determined not to have a viral infection would then be secondarily classified as having a bacterial ARI or non-infectious cause of illness. Likewise, applying the non-infectious illness classifier as a primary test will determine whether patients have such a non-infectious illness or instead have an infectious cause of symptoms. The secondary classification step would determine if that infectious is due to bacterial or viral pathogens.

Results from the three primary and three secondary classifications can be summed through various techniques by those skilled in the art (such as summation, counts, or average) to produce an actionable report for the provider. In some embodiments, the genes used for this secondary level of classification can be some or all of those presented in Table 2.

In such examples, the three classifiers described above (bacteria classifier, virus classifier and non-infectious illness classifier) are used to perform the $1^{st}$ level classification. Then for those patients with non-bacterial infection, a secondary classifier is defined to distinguish viral ARI from those with non-infectious illness (FIG. 4, left panel). Similarly, for those patients with non-viral infection, a new classifier is used to distinguish viral from non-infectious illness (FIG. 4, middle panel), and for those patients who are not classified as having a non-infectious illness in the first step, a new classifier is used to distinguish between viral and bacterial ARI (FIG. 4, right panel).

In this two-tier method, nine probabilities may be generated, and those probabilities may be combined in a number of ways. Two strategies are described here as a way to reconcile the three sets of predictions, where each has a probability of bacterial ARI, viral ARI, and non-infectious illness. For example: Highest predicted average probability: All predicted probabilities for bacterial ARI are averaged, as are all the predicted probabilities of viral ARI and, similarly, all predicted probabilities of non-infectious illness. The greatest averaged probability denotes the diagnosis.

Greatest number of predictions: Instead of averaging the predicted probabilities of each condition, the number of times a particular diagnosis is predicted for that patient sample (i.e., bacterial ARI, viral ARI or non-infectious illness) is counted. The best-case scenario is when the three classification schemes give the same answer (e.g., bacterial ARI for scheme 1, bacterial ARI for scheme 2, and bacterial ARI for scheme 3). The worst case is that each scheme nominates a different diagnosis, resulting in a 3-way tie.

Using the training set of patient samples previously described, the Result of Tier 1 classification could be, for example (clinical classification presented in rows; diagnostic test prediction presented in columns) similar to that presented in Table 3.

TABLE 3

|  | bacterial | viral | ni | counts | | |
| --- | --- | --- | --- | --- | --- | --- |
| bacterial | 82.8 | 12.8 | 4.2 | 58 | 9 | 3 |
| viral | 3.4 | 90.4 | 6.0 | 4 | 104 | 7 |
| ni | 9.0 | 4.5 | 86.3 | 8 | 4 | 76 |

Following Tier 2 classification using the highest predicted average probability strategy (clinical classification presented in rows; diagnostic test prediction presented in columns), results may be similar to Table 4.

TABLE 4

Mean (average predictions than max):

|  | bacterial | viral | ni | counts | | |
| --- | --- | --- | --- | --- | --- | --- |
| bacterial | 82.8 | 11.4 | 5.7 | 58 | 8 | 4 |
| viral | 1.7 | 91.3 | 6.9 | 2 | 105 | 8 |
| ni | 7.9 | 7.9 | 84.0 | 7 | 7 | 74 |

Following Tier 2 classification using the greatest number of predictions strategy (clinical classification presented in rows; diagnostic test prediction presented in columns), results may be similar to Table 5.

TABLE 5

Max (max predictions then count votes, 7 ties):

|  | bacterial | viral | ni | counts | | |
| --- | --- | --- | --- | --- | --- | --- |
| bacterial | 84.2 | 11.4 | 4.2 | 59 | 8 | 3 |
| viral | 4.3 | 89.5 | 6.0 | 5 | 103 | 7 |
| ni | 11.3 | 7.9 | 80.6 | 10 | 7 | 71 |

Classification can be achieved, for example, as described above, and/or as summarized in Table 2. Table 2 summarizes the gene membership in three distinct classification strategies that solve different diagnostic questions. There are a total of 270 probes that collectively comprise three complex classifiers. The first is referred to as BVS (Bacterial ARI, Viral ARI, SIRS), which is the same as that presented below in Example 1. These probes are the same as those presented in Table 9, which offers probe/gene weights used in classification. They also correspond to the genes presented in Table 10.

The second is referred to as 2L for 2-layer or 2-tier. This is the hierarchical scheme presented in FIG. 4.

The third is a one-tier classification scheme, BVSH, which is similar to BVS but also includes a population of healthy controls (similarly described in Example 1). This group has been shown to be a poor control for non-infection, but there are use cases in which discrimination from healthy may be clinically important. For example, this can include the serial measurement of signatures to correlate with convalescence. It may also be used to discriminate patients who have been exposed to an infectious agent and are presymptomatic vs. asymptomatic. In the BVSH scheme, four groups are represented in the training cohort—those with bacterial ARI, viral ARI, SIRS (non-infectious illness), and Healthy. These four groups are used to generate four distinct signatures that distinguish each class from all other possibilities.

Table 2 Legend:
  Probe=Affymetrix probe ID
  BVS=Three-classifier model trained on patients with Bacterial ARI, Viral ARI, and Non-Infectious Illness (with respiratory symptoms). 1 denotes this probe is included in this three-classifier model. 0 denotes the probe is not present in this classification scheme.
  BVS-BO=Genes or probes included in the Bacterial ARI classifier as part of the BVS classification scheme. This classifier specifically discriminates patients with bacterial ARI from other etiologies (viral ARI or or 10)
  BVS-VO=As for BVS-BO except this column identifies genes included in the Viral ARI classifier. This classifier specifically discriminates patients with viral ARI from other etiologies (bacterial ARI or non-infectious illness)

BVS-SO=As for BVS-BO or BVS-VO, except this column identifies genes included in the non-infectious illness classifier. This classifier specifically discriminates patients with non-infectious illness from other etiologies (bacterial or viral ARI)

2L refers to the two-tier hierarchical classification scheme. A 1 in this column indicates the specified probe or gene was included in the classification task. This 2-tier classification scheme is itself comprised of three separate tiered tasks. The first applies a one vs. others, where one can be Bacterial ARI, Viral ARI, or non-infectious illness. If a given subject falls into the "other" category, a $2^{nd}$ tier classification occurs that distinguishes between the remaining possibilities. 2L-SO is the $1^{st}$ tier for a model that determines with a given subject has a non-infectious illness or not, followed by SL-BV which discriminates between bacterial and viral ARI as possibilities. A 1 in these columns indicates that gene or probe are included in that specified classification model. 2L-BO and 2L-VS make another 2-tier classification scheme. 2L-VO and 2L-SB comprise the $3^{rd}$ model in the 2-tier classification scheme.

Finally, BVSH refers to a one-level classification scheme that includes healthy individuals in the training cohort and therefore includes a classifier for the healthy state as compared to bacterial ARI, viral ARI, or non-infectious illness. The BVSH column identifies any gene or probe included in this classification scheme. This scheme is itself comprised by BVSH-BO, BVSH-VO, BVSH-SO, and BVSH-HO with their respective probe/gene compositions denoted by '1' in these columns.

Table 2 provides a summary of use of members of the gene sets for viral, bacterial, and non-infectious illness classifiers that are constructed according to the required task. A '1' indicates membership of the gene in the classifier.

TABLE 2

| Affymetrix Probe ID | BVS | BVS-BO | BVS-VO | BVS-SO | 2L | 2L-SO | 2L-BV | 2L-BO | 2L-VS | 2L-VO | 2L-SB | BVSH | BVSH-BO | BVSH-VO | BVSH-SO | BVSH-HO | Gene Symbol | RefSeq ID | Gene Name |
|---|---|---|---|---|---|---|---|---|---|---|---|---|---|---|---|---|---|---|---|
| 200042_at | 1 | 0 | 1 | 0 | 1 | 0 | 0 | 0 | 0 | 1 | 0 | 0 | 0 | 0 | 0 | 0 | HSPC117 | NM_014306 | chromosome 22 open reading frame 28 |
| 200073_s_at | 0 | 0 | 0 | 0 | 1 | 0 | 0 | 0 | 0 | 0 | 0 | 1 | 0 | 0 | 0 | 1 | HNRPD | NM_031369; NM_001003810; NM_031370; NM_002138 | heterogeneous nuclear ribonucleoprotein D (AU-rich element RNA binding protein 1, 37 kDa) |
| 200602_at | 0 | 0 | 0 | 0 | 0 | 0 | 0 | 0 | 0 | 0 | 0 | 1 | 0 | 0 | 0 | 1 | APP | NM_000484; NM_201414; NM_001136131; NM_201413; NM_001136130; NM_001136016; NM_001136129 | amyloid beta (A4) precursor protein |
| 200663_at | 0 | 0 | 0 | 0 | 1 | 0 | 1 | 0 | 0 | 0 | 0 | 0 | 0 | 0 | 0 | 0 | CD63 | NM_001780; NM_001040034 | CD63 molecule |
| 200709_at | 0 | 0 | 0 | 0 | 0 | 0 | 0 | 0 | 1 | 0 | 0 | 0 | 0 | 0 | 0 | 0 | FKB1A | NM_000801; NM_054014 | FK506 binding protein 1A, 12 kDa |
| 200947_s_at | 1 | 1 | 0 | 0 | 1 | 0 | 0 | 1 | 0 | 0 | 0 | 0 | 0 | 0 | 0 | 0 | GLUD1 | NM_005271 | glutamate dehydrogenase 1 |
| 201055_s_at | 1 | 0 | 1 | 0 | 1 | 1 | 1 | 0 | 0 | 1 | 0 | 1 | 0 | 0 | 1 | 0 | HNRPAO | NM_006805 | heterogeneous nuclear ribonucleoprotein A0 |
| 201162_at | 0 | 0 | 0 | 0 | 0 | 0 | 0 | 0 | 0 | 0 | 0 | 1 | 0 | 0 | 0 | 1 | IGFBP7 | NM_001553 | insulin-like growth factor binding protein 7 |
| 201166_at | 0 | 0 | 0 | 0 | 0 | 0 | 0 | 0 | 0 | 0 | 0 | 1 | 0 | 0 | 0 | 1 | PUM1 | NM_014676; NM_001020658 | pumilio homolog 1 (Drosophila) |
| 201188_s_at | 1 | 1 | 0 | 0 | 1 | 0 | 0 | 1 | 0 | 0 | 0 | 0 | 0 | 0 | 0 | 0 | ITPR3 | NM_002224 | inositol 1,4,5-triphosphate receptor, type 3 |
| 201341_at | 1 | 1 | 0 | 0 | 1 | 0 | 0 | 1 | 0 | 0 | 0 | 0 | 0 | 0 | 0 | 0 | ENC1 | NM_003633 | ectodermal-neural cortex (with BTB-like domain) |
| 201369_s_at | 0 | 0 | 0 | 0 | 0 | 0 | 0 | 0 | 0 | 0 | 0 | 1 | 0 | 0 | 0 | 1 | ZFP36L2 | NM_006887 | zinc finger protein 36, C3H type-like 2 |
| 201392_s_at | 0 | 0 | 0 | 0 | 0 | 0 | 0 | 0 | 0 | 0 | 0 | 0 | 0 | 0 | 1 | 0 | IGF2R | NM_000876 | insulin-like growth factor 2 receptor |
| 201454_s_at | 0 | 0 | 0 | 0 | 0 | 0 | 0 | 0 | 0 | 0 | 0 | 1 | 0 | 0 | 1 | 0 | NPEPPS | NM_006310; XM_001725441; XM_001725426 | hypothetical protein FLJ11822; aminopeptidase puromycin sensitive |
| 201464_x_at | 0 | 0 | 0 | 0 | 0 | 0 | 0 | 0 | 0 | 0 | 0 | 1 | 0 | 1 | 0 | 0 | JUN | NM_002228 | jun oncogene |
| 201601_x_at | 0 | 0 | 0 | 0 | 0 | 0 | 0 | 0 | 0 | 1 | 0 | 0 | 0 | 0 | 0 | 1 | IFITM1 | NM_003641 | interferon induced transmembrane protein 1 (9-27) |
| 201651_s_at | 0 | 0 | 0 | 0 | 0 | 0 | 0 | 0 | 0 | 0 | 0 | 1 | 0 | 0 | 0 | 1 | PACSIN2 | NM_007229 | protein kinase C and casein kinase substrate in neurons 2 |
| 201659_s_at | 0 | 0 | 0 | 0 | 0 | 0 | 0 | 0 | 0 | 1 | 0 | 1 | 0 | 0 | 0 | 0 | ARL1 | NM_001177 | ADP-ribosylation factor-like 1 |
| 201802_at | 0 | 0 | 0 | 0 | 1 | 0 | 1 | 0 | 0 | 0 | 0 | 0 | 0 | 0 | 0 | 0 | SLC29A1 | NM_001078176; NM_001078177; NM_001078175; NM_004955; NM_001078174 | solute carrier family 29 (nucleoside transporters), member 1 |
| 201890_at | 0 | 0 | 0 | 0 | 0 | 0 | 1 | 0 | 0 | 0 | 0 | 0 | 0 | 0 | 0 | 0 | RRM2 | NM_001034; NM_001165931 | ribonucleotide reductase M2 polypeptide |
| 201949_x_at | 0 | 0 | 0 | 0 | 0 | 0 | 0 | 0 | 0 | 0 | 0 | 0 | 0 | 0 | 0 | 0 | CAPZB | NM_004930 | capping protein (actin filament) muscle Z-line, beta |
| 201952_at | 0 | 0 | 0 | 1 | 0 | 0 | 0 | 0 | 0 | 0 | 0 | 1 | 0 | 1 | 0 | 0 | ALCAM | XM_001720217 | hypothetical protein LOC100133690; activated leukocyte cell adhesion molecule |
| 201972_at | 0 | 0 | 0 | 0 | 0 | 0 | 0 | 0 | 0 | 0 | 0 | 0 | 1 | 0 | 0 | 1 | ATP6V1A | NM_001690 | ATPase, H+ transporting, lysosomal 70 kDa, V1 subunit A |

TABLE 2-continued

| Affymetrix Probe ID | BVS | BVS-BO | BVS-VO | BVS-SO | 2L | 2L-SO | 2L-BV | 2L-BO | 2L-VS | 2L-VO | 2L-SB | BVSH | BVSH-BO | BVSH-VO | BVSH-SO | BVSH-HO | Gene Symbol | RefSeq ID | Gene Name |
|---|---|---|---|---|---|---|---|---|---|---|---|---|---|---|---|---|---|---|---|
| 201992_s_at | 0 | 0 | 0 | 0 | 0 | 0 | 0 | 0 | 0 | 0 | 0 | 1 | 0 | 0 | 1 | 0 | KIF5B | NM_004521 | kinesin family member 5B |
| 202005_at | 1 | 1 | 0 | 0 | 1 | 0 | 1 | 1 | 0 | 0 | 0 | 1 | 1 | 0 | 1 | 0 | ST14 | NM_021978 | suppression of tumorigenicity 14 (colon carcinoma) |
| 202083_s_at | 0 | 0 | 0 | 0 | 0 | 0 | 0 | 0 | 0 | 0 | 0 | 1 | 0 | 0 | 0 | 1 | SEC14L1 | NM_001143998; NM_001039573; NM_001144001; NM_001143999; NM_003003 | SEC14-like 1 (S. cerevisiae); SEC14-like 1 pseudogene |
| 202090_s_at | 0 | 0 | 0 | 0 | 0 | 0 | 0 | 0 | 0 | 0 | 0 | 1 | 0 | 1 | 0 | 0 | UQCR | NM_006830 | ubiquinol-cytochrome c reductase, 6.4 kDa subunit |
| 202145_at | 1 | 0 | 1 | 0 | 1 | 0 | 0 | 1 | 0 | 1 | 0 | 1 | 1 | 1 | 0 | 0 | LY6E | NM_002346; NM_001127213 | lymphocyte antigen 6 complex, locus E |
| 202160_at | 0 | 0 | 0 | 0 | 0 | 0 | 0 | 0 | 0 | 0 | 0 | 1 | 0 | 0 | 0 | 1 | CREBBP | NM_004380; NM_001079846 | CREB binding protein |
| 202266_at | 0 | 0 | 0 | 0 | 1 | 0 | 1 | 0 | 0 | 0 | 0 | 0 | 0 | 0 | 0 | 0 | TTRAP | NM_016614 | TRAF and TNF receptor associated protein |
| 202284_s_at | 1 | 1 | 0 | 0 | 1 | 0 | 0 | 1 | 0 | 0 | 0 | 0 | 0 | 0 | 0 | 0 | CDKN1A | NM_078467; NM_000389 | cyclin-dependent kinase inhibitor 1A (p21, Cip1) |
| 202411_at | 1 | 1 | 0 | 0 | 0 | 0 | 0 | 1 | 0 | 0 | 0 | 1 | 0 | 1 | 1 | 0 | IFI27 | NM_005532; NM_001130080 | interferon, alpha-inducible protein 27 |
| 202505_at | 0 | 0 | 0 | 0 | 1 | 0 | 0 | 1 | 0 | 0 | 0 | 0 | 0 | 0 | 0 | 0 | SNRPB2 | NM_003092; NM_198220 | small nuclear ribonucleoprotein polypeptide B" |
| 202509_s_at | 1 | 0 | 0 | 0 | 1 | 1 | 0 | 0 | 0 | 0 | 0 | 0 | 0 | 0 | 1 | 0 | TNFAIP2 | NM_006291 | tumor necrosis factor, alpha-induced protein 2 |
| 202579_x_at | 0 | 0 | 0 | 1 | 0 | 0 | 0 | 0 | 1 | 0 | 0 | 1 | 0 | 1 | 0 | 0 | HMGN4 | NM_006353 | high mobility group nucleosomal binding domain 4 |
| 202589_at | 0 | 0 | 0 | 0 | 0 | 0 | 0 | 0 | 0 | 0 | 0 | 1 | 0 | 0 | 1 | 0 | TYMS | NM_001071 | thymidylate synthetase |
| 202617_s_at | 0 | 0 | 0 | 0 | 1 | 0 | 0 | 0 | 0 | 1 | 0 | 0 | 0 | 0 | 1 | 0 | MECP2 | NM_001110792; NM_004992 | methyl CpG binding protein 2 (Rett syndrome) |
| 202644_s_at | 1 | 1 | 0 | 0 | 1 | 0 | 1 | 0 | 0 | 0 | 0 | 0 | 0 | 0 | 0 | 0 | TNFAIP3 | NM_006290 | tumor necrosis factor, alpha-induced protein 3 |
| 202679_at | 0 | 0 | 0 | 0 | 0 | 0 | 0 | 1 | 0 | 1 | 0 | 0 | 1 | 0 | 0 | 0 | NPC1 | NM_000271 | Niemann-Pick disease, type C1 |
| 202688_at | 1 | 0 | 1 | 0 | 1 | 0 | 0 | 0 | 1 | 0 | 0 | 0 | 0 | 0 | 0 | 0 | TNFSF10 | NM_003810 | tumor necrosis factor (ligand) superfamily, member 10 |
| 202709_at | 1 | 1 | 0 | 0 | 0 | 0 | 1 | 1 | 0 | 0 | 0 | 1 | 1 | 0 | 0 | 0 | FMOD | NM_002023 | fibromodulin |
| 202720_at | 0 | 0 | 1 | 0 | 0 | 0 | 1 | 0 | 0 | 1 | 0 | 0 | 0 | 0 | 0 | 0 | TES | NM_152829; NM_015641 | testis derived transcript (3 LIM domains) |
| 202748_at | 0 | 0 | 0 | 0 | 1 | 1 | 0 | 0 | 1 | 0 | 0 | 1 | 0 | 0 | 0 | 0 | GBP2 | NM_004120 | guanylate binding protein 2, interferon-inducible |
| 202864_s_at | 1 | 0 | 0 | 0 | 1 | 0 | 0 | 0 | 0 | 0 | 0 | 1 | 0 | 1 | 0 | 0 | SP100 | NM_003113; NM_001080391 | SP100 nuclear antigen |
| 202973_x_at | 1 | 1 | 0 | 0 | 0 | 0 | 1 | 0 | 0 | 0 | 0 | 0 | 0 | 0 | 0 | 0 | FAM13A1 | NM_014883; NM_001015045 | family with sequence similarity 13, member A |
| 203023_at | 0 | 1 | 1 | 0 | 0 | 0 | 0 | 0 | 0 | 0 | 0 | 0 | 1 | 1 | 0 | 0 | HSPC111 | NM_016391 | NOP16 nucleolar protein homolog (yeast) |
| 203045_at | 1 | 1 | 0 | 0 | 1 | 0 | 1 | 1 | 0 | 0 | 0 | 1 | 1 | 0 | 0 | 0 | NINJ1 | NM_004148 | ninjurin 1 |
| 203153_at | 1 | 0 | 0 | 0 | 1 | 0 | 0 | 0 | 0 | 0 | 0 | 1 | 1 | 0 | 0 | 0 | IFIT1 | NM_001548 | interferon-induced protein with tetratricopeptide repeats 1 |
| 203275_at | 1 | 0 | 1 | 0 | 1 | 0 | 0 | 0 | 1 | 0 | 0 | 0 | 0 | 0 | 0 | 0 | IRF2 | NM_002199 | interferon regulatory factor 2 |
| 203290_at | 0 | 0 | 0 | 0 | 1 | 0 | 1 | 0 | 0 | 0 | 0 | 0 | 0 | 0 | 0 | 0 | HLA-DQA1 | NM_002122; XM_001719804; XM_001129369; XM_001722105 | similar to hCG2042724; similar to HLA class II histocompatibility antigen, DQ(1) alpha chain precursor (DC-4 alpha chain); major histocompatibility complex, class II, DQ alpha 1 |

TABLE 2-continued

| Affymetrix Probe ID | BVS | BVS-BO | BVS-VO | BVS-SO | 2L | 2L-SO | 2L-BV | 2L-BO | 2L-VS | 2L-VO | 2L-SB | BVSH | BVSH-BO | BVSH-VO | BVSH-SO | BVSH-HO | Gene Symbol | RefSeq ID | Gene Name |
|---|---|---|---|---|---|---|---|---|---|---|---|---|---|---|---|---|---|---|---|
| 203313_s_at | 1 | 1 | 0 | 0 | 1 | 0 | 0 | 1 | 0 | 0 | 1 | 1 | 1 | 0 | 0 | 0 | TGIF | NM_173211; NM_173210; NM_003244; NM_174886; NM_173209; NM_173208; NM_173207; NM_170695 | TGFB-induced factor homeobox 1 |
| 203392_s_at | 0 | 0 | 1 | 0 | 0 | 0 | 0 | 0 | 1 | 0 | 0 | 0 | 0 | 0 | 0 | 0 | CTBP1 | NM_001328; NM_001012614 | C-terminal binding protein 1 |
| 203414_at | 0 | 0 | 0 | 0 | 0 | 0 | 0 | 0 | 0 | 0 | 0 | 1 | 0 | 0 | 0 | 1 | MMD | NM_012329 | monocyte to macrophage differentiation-associated |
| 203455_s_at | 1 | 0 | 0 | 1 | 1 | 1 | 0 | 0 | 1 | 0 | 0 | 0 | 0 | 0 | 0 | 0 | SAT | NM_002970 | spermidine/spermine N1-acetyltransferase 1 |
| 203570_at | 0 | 0 | 0 | 0 | 0 | 0 | 0 | 0 | 0 | 0 | 0 | 1 | 1 | 0 | 0 | 0 | LOXL1 | NM_005576 | lysyl oxidase-like 1 |
| 203615_x_at | 0 | 0 | 0 | 0 | 0 | 0 | 0 | 1 | 0 | 0 | 0 | 1 | 0 | 0 | 1 | 0 | SULT1A1 | NM_177529; NM_177530; NM_177534; NM_001055; NM_177536 | sulfotransferase family, cytosolic, 1A, phenol-preferring, member 1 |
| 203633_at | 0 | 0 | 0 | 0 | 0 | 0 | 0 | 0 | 0 | 0 | 0 | 1 | 0 | 1 | 0 | 1 | CPT1A | NM_001876; NM_001031847 | carnitine palmitoyltransferase 1A (liver) |
| 203717_at | 0 | 0 | 0 | 0 | 0 | 0 | 0 | 1 | 0 | 0 | 0 | 1 | 0 | 0 | 0 | 1 | DPP4 | NM_001935 | dipeptidyl-peptidase 4 |
| 203882_at | 1 | 0 | 1 | 0 | 1 | 1 | 0 | 0 | 1 | 0 | 0 | 0 | 0 | 0 | 0 | 0 | ISGF3G | NM_006084 | interferon regulatory factor 9 |
| 203940_s_at | 0 | 0 | 0 | 1 | 0 | 0 | 0 | 0 | 0 | 0 | 0 | 1 | 0 | 0 | 1 | 0 | VASH1 | NM_014909 | vasohibin 1 |
| 203979_at | 1 | 0 | 0 | 1 | 1 | 1 | 1 | 1 | 0 | 0 | 0 | 1 | 0 | 0 | 0 | 0 | CYP27A1 | NM_000784 | cytochrome P450, family 27, subfamily A, polypeptide 1 |
| 204069_at | 0 | 0 | 0 | 0 | 0 | 0 | 0 | 0 | 0 | 0 | 0 | 1 | 1 | 0 | 0 | 1 | MEIS1 | NM_002398 | Meis homeobox 1 |
| 204392_at | 1 | 0 | 1 | 1 | 0 | 0 | 0 | 0 | 0 | 1 | 0 | 1 | 0 | 1 | 0 | 0 | CAMK1 | NM_003656 | calcium/calmodulin-dependent protein kinase I |
| 204490_s_at | 1 | 1 | 0 | 1 | 1 | 0 | 0 | 1 | 0 | 0 | 0 | 0 | 0 | 0 | 0 | 0 | CD44 | NM_000610; NM_001001389; NM_001001390; NM_001001391; NM_001001392 | CD44 molecule (Indian blood group) |
| 204545_at | 1 | 1 | 0 | 0 | 0 | 0 | 1 | 1 | 0 | 0 | 0 | 0 | 0 | 0 | 0 | 0 | PEX6 | NM_000287 | peroxisomal biogenesis factor 6 |
| 204592_at | 0 | 0 | 0 | 0 | 0 | 0 | 0 | 0 | 0 | 0 | 0 | 1 | 0 | 0 | 0 | 1 | DLG4 | NM_001365 | discs, large homolog 4 (Drosophila) |
| 204647_at | 0 | 0 | 0 | 0 | 1 | 0 | 1 | 0 | 0 | 0 | 0 | 0 | 0 | 0 | 0 | 0 | HOMER3 | NM_001145724; NM_004838; NM_001145722; NM_001145721 | homer homolog 3 (Drosophila) |
| 204724_s_at | 0 | 0 | 0 | 0 | 0 | 0 | 0 | 0 | 0 | 0 | 0 | 1 | 0 | 0 | 1 | 0 | COL9A3 | NM_001853 | collagen, type IX, alpha 3 |
| 204750_s_at | 0 | 1 | 0 | 0 | 0 | 0 | 0 | 1 | 0 | 0 | 0 | 1 | 1 | 0 | 0 | 0 | DSC2 | NM_004949; NM_024422 | desmocollin 2 |
| 204853_at | 0 | 0 | 0 | 0 | 1 | 0 | 1 | 0 | 0 | 0 | 0 | 0 | 0 | 0 | 0 | 0 | ORC2L | NM_006190 | origin recognition complex, subunit 2-like (yeast) |
| 204858_s_at | 0 | 0 | 0 | 0 | 0 | 0 | 0 | 0 | 0 | 0 | 0 | 1 | 0 | 0 | 0 | 1 | ECGF1 | NM_001953; NM_001113755; NM_001113756 | thymidine phosphorylase |
| 204981_at | 0 | 0 | 0 | 0 | 1 | 0 | 0 | 0 | 0 | 0 | 0 | 0 | 0 | 0 | 0 | 0 | SLC22A18 | NM_002555; NM_183233 | solute carrier family 22, member 18 |
| 205001_s_at | 1 | 0 | 1 | 0 | 1 | 1 | 0 | 0 | 0 | 1 | 0 | 1 | 1 | 0 | 1 | 0 | DDX3Y | NM_001122665; NM_004660 | DEAD (Asp-Glu-Ala-Asp) box polypeptide 3, Y-linked |

TABLE 2-continued

| Affymetrix Probe ID | BVS | BVS-BO | BVS-VO | BVS-SO | 2L | 2L-SO | 2L-BV | 2L-BO | 2L-VS | 2L-VO | 2L-SB | BVSH | BVSH-BO | BVSH-VO | BVSH-SO | BVSH-HO | Gene Symbol | RefSeq ID | Gene Name |
|---|---|---|---|---|---|---|---|---|---|---|---|---|---|---|---|---|---|---|---|
| 205008_s_at | 1 | 0 | 1 | 0 | 1 | 0 | 0 | 0 | 0 | 1 | 0 | 0 | 0 | 0 | 0 | 0 | CIB2 | NM_006383 | calcium and integrin binding family member 2 |
| 205033_s_at | 1 | 0 | 1 | 0 | 1 | 0 | 0 | 0 | 1 | 1 | 0 | 1 | 0 | 1 | 0 | 0 | DEFA1 /// DEFA3 | NM_004084; NM_001042500 | defensin, alpha 1 |
| 205048_s_at | 1 | 1 | 0 | 0 | 1 | 0 | 0 | 1 | 0 | 0 | 0 | 0 | 0 | 0 | 0 | 0 | PSPH | NM_004577 | phosphoserine phosphatase-like; phosphoserine phosphatase |
| 205053_at | 0 | 0 | 0 | 0 | 0 | 0 | 0 | 0 | 0 | 0 | 0 | 1 | 0 | 1 | 0 | 0 | PRIM1 | NM_000946 | primase, DNA, polypeptide 1 (49 kDa) |
| 205098_at | 1 | 1 | 0 | 0 | 1 | 0 | 0 | 1 | 0 | 0 | 0 | 0 | 0 | 0 | 0 | 0 | CCR1 | NM_001295 | chemokine (C-C motif) receptor 1 |
| 205153_s_at | 1 | 1 | 0 | 1 | 1 | 0 | 0 | 1 | 0 | 0 | 0 | 0 | 0 | 0 | 0 | 0 | CD40 | NM_152854; NM_001250 | CD40 molecule, TNF receptor superfamily member 5 |
| 205164_at | 1 | 1 | 0 | 0 | 1 | 1 | 0 | 0 | 0 | 0 | 0 | 0 | 0 | 0 | 0 | 0 | GCAT | NM_014291; NM_001171690 | glycine C-acetyltransferase (2-amino-3-ketobutyrate coenzyme A ligase) |
| 205200_at | 1 | 1 | 0 | 0 | 1 | 1 | 1 | 0 | 0 | 0 | 0 | 0 | 0 | 0 | 0 | 0 | CLEC3B | NM_003278 | C-type lectin domain family 3, member B |
| 205312_at | 1 | 0 | 0 | 1 | 1 | 1 | 0 | 0 | 0 | 0 | 0 | 1 | 0 | 0 | 1 | 0 | SPI1 | NM_001080547; NM_003120 | spleen focus forming virus (SFFV) proviral integration oncogene spi1 |
| 205376_at | 0 | 0 | 0 | 0 | 0 | 0 | 0 | 1 | 0 | 0 | 0 | 1 | 0 | 0 | 1 | 0 | INPP4B | NM_003866; NM_001101669 | inositol polyphosphate-4-phosphatase, type II, 105 kDa |
| 205382_s_at | 0 | 0 | 0 | 0 | 0 | 0 | 0 | 0 | 0 | 0 | 0 | 1 | 1 | 0 | 1 | 0 | DF | NM_001928 | complement factor D (adipsin) |
| 205826_at | 0 | 0 | 0 | 0 | 1 | 0 | 0 | 0 | 0 | 0 | 0 | 0 | 0 | 1 | 0 | 0 | MYOM2 | NM_003970 | myomesin (M-protein) 2, 165 kDa |
| 206005_s_at | 0 | 0 | 0 | 0 | 0 | 0 | 0 | 0 | 0 | 0 | 0 | 1 | 1 | 0 | 0 | 1 | C6orf84 | NM_014895 | KIAA1009 |
| 206035_at | 0 | 0 | 0 | 1 | 1 | 0 | 1 | 0 | 0 | 0 | 1 | 1 | 1 | 0 | 1 | 0 | REL | NM_002908 | v-rel reticuloendotheliosis viral oncogene homolog (avian) |
| 206082_at | 0 | 0 | 0 | 0 | 0 | 0 | 0 | 0 | 0 | 0 | 0 | 0 | 1 | 0 | 0 | 0 | | NM_006674 | HLA complex P5 |
| 206207_at | 1 | 1 | 0 | 1 | 0 | 1 | 0 | 1 | 0 | 0 | 0 | 1 | 0 | 0 | 0 | 0 | CLC | NM_001828 | Charcot-Leyden crystal protein |
| 206214_at | 0 | 0 | 0 | 0 | 0 | 0 | 0 | 0 | 0 | 0 | 0 | 1 | 1 | 0 | 0 | 0 | PLA2G7 | NM_001168357 | phospholipase A2, group VII (platelet-activating factor acetylhydrolase, plasma) |
| 206371_at | 1 | 1 | 0 | 0 | 1 | 0 | 0 | 1 | 0 | 0 | 0 | 0 | 0 | 0 | 0 | 0 | FOLR3 | NM_000804 | folate receptor 3 (gamma) |
| 206508_at | 0 | 0 | 0 | 0 | 0 | 0 | 0 | 1 | 0 | 0 | 0 | 1 | 0 | 0 | 0 | 1 | TNFSF7 | NM_001252 | CD70 molecule |
| 206558_at | 0 | 0 | 0 | 0 | 1 | 1 | 0 | 1 | 0 | 0 | 0 | 0 | 0 | 0 | 0 | 0 | SIM2 | NM_009586; NM_005069 | single-minded homolog 2 (Drosophila) |
| 206647_at | 1 | 1 | 0 | 0 | 1 | 0 | 1 | 1 | 1 | 0 | 0 | 1 | 1 | 0 | 0 | 0 | HBZ | NM_005332 | hemoglobin, zeta |
| 206676_at | 0 | 0 | 0 | 1 | 1 | 1 | 0 | 0 | 0 | 0 | 0 | 0 | 0 | 0 | 1 | 0 | CEACAM8 | NM_001816 | carcinoembryonic antigen-related cell adhesion molecule 8 |
| 206734_at | 0 | 0 | 1 | 0 | 0 | 0 | 0 | 0 | 0 | 0 | 0 | 1 | 0 | 1 | 0 | 0 | JRKL | NM_003772 | jerky homolog-like (mouse) |
| 206896_s_at | 1 | 1 | 0 | 0 | 1 | 0 | 1 | 1 | 0 | 0 | 0 | 0 | 0 | 0 | 0 | 0 | GNG7 | NM_052847 | guanine nucleotide binding protein (G protein), gamma 7 |
| 206918_s_at | 1 | 1 | 0 | 0 | 0 | 0 | 0 | 1 | 0 | 0 | 0 | 1 | 1 | 0 | 0 | 0 | CPNE1 | NM_152929; NM_152928; NM_152927; NM_003915; NM_152931; NM_152930; NM_006047; NM_152925; NM_152926; NM_152838 | RNA binding motif protein 12; copine I |
| 206934_at | 1 | 1 | 0 | 0 | 0 | 0 | 0 | 0 | 0 | 0 | 0 | 0 | 0 | 0 | 0 | 0 | SIRPB1 | NM_001135844; NM_006065; NM_001083910 | signal-regulatory protein beta 1 |
| 207008_at | 0 | 0 | 0 | 0 | 0 | 0 | 0 | 0 | 0 | 0 | 1 | 0 | 0 | 1 | 0 | 0 | IL8RB | NM_001168298; NM_001557 | interleukin 8 receptor, beta |

TABLE 2-continued

| Affymetrix Probe ID | BVS | BVS-BO | BVS-VO | BVS-SO | 2L | 2L-SO | 2L-BV | 2L-BO | 2L-VS | 2L-VO | 2L-SB | BVSH | BVSH-BO | BVSH-VO | BVSH-SO | BVSH-HO | Gene Symbol | RefSeq ID | Gene Name |
|---|---|---|---|---|---|---|---|---|---|---|---|---|---|---|---|---|---|---|---|
| 207075_at | 1 | 1 | 0 | 0 | 1 | 0 | 0 | 1 | 0 | 0 | 0 | 0 | 0 | 0 | 0 | 0 | CIAS1 | NM_004895; NM_001079821; NM_001127462; NM_001127461; NM_183395 | NLR family, pyrin domain containing 3 |
| 207194_s_at | 1 | 1 | 0 | 0 | 1 | 0 | 0 | 1 | 0 | 0 | 0 | 0 | 0 | 0 | 0 | 0 | ICAM4 | NM_022377; NM_001544; NM_001039132 | intercellular adhesion molecule 4 (Landsteiner-Wiener blood group) |
| 207244_x_at | 1 | 1 | 0 | 0 | 1 | 0 | 1 | 1 | 0 | 0 | 0 | 1 | 1 | 0 | 0 | 0 | CYP2A6 | NM_000762 | cytochrome P450, family 2, subfamily A, polypeptide 6 |
| 207306_at | 0 | 0 | 0 | 0 | 0 | 0 | 0 | 0 | 0 | 0 | 0 | 1 | 0 | 1 | 0 | 0 | TCF15 | NM_004609 | transcription factor 15 (basic helix-loop-helix) |
| 207436_x_at | 1 | 0 | 1 | 0 | 1 | 0 | 0 | 0 | 0 | 1 | 0 | 1 | 0 | 1 | 0 | 0 | KIAA0894 | | ambiguous (pending) |
| 207536_s_at | 0 | 0 | 0 | 0 | 1 | 0 | 1 | 1 | 0 | 0 | 0 | 0 | 0 | 0 | 0 | 0 | TNFRSF9 | NM_001561 | tumor necrosis factor receptor superfamily, member 9 |
| 207606_s_at | 1 | 1 | 0 | 0 | 1 | 0 | 1 | 1 | 0 | 0 | 0 | 1 | 1 | 0 | 0 | 0 | ARHGAP12 | NM_018287 | Rho GTPase activating protein 12 |
| 207718_x_at | 1 | 1 | 0 | 0 | 1 | 0 | 0 | 1 | 0 | 0 | 0 | 0 | 0 | 1 | 0 | 0 | CYP2A6///CYP2A7///CYP2A7P1///CYP2A13 | NM_000764; NM_030589 | cytochrome P450, family 2, subfamily A, polypeptide 7 |
| 207721_x_at | 0 | 0 | 0 | 0 | 0 | 0 | 0 | 0 | 0 | 0 | 0 | 1 | 0 | 0 | 1 | 0 | HINT1 | NM_005340 | histidine triad nucleotide binding protein 1 |
| 207808_s_at | 0 | 0 | 0 | 0 | 1 | 0 | 1 | 0 | 0 | 1 | 0 | 0 | 0 | 0 | 0 | 0 | PROS1 | NM_000313 | protein S (alpha) |
| 207840_at | 1 | 0 | 1 | 0 | 1 | 0 | 0 | 0 | 1 | 1 | 0 | 1 | 0 | 1 | 0 | 0 | CD160 | NM_007053 | CD160 molecule |
| 207860_at | 1 | 1 | 0 | 0 | 0 | 0 | 0 | 1 | 0 | 0 | 0 | 1 | 1 | 0 | 0 | 0 | NCR1 | NM_001145457; NM_001145458; NM_004829 | natural cytotoxicity triggering receptor 1 |
| 207983_s_at | 0 | 0 | 0 | 0 | 0 | 0 | 0 | 0 | 0 | 0 | 0 | 1 | 0 | 0 | 0 | 1 | STAG2 | NM_006603; NM_001042749; NM_001042751; NM_001042750 | stromal antigen 2 |
| 208029_s_at | 1 | 1 | 0 | 1 | 1 | 1 | 1 | 1 | 0 | 0 | 0 | 1 | 1 | 0 | 1 | 0 | LAPTM4B | NM_018407 | lysosomal protein transmembrane 4 beta |
| 208241_at | 0 | 0 | 0 | 0 | 0 | 0 | 0 | 0 | 0 | 0 | 0 | 1 | 0 | 0 | 1 | 0 | NRG1 | NM_001160001; NM_001159995; NM_001160007; NM_001160008; NM_001159996; NM_001159999; NM_001160002; NM_001160004; NM_001160005; NM_000495; NM_013964; NM_013960; NM_013962; NM_013961; NM_013959; NM_013958; NM_013957; NM_013956 | neuregulin 1 |
| 208501_at | 0 | 0 | 0 | 0 | 1 | 0 | 1 | 0 | 0 | 0 | 0 | 0 | 0 | 0 | 0 | 0 | GFI1B | NM_001135031; NM_004188 | growth factor independent 1B transcription repressor |

TABLE 2-continued

| Affymetrix Probe ID | BVS | BVS-BO | BVS-VO | BVS-SO | 2L | 2L-SO | 2L-BV | 2L-BO | 2L-VS | 2L-VO | 2L-SB | BVSH | BVSH-BO | BVSH-VO | BVSH-SO | BVSH-HO | Gene Symbol | RefSeq ID | Gene Name |
|---|---|---|---|---|---|---|---|---|---|---|---|---|---|---|---|---|---|---|---|
| 208545_x_at | 1 | 1 | 0 | 0 | 1 | 0 | 0 | 1 | 0 | 0 | 0 | 0 | 0 | 0 | 0 | 0 | TAF4 | NM_003185 | TAF4 RNA polymerase II, TATA box binding protein (TBP)-associated factor, 135 kDa |
| 208601_s_at | 1 | 1 | 0 | 0 | 1 | 0 | 0 | 0 | 0 | 0 | 0 | 1 | 1 | 0 | 0 | 0 | TUBB1 | NM_030773 | tubulin, beta 1 |
| 208702_x_at | 1 | 0 | 0 | 1 | 1 | 1 | 1 | 0 | 0 | 0 | 0 | 1 | 0 | 0 | 1 | 0 | APLP2 | NM_001642; NM_001142277; NM_001142278; NM_001142276 | amyloid beta (A4) precursor-like protein 2 |
| 208710_s_at | 0 | 0 | 0 | 0 | 0 | 10 | 0 | 0 | 0 | 0 | 0 | 1 | 0 | 1 | 0 | 0 | AP3D1 | NM_003938; NM_001077523 | adaptor-related protein complex 3, delta 1 subunit |
| 208736_at | 1 | 0 | 1 | 1 | 1 | 1 | 0 | 0 | 1 | 1 | 0 | 1 | 0 | 1 | 1 | 0 | ARPC3 | NM_005719 | similar to actin related protein 2/3 complex subunit 3; hypothetical LOC729841; actin related protein 2/3 complex, subunit 3, 21 kDa |
| 208743_s_at | 0 | 0 | 0 | 0 | 0 | 0 | 0 | 0 | 0 | 0 | 0 | 1 | 1 | 0 | 0 | 0 | YWHAB | NM_139323; NM_003404 | tyrosine 3-monooxygenase/tryptophan 5-monooxygenase activation protein, beta polypeptide |
| 208782_at | 0 | 0 | 0 | 1 | 1 | 1 | 0 | 0 | 0 | 0 | 0 | 1 | 0 | 0 | 1 | 0 | FSTL1 | NM_007085 | follistatin-like 1 |
| 208886_at | 1 | 1 | 1 | 0 | 0 | 0 | 0 | 1 | 0 | 1 | 0 | 0 | 0 | 0 | 0 | 0 | H1F0 | NM_005318 | H1 histone family, member 0 |
| 208974_x_at | 1 | 0 | 0 | 1 | 1 | 0 | 1 | 0 | 1 | 1 | 0 | 1 | 0 | 0 | 0 | 0 | KPNB1 | NM_002265 | karyopherin (importin) beta 1 |
| 209031_at | 1 | 0 | 0 | 1 | 1 | 1 | 0 | 1 | 1 | 0 | 0 | 1 | 0 | 0 | 0 | 0 | IGSF4 | NM_014333; NM_001098517 | cell adhesion molecule 1 |
| 209218_at | 0 | 0 | 0 | 0 | 0 | 0 | 0 | 0 | 0 | 0 | 0 | 1 | 0 | 0 | 1 | 0 | SQLE | NM_003129 | squalene epoxidase |
| 209360_s_at | 1 | 1 | 1 | 0 | 1 | 1 | 1 | 1 | 1 | 0 | 0 | 1 | 0 | 0 | 0 | 0 | RUNX1 | NM_001122607; NM_001001890; NM_001754 | runt-related transcription factor 1 |
| 209396_s_at | 1 | 0 | 0 | 1 | 1 | 1 | 0 | 0 | 0 | 0 | 0 | 0 | 0 | 0 | 0 | 0 | CHI3L1 | NM_001276 | chitinase 3-like 1 (cartilage glycoprotein-39) |
| 209422_at | 0 | 0 | 1 | 0 | 0 | 0 | 0 | 0 | 1 | 0 | 0 | 1 | 1 | 0 | 0 | 1 | PHF20 | NM_016436 | PHD finger protein 20 |
| 209511_at | 1 | 1 | 0 | 0 | 1 | 0 | 1 | 0 | 0 | 0 | 0 | 1 | 0 | 0 | 0 | 0 | POLR2F | NM_021974 | polymerase (RNA) II (DNA directed) polypeptide F |
| 209605_at | 1 | 0 | 0 | 1 | 0 | 0 | 1 | 0 | 1 | 1 | 0 | 0 | 0 | 0 | 0 | 0 | TST | NM_003312 | thiosulfate sulfurtransferase (rhodanese) |
| 209691_s_at | 0 | 0 | 0 | 0 | 0 | 1 | 0 | 0 | 0 | 0 | 0 | 1 | 0 | 0 | 1 | 0 | DOK4 | NM_018110 | docking protein 4 |
| 209906_at | 0 | 0 | 0 | 0 | 1 | 0 | 1 | 1 | 0 | 0 | 0 | 0 | 0 | 0 | 0 | 0 | C3AR1 | NM_004054 | complement component 3a receptor 1 |
| 209919_x_at | 1 | 1 | 0 | 0 | 1 | 0 | 0 | 0 | 0 | 0 | 0 | 1 | 1 | 0 | 0 | 0 | GGT1 | XM_001129425; NM_001032365; NM_005265; NM_001032364; XM_001129377 | gamma-glutamyltransferase light chain 3; gamma-glutamyltransferase 4 pseudogene; gamma-glutamyltransferase 2; gamma-glutamyltransferase 1; gamma-glutamyltransferase light chain 5 pseudogene |
| 210164_at | 0 | 0 | 0 | 0 | 1 | 0 | 0 | 1 | 0 | 0 | 0 | 0 | 0 | 0 | 0 | 0 | GZMB | NM_004131 | granzyme B (granzyme 2, cytotoxic T-lymphocyte-associated serine esterase 1) |
| 210172_at | 0 | 0 | 0 | 0 | 0 | 0 | 0 | 0 | 0 | 0 | 0 | 1 | 0 | 0 | 1 | 0 | SF1 | NM_004630; NM_201995; NM_201997; NM_201998 | splicing factor 1 |
| 210240_s_at | 0 | 0 | 0 | 0 | 1 | 0 | 0 | 0 | 0 | 0 | 0 | 0 | 0 | 0 | 0 | 0 | CDKN2D | NM_001800; NM_079421 | cyclin-dependent kinase inhibitor 2D (p19, inhibits CDK4) |
| 210365_at | 1 | 1 | 0 | 0 | 1 | 0 | 1 | 1 | 0 | 0 | 0 | 1 | 1 | 0 | 0 | 0 | RUNX1 | NM_001122607; NM_001001890; NM_001754 | runt-related transcription factor 1 |

TABLE 2-continued

| Affymetrix Probe ID | BVS | BVS-BO | BVS-VO | BVS-SO | 2L | 2L-SO | 2L-BV | 2L-BO | 2L-VS | 2L-VO | 2L-SB | BVSH | BVSH-BO | BVSH-VO | BVSH-SO | BVSH-HO | Gene Symbol | RefSeq ID | Gene Name |
|---|---|---|---|---|---|---|---|---|---|---|---|---|---|---|---|---|---|---|---|
| 210499_s_at | 0 | 0 | 0 | 0 | 0 | 0 | 0 | 0 | 0 | 0 | 0 | 1 | 0 | 1 | 0 | 0 | PQBP1 | NM_005710; NM_001032384; NM_001032383; NM_001167989; NM_001167990; NM_144495; NM_001167992; NM_001032381; NM_001032382 | polyglutamine binding protein 1 |
| 210724_at | 1 | 0 | 0 | 1 | 1 | 1 | 0 | 0 | 0 | 0 | 0 | 1 | 0 | 0 | 1 | 0 | EMR3 | NM_032571 | egf-like module containing, mucin-like, hormone receptor-like 3 |
| 210797_s_at | 1 | 0 | 1 | 0 | 0 | 0 | 0 | 0 | 1 | 0 | 0 | 0 | 0 | 0 | 0 | 0 | OASL | NM_198213; NM_003733 | 2'-5'-oligoadenylate synthetase-like |
| 210846_x_at | 0 | 0 | 0 | 0 | 0 | 0 | 0 | 0 | 0 | 0 | 0 | 1 | 0 | 0 | 1 | 0 | TRIM14 | NM_033219; NM_033220; NM_014788; NM_033221 | tripartite motif-containing 14 |
| 211137_s_at | 0 | 0 | 0 | 0 | 1 | 0 | 1 | 0 | 0 | 0 | 0 | 0 | 0 | 0 | 0 | 0 | ATP2C1 | NM_014382; NM_001001486; NM_001001487; NM_001001485 | ATPase, Ca++ transporting, type 2C, member 1 |
| 211792_s_at | 0 | 0 | 0 | 0 | 1 | 0 | 1 | 0 | 0 | 0 | 0 | 0 | 0 | 0 | 0 | 0 | CDKN2C | NM_001262; NM_078626 | cyclin-dependent kinase inhibitor 2C (p18, inhibits CDK4) |
| 211878_s_at | 0 | 0 | 0 | 0 | 0 | 0 | 0 | 0 | 0 | 0 | 0 | 1 | 0 | 0 | 0 | 1 | | XM_001718220 | immunoglobulin heavy constant gamma 1 (G1m marker); immunoglobulin heavy constant mu; immunoglobulin heavy variable 3-7; immunoglobulin heavy constant gamma 3 (G3m marker); immunoglobulin heavy variable 3-11 (gene/pseudogene); immunoglobulin heavy variable 4-31; immunoglobulin heavy locus |
| 211966_at | 0 | 0 | 0 | 0 | 1 | 0 | 1 | 0 | 0 | 0 | 0 | 0 | 0 | 0 | 0 | 0 | COL4A2 | NM_001846 | collagen, type IV, alpha 2 |
| 212035_s_at | 1 | 1 | 0 | 1 | 1 | 1 | 1 | 0 | 0 | 0 | 1 | 1 | 1 | 0 | 1 | 0 | EXOC7 | NM_001145298; NM_001145299; NM_015219; NM_001145297; NM_001145296; NM_001013839 | exocyst complex component 7 |
| 212036_s_at | 0 | 0 | 0 | 0 | 0 | 0 | 0 | 0 | 0 | 0 | 0 | 1 | 0 | 0 | 0 | 1 | PNN | NM_002687 | pinin, desmosome associated protein |
| 212118_at | 0 | 0 | 1 | 0 | 1 | 0 | 1 | 0 | 0 | 1 | 0 | 1 | 0 | 1 | 0 | 0 | RFP | NM_006510 | tripartite motif-containing 27 |
| 212162_at | 1 | 0 | 0 | 0 | 0 | 0 | 0 | 0 | 0 | 0 | 0 | 1 | 0 | 0 | 1 | 0 | KIDINS220 | NM_020738 | kinase D-interacting substrate, 220 kDa |
| 212574_x_at | 0 | 0 | 0 | 0 | 0 | 0 | 0 | 0 | 0 | 0 | 0 | 1 | 0 | 1 | 1 | 0 | C19orf6 | NM_033420; NM_001033026 | chromosome 19 open reading frame 6 |
| 212590_at | 0 | 0 | 0 | 0 | 0 | 0 | 0 | 0 | 0 | 0 | 0 | 1 | 0 | 0 | 1 | 0 | RRAS2 | XM_001726427; NM_012250; XM_001726471; NM_001102669; XM_001726315 | related RAS viral (r-ras) oncogene homolog 2; similar to related RAS viral (r-ras) oncogene homolog 2 |

TABLE 2-continued

| Affymetrix Probe ID | BVS | BVS-BO | BVS-VO | BVS-SO | 2L | 2L-SO | 2L-BV | 2L-BO | 2L-VS | 2L-VO | 2L-SB | BVSH | BVSH-BO | BVSH-VO | BVSH-SO | BVSH-HO | Gene Symbol | RefSeq ID | Gene Name |
|---|---|---|---|---|---|---|---|---|---|---|---|---|---|---|---|---|---|---|---|
| 212655_at | 0 | 0 | 0 | 0 | 0 | 0 | 0 | 0 | 0 | 0 | 0 | 1 | 0 | 0 | 0 | 1 | ZCCHC14 | NM_015144 | zinc finger, CCHC domain containing 14 |
| 212657_s_at | 1 | 0 | 0 | 1 | 1 | 1 | 0 | 0 | 1 | 1 | 0 | 1 | 0 | 1 | 0 | 0 | IL1RN | NM_000577; NM_173841; NM_173842; NM_173843 | interleukin 1 receptor antagonist |
| 212659_s_at | 0 | 0 | 0 | 0 | 0 | 0 | 0 | 0 | 0 | 0 | 0 | 1 | 0 | 0 | 1 | 0 | IL1RN | NM_000577; NM_173841; NM_173842; NM_173843 | interleukin 1 receptor antagonist |
| 212676_at | 0 | 0 | 0 | 0 | 0 | 0 | 0 | 0 | 0 | 0 | 0 | 1 | 0 | 1 | 0 | 0 | NF1 | NM_000267; NM_001042492; NM_001128147 | neurofibromin 1 |
| 212697_at | 1 | 0 | 0 | 0 | 1 | 1 | 0 | 0 | 0 | 0 | 0 | 1 | 0 | 0 | 1 | 0 | LOC162427 | NM_178126 | family with sequence similarity 134, member C |
| 212708_at | 1 | 1 | 0 | 0 | 1 | 1 | 1 | 1 | 0 | 0 | 0 | 1 | 0 | 0 | 0 | 0 | LOC339287 | NM_001012241 | male-specific lethal 1 homolog (Drosophila) |
| 212810_s_at | 0 | 0 | 0 | 1 | 0 | 0 | 0 | 0 | 0 | 0 | 0 | 1 | 0 | 0 | 1 | 0 | SLC1A4 | NM_003038; NM_001135581 | solute carrier family 1 (glutamate/neutral amino acid transporter), member 4 |
| 212816_s_at | 1 | 0 | 0 | 0 | 0 | 0 | 0 | 0 | 0 | 0 | 0 | 1 | 0 | 0 | 1 | 0 | CBS | NM_000071 | cystathionine-beta-synthase |
| 212914_at | 1 | 1 | 0 | 1 | 1 | 1 | 1 | 1 | 1 | 0 | 0 | 1 | 0 | 0 | 0 | 0 | CBX7 | NM_175709 | chromobox homolog 7 |
| 212947_at | 1 | 0 | 0 | 0 | 1 | 0 | 0 | 0 | 0 | 0 | 1 | 0 | 0 | 0 | 1 | 0 | SLC9A8 | NM_015266 | solute carrier family 9 (sodium/hydrogen exchanger), member 8 |
| 213223_at | 1 | 1 | 0 | 0 | 1 | 0 | 0 | 1 | 0 | 0 | 0 | 1 | 0 | 0 | 1 | 0 | RPL28 | NM_001136134; NM_000991; NM_001136137; NM_001136135; NM_001136136 | ribosomal protein L28 |
| 213300_at | 1 | 1 | 0 | 0 | 0 | 0 | 0 | 1 | 0 | 0 | 0 | 1 | 1 | 0 | 0 | 0 | KIAA0404 | NM_015104 | ATG2 autophagy related 2 homolog A (S. cerevisiae) |
| 213422_s_at | 0 | 0 | 0 | 0 | 1 | 0 | 1 | 0 | 1 | 0 | 0 | 1 | 0 | 0 | 1 | 0 | MXRA8 | NM_032348 | matrix-remodelling associated 8 |
| 213573_at | 1 | 1 | 1 | 1 | 1 | 1 | 0 | 0 | 0 | 0 | 0 | 1 | 0 | 1 | 1 | 0 | KPNB1 | NM_002265 | karyopherin (importin) beta 1 |
| 213633_at | 1 | 1 | 0 | 0 | 1 | 0 | 1 | 1 | 0 | 0 | 0 | 1 | 0 | 0 | 1 | 1 | SH3BP1 | NM_018957 | SH3-domain binding protein 1 |
| 213700_s_at | 0 | 0 | 0 | 0 | 0 | 0 | 0 | 0 | 0 | 1 | 0 | 1 | 0 | 0 | 0 | 1 | PKM2 | NM_002654; NM_182471; NM_182470; XM_001719890 | similar to Pyruvate kinase, isozymes M1/M2 (Pyruvate kinase muscle isozyme) (Cytosolic thyroid hormone-binding protein) (CTHBP) (THBP1); pyruvate kinase, muscle |
| 213831_at | 0 | 0 | 0 | 0 | 0 | 0 | 0 | 0 | 0 | 0 | 0 | 1 | 0 | 0 | 1 | 0 | HLA-DQA1 | NM_002122; XM_001719804; XM_001129369; XM_001722105 | similar to hCG2042724; similar to HLA class II histocompatibility antigen, DQ(1) alpha chain precursor (DC-4 alpha chain); major histocompatibility complex, class II, DQ alpha 1 |
| 213907_at | 0 | 0 | 0 | 0 | 0 | 0 | 0 | 0 | 0 | 0 | 0 | 1 | 1 | 0 | 0 | 0 | EEF1E1 | NM_004280; NM_001135650 | eukaryotic translation elongation factor 1 epsilon 1 |
| 214085_x_at | 1 | 1 | 0 | 0 | 0 | 0 | 0 | 0 | 0 | 0 | 0 | 0 | 0 | 0 | 0 | 0 | GLIPR1 | NM_006851 | GLI pathogenesis-related 1 |
| 214097_at | 1 | 1 | 1 | 1 | 1 | 1 | 1 | 1 | 1 | 1 | 1 | 1 | 1 | 0 | 0 | 0 | RPS21 | NM_001024 | ribosomal protein S21 |
| 214175_x_at | 1 | 0 | 0 | 0 | 1 | 1 | 0 | 0 | 0 | 1 | 1 | 0 | 0 | 0 | 0 | 0 | PDLIM4 | NM_003687; NM_001131027 | PDZ and LIM domain 4 |
| 214321_at | 0 | 0 | 0 | 1 | 0 | 1 | 0 | 0 | 0 | 0 | 0 | 1 | 0 | 0 | 1 | 0 | NOV | NM_002514 | nephroblastoma overexpressed gene |
| 214326_x_at | 1 | 1 | 0 | 1 | 1 | 1 | 1 | 1 | 0 | 0 | 1 | 1 | 1 | 0 | 1 | 0 | JUND | NM_005354 | jun D proto-oncogene |
| 214511_x_at | 0 | 0 | 0 | 0 | 1 | 0 | 1 | 0 | 0 | 1 | 1 | 0 | 1 | 0 | 0 | 0 | FCGR1A// LOC440607 | NM_001017986; NM_001004340 | Fc fragment of IgG, high affinity Ib, receptor (CD64) |
| 214582_at | 1 | 0 | 0 | 1 | 1 | 1 | 0 | 0 | 0 | 0 | 0 | 0 | 0 | 0 | 0 | 0 | PDE3B | NM_000922 | phosphodiesterase 3B, cGMP-inhibited |
| 214617_at | 1 | 1 | 0 | 0 | 1 | 0 | 0 | 1 | 0 | 0 | 0 | 0 | 1 | 0 | 0 | 0 | PRF1 | NM_005041; NM_001083116 | perforin 1 (pore forming protein) |

TABLE 2-continued

| Affymetrix Probe ID | BVS | BVS-BO | BVS-VO | BVS-SO | 2L | 2L-SO | 2L-BV | 2L-BO | 2L-VS | 2L-VO | 2L-SB | BVSH | BVSH-BO | BVSH-VO | BVSH-SO | BVSH-HO | Gene Symbol | RefSeq ID | Gene Name |
|---|---|---|---|---|---|---|---|---|---|---|---|---|---|---|---|---|---|---|---|
| 214800_x_at | 1 | 0 | 1 | 0 | 1 | 0 | 0 | 0 | 0 | 1 | 0 | 1 | 0 | 1 | 0 | 0 | BTF3/// LOC345829 | NM_001037637; NM_001207 | basic transcription factor 3; basic transcription factor 3, like 1 pseudogene |
| 214955_at | 1 | 1 | 0 | 0 | 1 | 0 | 0 | 1 | 0 | 0 | 0 | 0 | 0 | 0 | 0 | 0 | TMPRSS6 | NM_153609 | transmembrane protease, serine 6 |
| 215012_at | 0 | 0 | 0 | 0 | 0 | 0 | 0 | 0 | 0 | 0 | 1 | 1 | 0 | 0 | 1 | 0 | ZNF451 | NM_001031623; NM_015555 | zinc finger protein 451 |
| 215088_s_at | 0 | 0 | 0 | 0 | 1 | 0 | 0 | 0 | 0 | 0 | 1 | 0 | 0 | 0 | 0 | 0 | SDHC | NM_003001; NM_001035513; NM_001035511; NM_001035512 | succinate dehydrogenase complex, subunit C, integral membrane protein, 15 kDa |
| 215184_at | 1 | 0 | 1 | 0 | 1 | 0 | 0 | 0 | 1 | 0 | 0 | 0 | 0 | 0 | 0 | 0 | DAPK2 | NM_014326 | death-associated protein kinase 2 |
| 215268_at | 1 | 1 | 0 | 0 | 1 | 0 | 0 | 1 | 0 | 0 | 0 | 0 | 0 | 0 | 0 | 0 | KIAA0754 | NM_015038 | hypothetical LOC643314 |
| 215606_s_at | 1 | 1 | 0 | 0 | 1 | 0 | 1 | 1 | 0 | 0 | 0 | 1 | 1 | 0 | 0 | 0 | RAB6IP2 | NM_178040; NM_015064; NM_178037; NM_178038; NM_178039 | ELKS/RAB6-interacting/CAST family member 1 |
| 215630_at | 0 | 0 | 0 | 0 | 0 | 0 | 0 | 0 | 0 | 0 | 0 | 1 | 0 | 1 | 0 | 0 | | NM_015150 | raftlin, lipid raft linker 1 |
| 215696_s_at | 0 | 0 | 0 | 0 | 0 | 0 | 1 | 0 | 0 | 0 | 0 | 1 | 0 | 1 | 0 | 0 | KIAA0310 | NM_014866 | SEC16 homolog A (S. cerevisiae) |
| 215804_at | 0 | 1 | 1 | 0 | 1 | 0 | 1 | 1 | 0 | 0 | 0 | 0 | 0 | 0 | 0 | 0 | EPHA1 | NM_005232 | EPH receptor A1 |
| 215848_at | 1 | 0 | 0 | 0 | 1 | 0 | 0 | 0 | 0 | 1 | 0 | 1 | 0 | 1 | 1 | 0 | ZNF291 | NM_001145923; NM_020843 | S-phase cyclin A-associated protein in the ER |
| 216289_at | 1 | 0 | 1 | 0 | 1 | 0 | 1 | 0 | 0 | 1 | 0 | 0 | 0 | 0 | 0 | 0 | | XM_002347085; XM_002342934; XM_002346195; NM_001161808 | G protein-coupled receptor 144 |
| 216303_s_at | 1 | 1 | 0 | 0 | 1 | 0 | 0 | 1 | 0 | 0 | 0 | 0 | 0 | 0 | 0 | 0 | MTMR1 | NM_003828 | myotubularin related protein 1 |
| 216473_x_at | 1 | 0 | 1 | 0 | 1 | 0 | 0 | 0 | 0 | 1 | 0 | 0 | 0 | 0 | 0 | 0 | DUX4/// LOC399839/// LOC401650/// LOC440013/// LOC440014/// LOC440015/// LOC440016/// LOC440017/// LOC441056 | XM_927996; XM_001720078; XM_001722088; XM_001164467; XM_928023; XM_495858; XM_941455; NM_001127386; XM_001720082; XM_001720798; XM_496731; NM_001127387; XM_495854; XM_495855; NM_001127388; XM_033178; NM_001127389; XM_001724713 | double homeobox, 4-like; similar to double homeobox 4c; similar to double homeobox, 4; double homeobox, 4 |
| 216571_at | 1 | 1 | 0 | 0 | 0 | 0 | 0 | 0 | 0 | 0 | 0 | 0 | 1 | 0 | 0 | 0 | | NM_000543; | sphingomyelin phosphodiesterase 1, acid lysosomal |
| 216676_x_at | 0 | 0 | 0 | 0 | 1 | 0 | 0 | 0 | 0 | 0 | 0 | 1 | 0 | 0 | 0 | 0 | KIR3DL3 | NM_001007593 NM_153443 | killer cell immunoglobulin-like receptor, three domains, long cytoplasmic tail, 3 |

TABLE 2-continued

| Affymetrix Probe ID | BVS | BVS-BO | BVS-VO | BVS-SO | 2L | 2L-SO | 2L-BV | 2L-BO | 2L-VS | 2L-VO | 2L-SB | BVSH | BVSH-BO | BVSH-VO | BVSH-SO | BVSH-HO | Gene Symbol | RefSeq ID | Gene Name |
|---|---|---|---|---|---|---|---|---|---|---|---|---|---|---|---|---|---|---|---|
| 216713_at | 1 | 1 | 0 | 0 | 1 | 0 | 0 | 1 | 0 | 0 | 0 | 0 | 0 | 0 | 0 | 0 | KRIT1 | NM_194454; NM_001013406; NM_004912; NM_194456; NM_194455 | KRIT1, ankyrin repeat containing |
| 216748_at | 0 | 0 | 0 | 0 | 0 | 0 | 0 | 0 | 0 | 0 | 0 | 1 | 0 | 1 | 0 | 0 | PYHIN1 | NM_198928; NM_152501; NM_198930; NM_198929 | pyrin and HIN domain family, member 1 |
| 216867_s_at | 1 | 1 | 0 | 0 | 0 | 0 | 1 | 0 | 0 | 1 | 0 | 0 | 0 | 0 | 0 | 0 | PDGFA | NM_033023; NM_002607 | platelet-derived growth factor alpha polypeptide |
| 216950_s_at | 0 | 0 | 0 | 0 | 0 | 0 | 0 | 0 | 0 | 0 | 0 | 1 | 0 | 0 | 0 | 1 | FCGR1A | NM_000566 | Fc fragment of IgG, high affinity Ic, receptor (CD64); Fc fragment of IgG, high affinity Ia, receptor (CD64) |
| 217143_s_at | 1 | 1 | 0 | 0 | 1 | 0 | 1 | 0 | 0 | 0 | 0 | 1 | 1 | 0 | 0 | 0 | TRA@ // TRD@ | | ambiguous (pending) |
| 217408_at | 1 | 0 | 1 | 1 | 1 | 1 | 0 | 0 | 0 | 1 | 0 | 0 | 0 | 1 | 1 | 0 | MRPS18B | NM_014046 | mitochondrial ribosomal protein S18B |
| 217497_at | 0 | 0 | 1 | 0 | 1 | 0 | 0 | 0 | 0 | 0 | 0 | 1 | 0 | 1 | 0 | 0 | ECGF1 | NM_001953; NM_001113755; NM_001113756 | thymidine phosphorylase |
| 217593_at | 1 | 1 | 0 | 0 | 0 | 0 | 1 | 0 | 0 | 0 | 0 | 1 | 0 | 0 | 0 | 0 | ZNF447 | NM_001145542; NM_001145543; NM_001145544; NM_023926 | zinc finger and SCAN domain containing 18 |
| 217717_s_at | 1 | 1 | 0 | 0 | 1 | 0 | 1 | 0 | 0 | 0 | 0 | 0 | 1 | 0 | 0 | 0 | YWHAB | NM_139323; NM_003404 | tyrosine 3-monooxygenase/tryptophan 5-monooxygenase activation protein, beta polypeptide |
| 218010_x_at | 0 | 0 | 0 | 1 | 1 | 1 | 1 | 0 | 0 | 0 | 0 | 0 | 0 | 0 | 0 | 0 | C20orf149 | NM_024299 | pancreatic progenitor cell differentiation and proliferation factor homolog (zebrafish) |
| 218040_at | 0 | 0 | 0 | 0 | 0 | 0 | 0 | 0 | 0 | 0 | 0 | 1 | 0 | 0 | 1 | 0 | PRPF38B | NM_018061 | PRP38 pre-mRNA processing factor 38 (yeast) domain containing B |
| 218060_s_at | 0 | 0 | 1 | 0 | 0 | 0 | 0 | 0 | 1 | 0 | 0 | 1 | 0 | 0 | 0 | 1 | FLJ13154 | NM_024598 | chromosome 16 open reading frame 57 |
| 218095_s_at | 1 | 0 | 0 | 0 | 1 | 1 | 0 | 0 | 1 | 0 | 0 | 0 | 0 | 0 | 0 | 0 | TPARL | NM_018475 | transmembrane protein 165 |
| 218135_at | 0 | 0 | 0 | 1 | 0 | 0 | 0 | 0 | 0 | 0 | 0 | 1 | 0 | 0 | 0 | 1 | PTX1 | NM_016570 | ERGIC and golgi 2 |
| 218306_s_at | 1 | 0 | 0 | 1 | 1 | 1 | 0 | 0 | 0 | 0 | 1 | 0 | 0 | 0 | 0 | 0 | HERC1 | NM_003922 | hect (homologous to the E6-AP (UBE3A) carboxyl terminus) domain and RCC1 (CHC1)-like domain (RLD) 1 |
| 218510_x_at | 0 | 0 | 0 | 0 | 0 | 0 | 0 | 0 | 0 | 0 | 0 | 1 | 1 | 0 | 0 | 0 | FLJ20152 | NM_001034850; NM_019000 | family with sequence similarity 134, member B |
| 218523_at | 0 | 0 | 0 | 0 | 0 | 1 | 0 | 1 | 0 | 0 | 0 | 0 | 0 | 0 | 1 | 0 | LHPP | NM_022126; NM_001167880 | phospholysine phosphohistidine inorganic pyrophosphate phosphatase |
| 218595_s_at | 1 | 0 | 0 | 0 | 1 | 1 | 0 | 0 | 0 | 0 | 0 | 1 | 0 | 0 | 1 | 0 | HEATR1 | NM_018072 | HEAT repeat containing 1 |
| 218637_at | 0 | 0 | 0 | 0 | 1 | 0 | 0 | 0 | 0 | 0 | 0 | 1 | 0 | 0 | 0 | 1 | IMPACT | NM_018439 | Impact homolog (mouse) |
| 218700_s_at | 0 | 0 | 0 | 0 | 1 | 0 | 0 | 0 | 1 | 0 | 0 | 0 | 0 | 0 | 0 | 0 | RAB7L1 | NM_001135664; NM_001135663; NM_001135662; NM_003929 | RAB7, member RAS oncogene family-like 1 |
| 218812_s_at | 1 | 0 | 0 | 0 | 0 | 1 | 1 | 1 | 0 | 0 | 0 | 1 | 1 | 0 | 0 | 0 | C7orf19 | NM_032831; NM_001126340 | ORAI calcium release-activated calcium modulator 2 |

TABLE 2-continued

| Affymetrix Probe ID | BVS | BVS-BO | BVS-VO | BVS-SO | 2L | 2L-SO | 2L-BV | 2L-BO | 2L-VS | 2L-VO | 2L-SB | BVSH | BVSH-BO | BVSH-VO | BVSH-SO | BVSH-HO | Gene Symbol | RefSeq ID | Gene Name |
|---|---|---|---|---|---|---|---|---|---|---|---|---|---|---|---|---|---|---|---|
| 218818_at | 0 | 0 | 0 | 0 | 0 | 0 | 0 | 0 | 0 | 0 | 0 | 1 | 0 | 0 | 1 | 0 | FHL3 | NM_004468 | four and a half LIM domains 3 |
| 218946_at | 0 | 0 | 0 | 0 | 0 | 0 | 0 | 0 | 0 | 0 | 0 | 1 | 0 | 0 | 0 | 1 | HIRIPS | NM_001002755; NM_001002756; NM_001002757; NM_015700 | NFU1 iron-sulfur cluster scaffold homolog (S. cerevisiae) |
| 218999_at | 0 | 0 | 0 | 0 | 0 | 0 | 0 | 0 | 0 | 0 | 0 | 1 | 1 | 0 | 1 | 0 | FLJ11000 | NM_018295 | transmembrane protein 140 |
| 219055_at | 1 | 1 | 0 | 0 | 1 | 0 | 0 | 1 | 0 | 0 | 0 | 1 | 1 | 0 | 0 | 0 | FLJ10379 | NM_018079 | S1 RNA binding domain 1 |
| 219066_at | 0 | 0 | 1 | 0 | 1 | 0 | 0 | 0 | 0 | 1 | 0 | 0 | 0 | 1 | 0 | 0 | PPCDC | NM_021823 | phosphopantothenoylcysteine decarboxylase |
| 219124_at | 0 | 0 | 0 | 0 | 1 | 1 | 1 | 1 | 0 | 0 | 0 | 1 | 0 | 0 | 1 | 0 | C8orf41 | NM_001102401; NM_025115 | chromosome 8 open reading frame 41 |
| 219130_at | 1 | 0 | 1 | 0 | 1 | 0 | 0 | 0 | 1 | 0 | 0 | 0 | 0 | 1 | 0 | 0 | FLJ10287 | NM_019083 | coiled-coil domain containing 76 |
| 219143_s_at | 0 | 0 | 0 | 0 | 1 | 0 | 1 | 1 | 0 | 1 | 0 | 1 | 1 | 1 | 0 | 0 | RPP25 | NM_017793 | ribonuclease P/MRP 25 kDa subunit |
| 219269_at | 0 | 0 | 0 | 0 | 1 | 0 | 1 | 1 | 0 | 0 | 0 | 0 | 0 | 0 | 0 | 0 | FLJ21616 | NM_001135726; NM_024567 | homeobox containing 1 |
| 219382_at | 1 | 1 | 1 | 0 | 0 | 1 | 0 | 0 | 1 | 0 | 0 | 0 | 0 | 0 | 0 | 0 | SERTAD3 | NM_013368; NM_203344 | SERTA domain containing 3 |
| 219437_s_at | 1 | 0 | 1 | 1 | 1 | 1 | 0 | 0 | 1 | 1 | 0 | 1 | 0 | 1 | 0 | 0 | ANKRD11 | XM_001720760; NM_013275; XM_001721661; XM_001721649 | ankyrin repeat domain 11; hypothetical protein LOC100128265 |
| 219523_s_at | 1 | 0 | 0 | 0 | 0 | 1 | 0 | 0 | 0 | 1 | 0 | 0 | 0 | 0 | 0 | 0 | ODZ3 | NM_001080477 | odz, odd Oz/ten-m homolog 3 (Drosophila) |
| 219577_s_at | 0 | 0 | 0 | 0 | 1 | 0 | 0 | 0 | 0 | 0 | 0 | 1 | 0 | 0 | 1 | 0 | ABCA7 | NM_019112 | ATP-binding cassette, sub-family A (ABC1), member 7 |
| 219599_at | 0 | 0 | 0 | 0 | 0 | 0 | 0 | 0 | 0 | 0 | 0 | 1 | 1 | 0 | 0 | 0 | PRO1843 | NM_001417 | similar to eukaryotic translation initiation factor 4H; eukaryotic translation initiation factor 4B |
| 219629_at | 0 | 0 | 0 | 0 | 0 | 0 | 0 | 0 | 0 | 0 | 0 | 1 | 0 | 0 | 1 | 0 | C22orf8 | NM_017911; NM_001104595 | family with sequence similarity 118, member A |
| 219669_at | 0 | 0 | 0 | 0 | 1 | 0 | 0 | 0 | 0 | 1 | 0 | 0 | 0 | 0 | 0 | 0 | CD177 | NM_020406 | CD177 molecule |
| 219693_at | 0 | 0 | 0 | 0 | 1 | 0 | 1 | 1 | 0 | 0 | 0 | 1 | 1 | 1 | 0 | 0 | AGPAT4 | NM_020133 | 1-acylglycerol-3-phosphate O-acyltransferase 4 (lysophosphatidic acid acyltransferase, delta) |
| 219745_at | 0 | 0 | 0 | 0 | 0 | 0 | 0 | 1 | 0 | 0 | 0 | 1 | 1 | 0 | 0 | 0 | C10orf77 | NM_024789 | transmembrane protein 180 |
| 219762_s_at | 0 | 0 | 1 | 0 | 0 | 0 | 0 | 0 | 0 | 0 | 0 | 0 | 0 | 1 | 0 | 0 | RPL36 | NM_033643; NM_015414 | ribosomal protein L36; ribosomal protein L36 pseudogene 14 |
| 219763_at | 0 | 0 | 0 | 0 | 0 | 0 | 0 | 0 | 0 | 0 | 0 | 1 | 0 | 0 | 1 | 0 | DENND1A | NM_020946; NM_024820 | DENN/MADD domain containing 1A |
| 219777_at | 1 | 0 | 1 | 0 | 0 | 0 | 0 | 0 | 0 | 1 | 0 | 1 | 0 | 0 | 0 | 0 | GIMAP6 | NM_024711 | GTPase, IMAP family member 6 |
| 219872_at | 0 | 0 | 0 | 0 | 0 | 0 | 0 | 0 | 0 | 0 | 0 | 0 | 0 | 0 | 0 | 0 | DKFZp434L142 | NM_001031700; NM_016613; NM_001128424 | chromosome 4 open reading frame 18 |
| 219966_x_at | 0 | 0 | 0 | 0 | 0 | 0 | 0 | 0 | 0 | 0 | 0 | 1 | 0 | 1 | 0 | 1 | BANP | NM_017869; NM_079837 | BTG3 associated nuclear protein |
| 219999_at | 0 | 0 | 0 | 0 | 0 | 0 | 0 | 0 | 1 | 0 | 0 | 1 | 0 | 0 | 1 | 0 | MAN2A2 | NM_006122 | mannosidase, alpha, class 2A, member 2 |
| 220036_s_at | 0 | 0 | 0 | 0 | 1 | 0 | 1 | 1 | 0 | 0 | 0 | 1 | 0 | 1 | 1 | 0 | LMBR1L | NM_018113 | limb region 1 homolog (mouse)-like |
| 220059_at | 1 | 1 | 1 | 0 | 0 | 0 | 0 | 1 | 0 | 0 | 0 | 0 | 0 | 0 | 0 | 0 | BRDG1 | NM_012108 | signal transducing adaptor family member 1 |
| 220122_at | 0 | 1 | 0 | 0 | 1 | 0 | 1 | 1 | 0 | 0 | 0 | 1 | 1 | 0 | 0 | 0 | MCTP1 | NM_024717; NM_001002796 | multiple C2 domains, transmembrane 1 |
| 220308_at | 1 | 0 | 1 | 0 | 1 | 0 | 0 | 0 | 1 | 0 | 0 | 1 | 0 | 0 | 0 | 0 | CCDC19 | NM_012337 | coiled-coil domain containing 19 |
| 220319_s_at | 0 | 0 | 0 | 0 | 0 | 0 | 0 | 0 | 0 | 1 | 0 | 1 | 0 | 0 | 0 | 1 | MYLIP | NM_013262 | myosin regulatory light chain interacting protein |
| 220646_s_at | 0 | 0 | 0 | 0 | 0 | 0 | 0 | 1 | 0 | 0 | 1 | 0 | 0 | 0 | 0 | 0 | KLRF1 | NM_016523 | killer cell lectin-like receptor subfamily F, member 1 |
| 220765_s_at | 0 | 0 | 0 | 0 | 0 | 0 | 0 | 0 | 0 | 0 | 0 | 1 | 1 | 0 | 0 | 0 | LIMS2 | NM_017980; | LIM and senescent cell antigen-like domains 2 |

TABLE 2-continued

| Affymetrix Probe ID | BVS | BVS-BO | BVS-VO | BVS-SO | 2L | 2L-SO | 2L-BV | 2L-BO | 2L-VS | 2L-VO | 2L-SB | BVSH | BVSH-BO | BVSH-VO | BVSH-SO | BVSH-HO | Gene Symbol | RefSeq ID | Gene Name |
|---|---|---|---|---|---|---|---|---|---|---|---|---|---|---|---|---|---|---|---|
| 220935_s_at | 0 | 0 | 0 | 0 | 1 | 0 | 0 | 0 | 0 | 0 | 1 | 1 | 1 | 0 | 0 | 0 | CDK5RAP2 | NM_001161404; NM_001161403; NM_001136037 | CDK5 regulatory subunit associated protein 2 |
| 221032_s_at | 0 | 0 | 0 | 0 | 1 | 0 | 1 | 0 | 0 | 0 | 0 | 0 | 1 | 0 | 0 | 0 | TMPRSS5 | NM_018249; NM_001011649 | transmembrane protease, serine 5 |
| 221142_s_at | 0 | 0 | 0 | 0 | 1 | 0 | 0 | 0 | 1 | 0 | 0 | 0 | 0 | 0 | 0 | 0 | PECR | NM_030770 | peroxisomal trans-2-enoyl-CoA reductase |
| 221211_s_at | 0 | 0 | 0 | 0 | 0 | 0 | 0 | 1 | 0 | 0 | 0 | 0 | 1 | 0 | 0 | 0 | C21orf7 | NM_018441 | chromosome 21 open reading frame 7 |
| 221491_x_at | 1 | 1 | 0 | 0 | 1 | 1 | 1 | 1 | 0 | 0 | 1 | 1 | 1 | 1 | 0 | 0 | HLA-DRB1/// HLA-DRB3/// HLA-DRB4 | NM_020152 XM_002346768; NM_022555; XM_002346769 | major histocompatibility complex, class II, DR beta 3 |
| 221874_at | 1 | 1 | 0 | 1 | 1 | 1 | 1 | 1 | 0 | 0 | 1 | 1 | 1 | 0 | 0 | 0 | KIAA1324 | NM_020775 | KIAA1324 |
| 221964_at | 0 | 0 | 0 | 0 | 0 | 0 | 0 | 0 | 0 | 0 | 0 | 1 | 1 | 0 | 0 | 0 | TULP3 | NM_001160408; NM_003324 | tubby like protein 3 |
| 222059_at | 1 | 0 | 1 | 0 | 1 | 0 | 0 | 0 | 1 | 0 | 0 | 0 | 0 | 0 | 0 | 0 | ZNF335 | NM_022095 | zinc finger protein 335 |
| 222186_at | 0 | 0 | 0 | 0 | 0 | 0 | 0 | 0 | 0 | 0 | 0 | 1 | 0 | 0 | 1 | 1 | ZA20D3 | NM_019006 | zinc finger, AN1-type domain 6 |
| 222297_x_at | 0 | 0 | 0 | 0 | 1 | 0 | 0 | 0 | 0 | 0 | 0 | 0 | 0 | 0 | 0 | 0 | RPL18 | | ribosomal protein L18 |
| 222330_at | 0 | 0 | 0 | 0 | 0 | 0 | 0 | 0 | 0 | 0 | 0 | 0 | 0 | 0 | 0 | 0 | PDE3B | NM_000922 | phosphodiesterase 3B, cGMP-inhibited |
| 320_at | 1 | 1 | 0 | 0 | 1 | 0 | 1 | 0 | 1 | 0 | 0 | 0 | 0 | 0 | 0 | 0 | PEX6 | NM_000287 | peroxisomal biogenesis factor 6 |
| 44673_at | 1 | 1 | 0 | 0 | 0 | 0 | 0 | 0 | 0 | 0 | 0 | 1 | 0 | 0 | 0 | 0 | SN | NM_023068 | sialic acid binding ig-like lectin 1, sialoadhesin |
| 49329_at | 0 | 0 | 0 | 0 | 0 | 0 | 0 | 0 | 0 | 0 | 0 | 1 | 0 | 0 | 0 | 1 | KLHL22 | NM_032775 | kelch-like 22 (Drosophila) |
| 49452_at | 0 | 0 | 0 | 0 | 1 | 0 | 0 | 0 | 0 | 0 | 0 | 1 | 1 | 0 | 1 | 1 | ACACB | NM_001093 | acetyl-Coenzyme A carboxylase beta |
| 215185_at | 0 | 0 | 0 | 0 | 0 | 0 | 1 | 0 | 0 | 0 | 0 | 1 | 0 | 0 | 0 | 0 | LOC441468 | | |
| AFFX-HUMGAPDH/ M33197_M_at | 0 | 0 | 0 | 0 | 0 | 0 | 0 | 0 | 0 | 0 | 0 | 0 | 1 | 0 | 0 | 0 | GAPDH | | |
| 206512_at | 0 | 0 | 0 | 0 | 0 | 0 | 0 | 0 | 0 | 0 | 0 | 1 | 1 | 0 | 0 | 0 | U2AF1L1 | | ambiguous (pending) |
| 211781_x_at | 0 | 0 | 0 | 0 | 1 | 0 | 0 | 0 | 0 | 0 | 0 | 0 | 0 | 0 | 0 | 0 | | | |
| 216635_at | 1 | 1 | 0 | 0 | 1 | 0 | 0 | 0 | 0 | 0 | 0 | 0 | 0 | 0 | 0 | 0 | | | |
| 216943_at | 0 | 0 | 0 | 0 | 0 | 0 | 1 | 1 | 0 | 0 | 0 | 0 | 0 | 0 | 0 | 0 | | | |
| 217079_at | 0 | 0 | 0 | 0 | 0 | 0 | 0 | 0 | 0 | 0 | 0 | 1 | 0 | 0 | 1 | 0 | | | |
| 220352_x_at | 0 | 0 | 0 | 0 | 0 | 0 | 0 | 0 | 0 | 0 | 0 | 1 | 0 | 0 | 0 | 0 | | | |

Methods of Treating a Subject with an ARI

Another aspect of the present disclosure provides a method of treating an acute respiratory infection (ARI) whose etiology is unknown in a subject, said method comprising, consisting of, or consisting essentially of (a) obtaining a biological sample from the subject; (b) determining the gene expression profile of the subject from the biological sample by evaluating the expression levels of pre-defined sets of genes (e.g., one, two or three or more signatures); (c) normalizing gene expression levels as required for the technology used to make said measurement to generate a normalized value; (d) entering the normalized value into a bacterial classifier, a viral classifier and non-infectious illness classifier (i.e., predictors) that have pre-defined weighting values (coefficients) for each of the genes in each signature; (e) comparing the output of the classifiers to pre-defined thresholds, cut-off values, or ranges of values that indicate likelihood of infection; (f) classifying the sample as being of bacterial etiology, viral etiology, or noninfectious illness; and (g) administering to the subject an appropriate treatment regimen as identified by step (f).

In some embodiments, step (g) comprises administering an antibacterial therapy when the etiology of the ARI is determined to be bacterial. In other embodiments, step (g) comprises administering an antiviral therapy when the etiology of the ARI is determined to be viral.

After the etiology of the ARI of the subject has been determined, she may undergo treatment, for example antiviral therapy if the ARI is determined to be viral, and/or she may be quarantined to her home for the course of the infection. Alternatively, bacterial therapy regimens may be administered (e.g., administration of antibiotics) if the ARI is determined to be bacterial. Those subjects classified as non-infectious illness may be sent home or seen for further diagnosis and treatment (e.g., allergy, asthma, etc.).

The person performing the peripheral blood sample need not perform the comparison, however, as it is contemplated that a laboratory may communicate the gene expression levels of the classifiers to a medical practitioner for the purpose of identifying the etiology of the ARI and for the administration of appropriate treatment. Additionally, it is contemplated that a medical professional, after examining a patient, would order an agent to obtain a peripheral blood sample, have the sample assayed for the classifiers, and have the agent report patient's etiological status to the medical professional. Once the medical professional has obtained the etiology of the ARI, the medical professional could order suitable treatment and/or quarantine.

The methods provided herein can be effectively used to diagnose the etiology of illness in order to correctly treat the patient and reduce inappropriate use of antibiotics. Further, the methods provided herein have a variety of other uses, including but not limited to, (1) a host-based test to detect individuals who have been exposed to a pathogen and have impending, but not symptomatic, illness (e.g., in scenarios of natural spread of diseases through a population but also in the case of bioterrorism); (2) a host-based test for monitoring response to a vaccine or a drug, either in a clinical trial setting or for population monitoring of immunity; (3) a host-based test for screening for impending illness prior to deployment (e.g., a military deployment or on a civilian scenario such as embarkation on a cruise ship); and (4) a host-based test for the screening of livestock for ARIs (e.g., avian flu and other potentially pandemic viruses).

Another aspect of the present disclosure provides a kit for determining the etiology of an acute respiratory infection (ARI) in a subject comprising, consisting of, or consisting essentially of (a) a means for extracting a biological sample; (b) a means for generating one or more arrays consisting of a plurality of synthetic oligonucleotides with regions homologous to a group of gene transcripts as taught herein; and (c) instructions for use.

Yet another aspect of the present disclosure provides a method of using a kit for assessing the acute respiratory infection (ARI) classifier comprising, consisting of, or consisting essentially of: (a) generating one or more arrays consisting of a plurality of synthetic oligonucleotides with regions homologous to a a group of gene transcripts as taught herein; (b) adding to said array oligonucleotides with regions homologous to normalizing genes; (c) obtaining a biological sample from a subject suffering from an acute respiratory infection (ARI); (d) isolating RNA from said sample to create a transcriptome; (e) measuring said transcriptome on said array; (f) normalizing the measurements of said transcriptome to the normalizing genes, electronically transferring normalized measurements to a computer to implement the classifier algorithm(s), (g) generating a report; and optionally (h) administering an appropriate treatment based on the results.

Classification Systems

Figure 11:
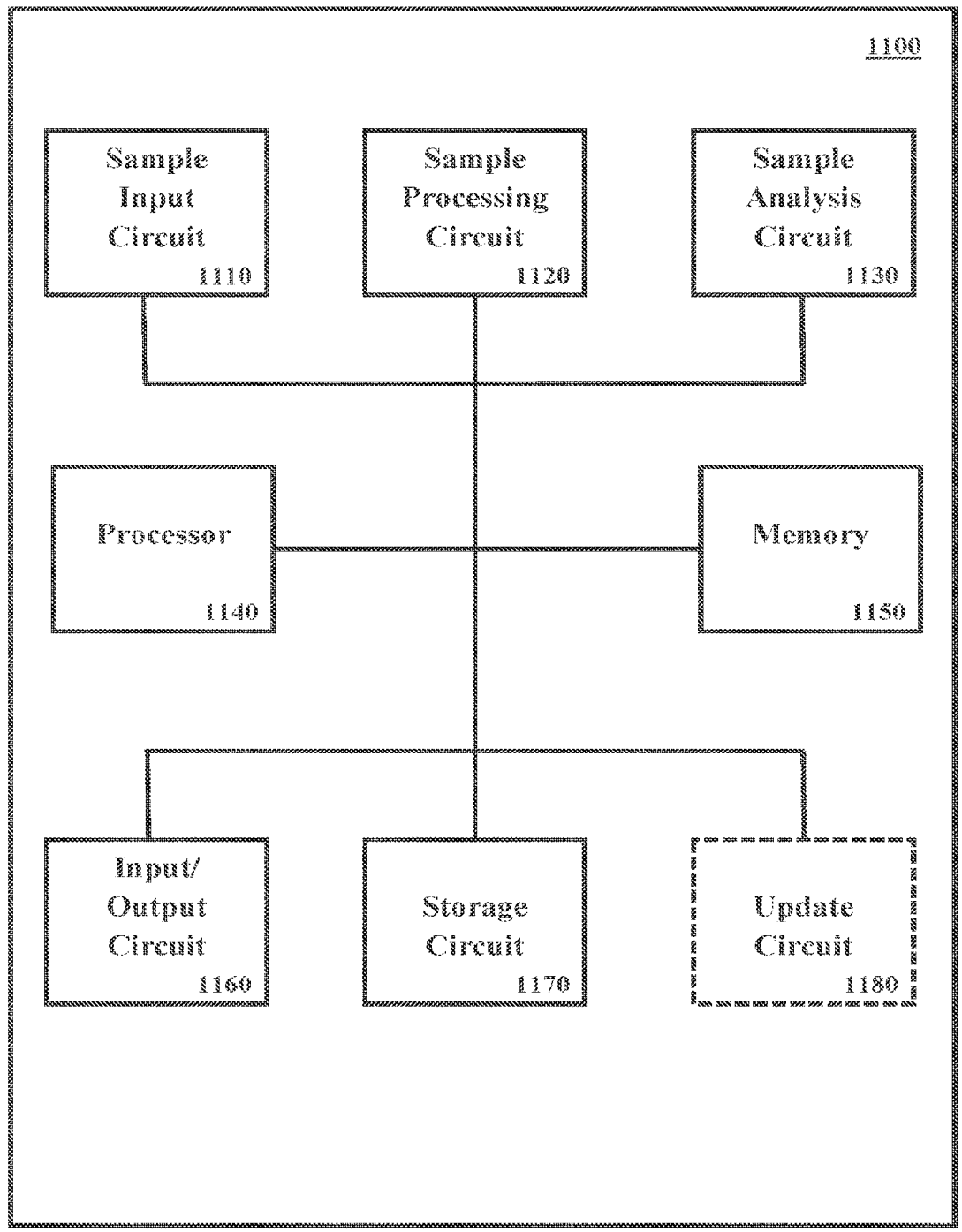
FIG. 11 is a block diagram of a classification system and/or computer program product that may be used in a platform. A classification system and/or computer program product 1100 may include a processor subsystem 1140, including one or more Central Processing Units (CPU) on which one or more operating systems and/or one or more applications run. While one processor 1140 is shown, it will be understood that multiple processors 1140 may be present, which may be either electrically interconnected or separate. Processor(s) 1140 are configured to execute computer program code from memory devices, such as memory 1150, to perform at least some of the operations and methods described herein. The storage circuit 1170 may store databases which provide access to the data/parameters/classifiers used by the classification system 1110 such as the signatures, weights, thresholds, etc. An input/output circuit 1160 may include displays and/or user input devices, such as keyboards, touch screens and/or pointing devices. Devices attached to the input/output circuit 1160 may be used to provide information to the processor 1140 by a user of the classification system 1100. Devices attached to the input/output circuit 1160 may include networking or communication controllers, input devices (keyboard, a mouse, touch screen, etc.) and output devices (printer or display). An optional update circuit 1180 may be included as an interface for providing updates to the classification system 1100 such as updates to the code executed by the processor 1140 that are stored in the memory 1150 and/or the storage circuit 1170. Updates provided via the update circuit 1180 may also include updates to portions of the storage circuit 1170 related to a database and/or other data storage format which maintains information for the classification system 1100, such as the signatures, weights, thresholds, etc. The sample input circuit 1110 provides an interface for the classification system 1100 to receive biological samples to be analyzed. The sample processing circuit 1120 may further process the biological sample within the classification system 1100 so as to prepare the biological sample for automated analysis.

With reference to FIG. 11, a classification system and/or computer program product 1100 may be used in or by a platform, according to various embodiments described herein. A classification system and/or computer program product 1100 may be embodied as one or more enterprise, application, personal, pervasive and/or embedded computer systems that are operable to receive, transmit, process and store data using any suitable combination of software, firmware and/or hardware and that may be standalone and/or interconnected by any conventional, public and/or private, real and/or virtual, wired and/or wireless network including all or a portion of the global communication network known as the Internet, and may include various types of tangible, non-transitory computer readable medium.

As shown in FIG. 11, the classification system 1100 may include a processor subsystem 1140, including one or more Central Processing Units (CPU) on which one or more operating systems and/or one or more applications run. While one processor 1140 is shown, it will be understood that multiple processors 1140 may be present, which may be either electrically interconnected or separate. Processor(s) 1140 are configured to execute computer program code from memory devices, such as memory 1150, to perform at least some of the operations and methods described herein, and may be any conventional or special purpose processor, including, but not limited to, digital signal processor (DSP), field programmable gate array (FPGA), application specific integrated circuit (ASIC), and multi-core processors.

The memory subsystem 1150 may include a hierarchy of memory devices such as Random Access Memory (RAM), Read-Only Memory (ROM), Erasable Programmable Read-Only Memory (EPROM) or flash memory, and/or any other solid state memory devices.

A storage circuit 1170 may also be provided, which may include, for example, a portable computer diskette, a hard disk, a portable Compact Disk Read-Only Memory (CDROM), an optical storage device, a magnetic storage device and/or any other kind of disk- or tape-based storage subsystem. The storage circuit 1170 may provide non-volatile storage of data/parameters/classifiers for the classification system 1100. The storage circuit 1170 may include disk drive and/or network store components. The storage circuit 1170 may be used to store code to be executed and/or data to be accessed by the processor 1140. In some embodiments, the storage circuit 1170 may store databases which provide access to the data/parameters/classifiers used for the classification system 1110 such as the signatures, weights, thresholds, etc. Any combination of one or more computer readable media may be utilized by the storage circuit 1170. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. As used herein, a computer readable storage medium may be any tangible medium that can contain, or store a program for use by or in connection with an instruction execution system, apparatus, or device.

An input/output circuit 1160 may include displays and/or user input devices, such as keyboards, touch screens and/or pointing devices. Devices attached to the input/output circuit 1160 may be used to provide information to the processor 1140 by a user of the classification system 1100. Devices attached to the input/output circuit 1160 may include networking or communication controllers, input devices (keyboard, a mouse, touch screen, etc.) and output devices (printer or display). The input/output circuit 1160 may also provide an interface to devices, such as a display and/or printer, to which results of the operations of the classification system 1100 can be communicated so as to be provided to the user of the classification system 1100.

An optional update circuit 1180 may be included as an interface for providing updates to the classification system 1100. Updates may include updates to the code executed by the processor 1140 that are stored in the memory 1150 and/or the storage circuit 1170. Updates provided via the update circuit 1180 may also include updates to portions of the storage circuit 1170 related to a database and/or other data storage format which maintains information for the classification system 1100, such as the signatures, weights, thresholds, etc.

The sample input circuit 1110 of the classification system 1100 may provide an interface for the platform as described hereinabove to receive biological samples to be analyzed. The sample input circuit 1110 may include mechanical elements, as well as electrical elements, which receive a biological sample provided by a user to the classification system 1100 and transport the biological sample within the classification system 1100 and/or platform to be processed. The sample input circuit 1110 may include a bar code reader that identifies a bar-coded container for identification of the sample and/or test order form. The sample processing circuit 1120 may further process the biological sample within the classification system 1100 and/or platform so as to prepare the biological sample for automated analysis. The sample analysis circuit 1130 may automatically analyze the processed biological sample. The sample analysis circuit 1130 may be used in measuring, e.g., gene expression levels of a pre-defined set of genes with the biological sample provided to the classification system 1100. The sample analysis circuit 1130 may also generate normalized gene expression values by normalizing the gene expression levels. The sample analysis circuit 1130 may retrieve from the storage circuit 1170 a bacterial acute respiratory infection (ARI) classifier, a viral ARI classifier and a non-infectious illness classifier, these classifier(s) comprising pre-defined weighting values (i.e., coefficients) for each of the genes of the pre-defined set of genes. The sample analysis circuit 1130 may enter the normalized gene expression values into one or more acute respiratory illness classifiers selected from the bacterial acute respiratory infection (ARI) classifier, the viral ARI classifier and the non-infectious illness classifier. The sample analysis circuit 1130 may calculate an etiology probability for one or more of a bacterial ARI, viral ARI and non-infectious illness based upon said classifier(s) and control output, via the input/output circuit 1160, of a determination whether the acute respiratory illness in the subject is bacterial in origin, viral in origin, non-infectious in origin, or some combination thereof.

The sample input circuit 1110, the sample processing circuit 1120, the sample analysis circuit 1130, the input/output circuit 1160, the storage circuit 1170, and/or the update circuit 1180 may execute at least partially under the control of the one or more processors 1140 of the classification system 1100. As used herein, executing "under the control" of the processor 1140 means that the operations performed by the sample input circuit 1110, the sample processing circuit 1120, the sample analysis circuit 1130, the input/output circuit 1160, the storage circuit 1170, and/or the update circuit 1180 may be at least partially executed and/or directed by the processor 1140, but does not preclude at least a portion of the operations of those components being separately electrically or mechanically automated. The processor 1140 may control the operations of the classification system 1100, as described herein, via the execution of computer program code.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

The program code may execute entirely on the classification system 1100, partly on the classification system 1100, as a stand-alone software package, partly on the classification system 1100 and partly on a remote computer or entirely on the remote computer or server. In the latter scenario, the remote computer may be connected to the classification system 1100 through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

In some embodiments, the system includes computer readable code that can transform quantitative, or semi-quantitative, detection of gene expression to a cumulative score or probability of the etiology of the ARI.

In some embodiments, the system is a sample-to-result system, with the components integrated such that a user can simply insert a biological sample to be tested, and some time later (preferably a short amount of time, e.g., 30 or 45 minutes, or 1, 2, or 3 hours, up to 8, 12, 24 or 48 hours) receive a result output from the system.

It is to be understood that the invention is not limited in its application to the details of construction and the arrangement of components set forth in the following description or illustrated in the following drawings. The invention is capable of other embodiments and of being practiced or of being carried out in various ways.

Recitation of ranges of values herein are merely intended to serve as a shorthand method, of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

It also is understood that any numerical range recited herein includes all values from the lower value to the upper value. For example, if a concentration range is stated as 1% to 50°%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The following examples are illustrative only and are not intended to be limiting in scope.

EXAMPLES

Example 1. Host Gene Expression Classifiers Diagnose Acute Respiratory Illness Etiology Acute respiratory infections due to bacterial or viral pathogens are among the most common reasons for seeking medical care. Current pathogen-based diagnostic approaches are not reliable or timely, thus most patients receive inappropriate antibiotics. Host response biomarkers offer an alternative diagnostic approach to direct antimicrobial use.

We asked whether host gene expression patterns discriminate infectious from non-infectious causes of illness in the acute care setting. Among those with acute respiratory infection, we determined whether infectious illness is due to viral or bacterial pathogens.

The samples that formed the basis for discovery were drawn from an observational, cohort study conducted at four tertiary care hospital emergency departments and a student health facility. 44 healthy controls and 273 patients with community-onset acute respiratory infection or non-infectious illness were selected from a larger cohort of patients with suspected sepsis (CAPSOD study). Mean age was 45 years and 45% of participants were male. Further demographic information may be found in Table 1 of Tsalik et al. (2016) Sci Transl Med 9(322):1-9, which is incorporated by reference herein.

Clinical phenotypes were adjudicated through manual chart review. Routine microbiological testing and multiplex PCR for respiratory viral pathogens were performed. Peripheral whole blood gene expression was measured using microarrays. Sparse logistic regression was used to develop classifiers of bacterial vs. viral vs. non-infectious illness. Five independently derived datasets including 328 individuals were used for validation.

Gene expression-based classifiers were developed for bacterial acute respiratory infection (71 probes), viral acute respiratory infection (33 probes), or a non-infectious cause of illness (26 probes). The three classifiers were applied to 273 patients where class assignment was determined by the highest predicted probability. Overall accuracy was 87% (238/273 concordant with clinical adjudication), which was more accurate than procalcitonin (78%, p<0.03) and three published classifiers of bacterial vs. viral infection (78-83%). The classifiers developed here externally validated in five publicly available datasets (AUC 0.90-0.99). We compared the classification accuracy of the host gene expression-based tests to procalcitonin and clinically adjudicated diagnoses, which included bacterial or viral acute respiratory infection or non-infectious illness.

The host's peripheral blood gene expression response to infection offers a diagnostic strategy complementary to those already in use.[8] This strategy has successfully characterized the host response to viral[8-13] and bacterial ARI[11, 14]. Despite these advances, several issues preclude their use as diagnostics in patient care settings. An important consideration in the development of host-based molecular signatures is that they be developed in the intended use population.[15] However, nearly all published gene expression-based ARI classifiers used healthy individuals as controls and focused on small or homogeneous populations and are thus not optimized for use in acute care settings where patients present with undifferentiated symptoms. Furthermore, the statistical methods used to identify gene-expression classifiers often include redundant genes based on clustering, univariate testing, or pathway association. These strategies identify relevant biology but do not maximize diagnostic performance. An alternative, as exemplified here, is to combine genes from unrelated pathways to generate a more informative classifier.

Methods

Classifier Derivation Cohorts

Studies were approved by relevant Institutional Review Boards, and in accord with the Declaration of Helsinki. All subjects or their legally authorized representatives provided written informed consent.

Patients with community-onset, suspected infection were enrolled in the Emergency Departments of Duke University Medical Center (DUMC; Durham, NC), the Durham VA Medical Center (DVAMC; Durham, NC), or Henry Ford Hospital (Detroit, MI) as part of the Community Acquired Pneumonia & Sepsis Outcome Diagnostics study (Clinical Trials Identifier No. NCT00258869).[16-19] Additional patients were enrolled through UNC Health Care Emergency Department (UNC; Chapel Hill, NC) as part of the Community Acquired Pneumonia and Sepsis Study. Patients were eligible if they had a known or suspected infection and if they exhibited two or more Systemic Inflammatory Response Syndrome (SIRS) criteria.[20] ARI cases included patients with upper or lower respiratory tract symptoms, as adjudicated by emergency medicine (SWG, EBQ) or infectious diseases (ELT) physicians. Adjudications were based on retrospective, manual chart reviews performed at least 28 days after enrollment and prior to any gene expression-based categorization, using previously published criteria.[17] The totality of information used to support these adjudications would not have been available to clinicians at the time of their evaluation. Seventy patients with microbiologically confirmed bacterial ARI were identified including four with pharyngitis and 66 with pneumonia. Microbiological etiologies were determined using conventional culture of blood or respiratory samples, urinary antigen testing (*Streptococcus* or *Legionella*), or with serological testing (*Mycoplasma*). Patients with viral ARI (n=115) were ascertained based on identification of a viral etiology and compatible symptoms. In addition, 48 students at Duke University as part of the DARPA Predicting Health and Disease study with definitive viral ARI using the same adjudication methods were included. The ResPlex II v2.0 viral PCR multiplex assay (Qiagen; Hilden, Germany) augmented clinical testing for viral etiology identification. This panel detects influenza A and B, adenovirus (B, E), parainfluenza 1-4, respiratory syncytial virus A and B, human metapneumovirus, human rhinovirus, coronavirus (229E, OC43, NL63, HKU1), coxsackie/echo virus, and bocavirus. Upon adjudication, a subset of enrolled patients were determined to have non-infectious illness (n=88) (Table 8). The determination of "non-infectious illness" was made only when an alternative diagnosis was established and results of any routinely ordered microbiological testing failed to support an infectious etiology. Lastly, healthy controls (n=44; median age 30 years; range 23-59) were enrolled as part of a study on the effect of aspirin on platelet function among healthy volunteers without symptoms, where gene expression analyses was performed on pre-aspirin challenge time points.[21]

Procalcitonin Measurement

Concentrations were measured at different stages during the study and as a result, different platforms were utilized based on availability. Some serum measurements were made on a Roche Elecsys 2010 analyzer (Roche Diagnostics, Laval, Canada) by electrochemiluminescent immunoassay. Additional serum measurements were made using the mini-VIDAS immunoassay (bioMerieux, Durham NC, USA). When serum was unavailable, measurements were made by the Phadia Immunology Reference Laboratory in plasma-EDTA by immunofluorescence using the B-R-A-H-M-S PCT sensitive KRYPTOR (Thermo Fisher Scientific, Portage MI, USA). Replicates were performed for some paired serum and plasma samples, revealing equivalence in concentrations. Therefore, all procalcitonin measurements were treated equivalently, regardless of testing platform.

Microarray Generation

At initial clinical presentation, patients were enrolled and samples collected for analysis. After adjudications were performed as described above, 317 subjects with clear clinical phenotypes were selected for gene expression analysis. Total RNA was extracted from human blood using the PAXgene Blood RNA Kit (Qiagen, Valencia, CA) according to the manufacturer's protocol. RNA quantity and quality were assessed using the Nanodrop spectrophotometer (Thermo Scientific, Waltham, MA) and Agilent 2100 Bioanalyzer (Agilent, Santa Clara, CA), respectively. Microarrays were RMA-normalized. Hybridization and data collection were performed at Expression Analysis (Durham, NC) using the GeneChip Human Genome U133A 2.0 Array (Affymetrix, Santa Clara, CA) according to the Affymetrix Technical Manual.

Statistical Analysis

The transcriptomes of 317 subjects (273 µl patients and 44 healthy volunteers) were measured in two microarray batches with seven overlapping samples (GSE63990). Exploratory principal component analysis and hierarchical clustering revealed substantial batch differences. These were corrected by first estimating and removing probe-wise mean batch effects using the Bayesian fixed effects model. Next, we fitted a robust linear regression model with Huber loss function using seven overlapping samples, which was used to adjust the remaining expression values.

Sparse classification methods such as sparse logistic regression perform classification and variable selection simultaneously while reducing over-fitting risk.[21] Therefore, separate gene selection strategies such as univariate testing or sparse factor models are unnecessary. Here, a sparse logistic regression model was fitted independently to each of the binary tasks using the 40% of probes with the largest variance after batch correction.[22] Specifically, we used a Lasso regularized generalized linear model with binomial likelihood with nested cross-validation to select for the regularization parameters. Code was written in Matlab using the Glmnet toolbox. This generated Bacterial ARI, Viral ARI, and Non-Infectious Illness classifiers. Provided that each binary classifier estimates class membership probabilities (e.g., probability of bacterial vs. either viral or non-infectious in the case of the Bacterial ARI classifier), we can combine the three classifiers into a single decision model (termed the ARI classifier) by following a one-versus-all scheme whereby largest membership probability assigns class label.[21] Classification performance metrics included area-under-the-receiving-operating-characteristic-curve (AUC) for binary outcomes and confusion matrices for ternary outcomes.[23]

Validation

The ARI classifier was validated using leave-one-out cross-validation in the same population from which it was derived. Independent, external validation occurred using publically available human gene expression datasets from 328 individuals (GSE6269, GSE42026, GSE40396, GSE20346, and GSE42834). Datasets were chosen if they included at least two clinical groups (bacterial ARI, viral ARI, or non-infectious illness). To match probes across different microarray platforms, each ARI classifier probe was converted to gene symbols, which were used to identify corresponding target microarray probes.

Results

Bacterial ARI, Viral ARI, and Non-Infectious Illness Classifiers

In generating host gene expression-based classifiers that distinguish between clinical states, all relevant clinical phenotypes should be represented during the model training process. This imparts specificity, allowing the model to be applied to these included clinical groups but not to clinical phenotypes that were absent from model training.[15] The target population for an ARI diagnostic not only includes patients with viral and bacterial etiologies, but must also distinguish from the alternative—those without bacterial or viral ARI. Historically, healthy individuals have served as the uninfected control group. However, this fails to consider how patients with non-infectious illness, which can present with similar clinical symptoms, would be classified, serving as a potential source of diagnostic error. To our knowledge, no ARI gene-expression based classifier has included ill, uninfected controls in its derivation. We therefore enrolled a large, heterogeneous population of patients at initial clinical presentation with community-onset viral ARI (n=115), bacterial ARI (n=70), or non-infectious illness (n=88) (Table 8). We also included a healthy adult control cohort (n=44) to define the most appropriate control population for ARI classifier development.

Figure 7:
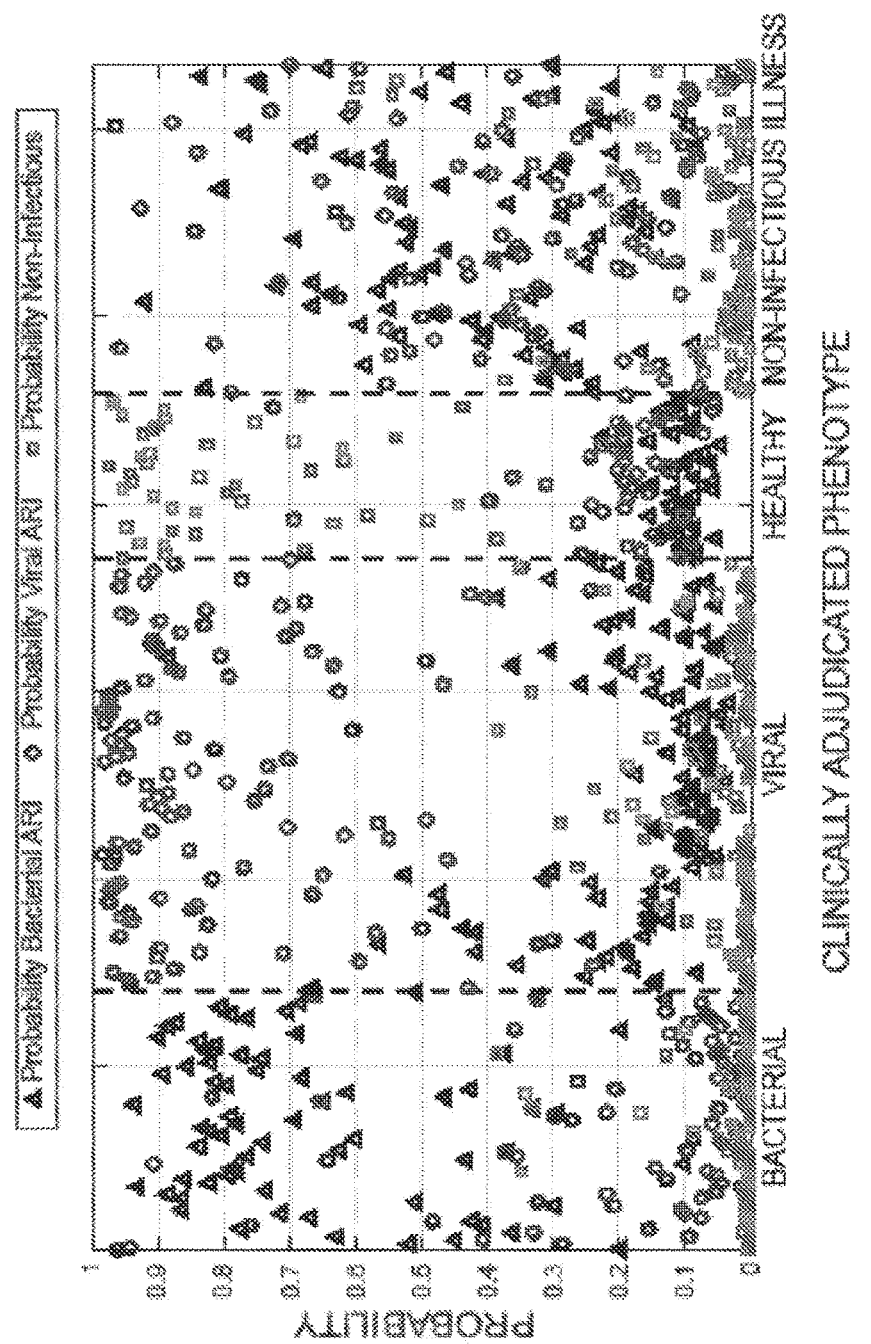
FIG. 7 is a graph showing the evaluation of healthy adults as a no-infection control, rather than an ill-but-uninfected control. This figure demonstrates the unexpected superiority of the use of ill-but-not infected subjects as the control.

We first determined whether a gene expression classifier derived with healthy individuals as controls could accurately classify patients with non-infectious illness. Array data from patients with bacterial ARI, viral ARI, and healthy controls were used to generate gene expression classifiers for these conditions. Leave-one-out cross validation revealed highly accurate discrimination between bacterial ARI (AUC 0.96), viral ARI (AUC 0.95), and healthy (AUC 1.0) subjects for a combined accuracy of 90% (FIG. 7). However, when the classifier was applied to ill-uninfected patients, 48/88 were identified as bacterial, 35/88 as viral, and 5/88 as healthy. This highlighted that healthy individuals are a poor substitute for patients with non-infectious illness in the biomarker discovery process.

Figure 5:
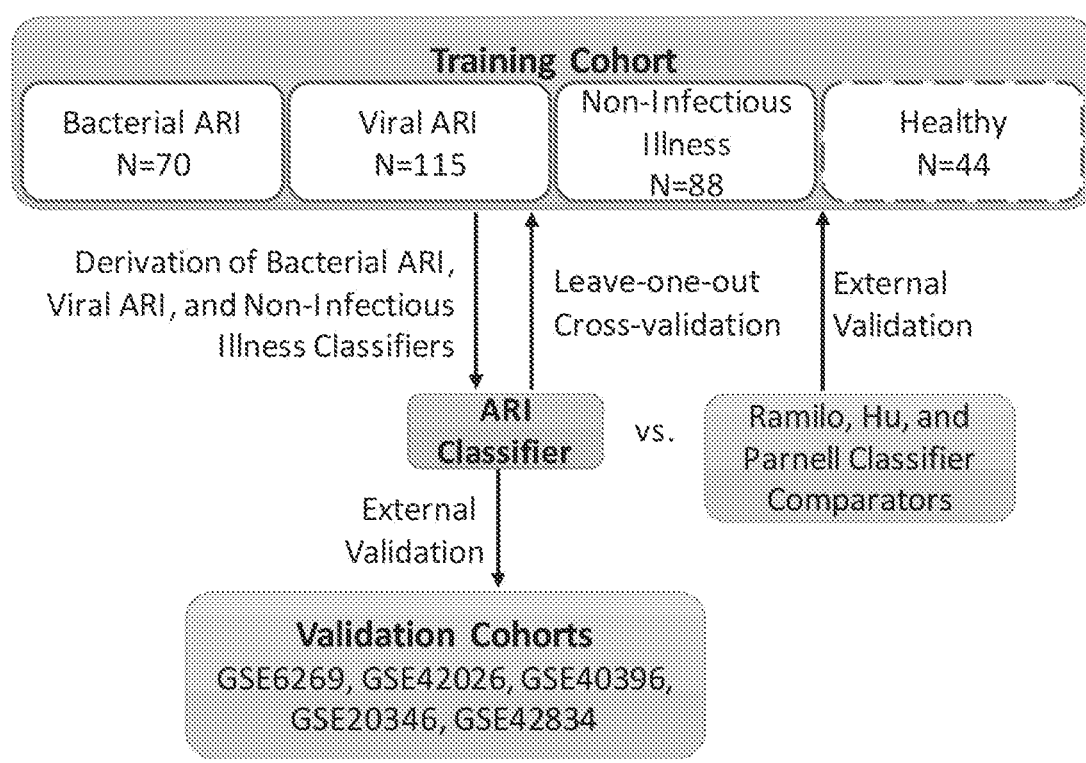
FIG. 5 is a diagram of an example training method presented in Example 1. A cohort of patients encompassing bacterial ARI, viral ARI, or non-infectious illness was used to develop classifiers of each condition. This combined ARI classifier was validated using leave one out cross-validation and compared to three published classifiers of bacterial vs. viral infection. The combined ARI classifier was also externally validated in six publically available datasets. In one experiment, healthy volunteers were included in the training set to determine their suitability as "no-infection" controls. All subsequent experiments were performed without the use of this healthy subject cohort.

Consequently, we re-derived an ARI classifier using a non-infectious illness control rather than healthy. Specifically, array data from these three groups was used to generate three gene-expression classifiers of host response to bacterial ARI, viral ARI, and non-infectious illness (FIG. 5). Specifically, the Bacterial ARI classifier was tasked with positively identifying those with bacterial ARI vs. either viral ARI or non-infectious illnesses. The Viral ARI classifier was tasked with positively identifying those with viral ARI vs. bacterial ARI or non-infectious illnesses. The Non-Infectious Illness classifier was not generated with the intention of positively identifying all non-infectious illnesses, which would require an adequate representation of all such cases.

Rather, it was generated as an alternative category, so that patients without bacterial or viral ARI could be assigned accordingly. Moreover, we hypothesized that such ill but non-infected patients were more clinically relevant controls because healthy people are unlikely to be the target for such a classification task.

Six statistical strategies were employed to generate these gene-expression classifiers: linear support vector machines, supervised factor models, sparse multinomial logistic regression, elastic nets, K-nearest neighbor, and random forests. All performed similarly although sparse logistic regression required the fewest number of classifier genes and outperformed other strategies by a small margin (data not shown). We also compared a strategy that generated three separate binary classifiers to a single multinomial classifier that would simultaneously assign a given subject to one of the three clinical categories. This latter approach required more genes and achieved an inferior accuracy. Consequently, we applied a sparse logistic regression model to define Bacterial ARI, Viral ARI, and Non-Infectious Illness classifiers containing 71, 33 and 26 probe signatures, respectively. Probe and classifier weights are shown in Table 9.

Figure 6:
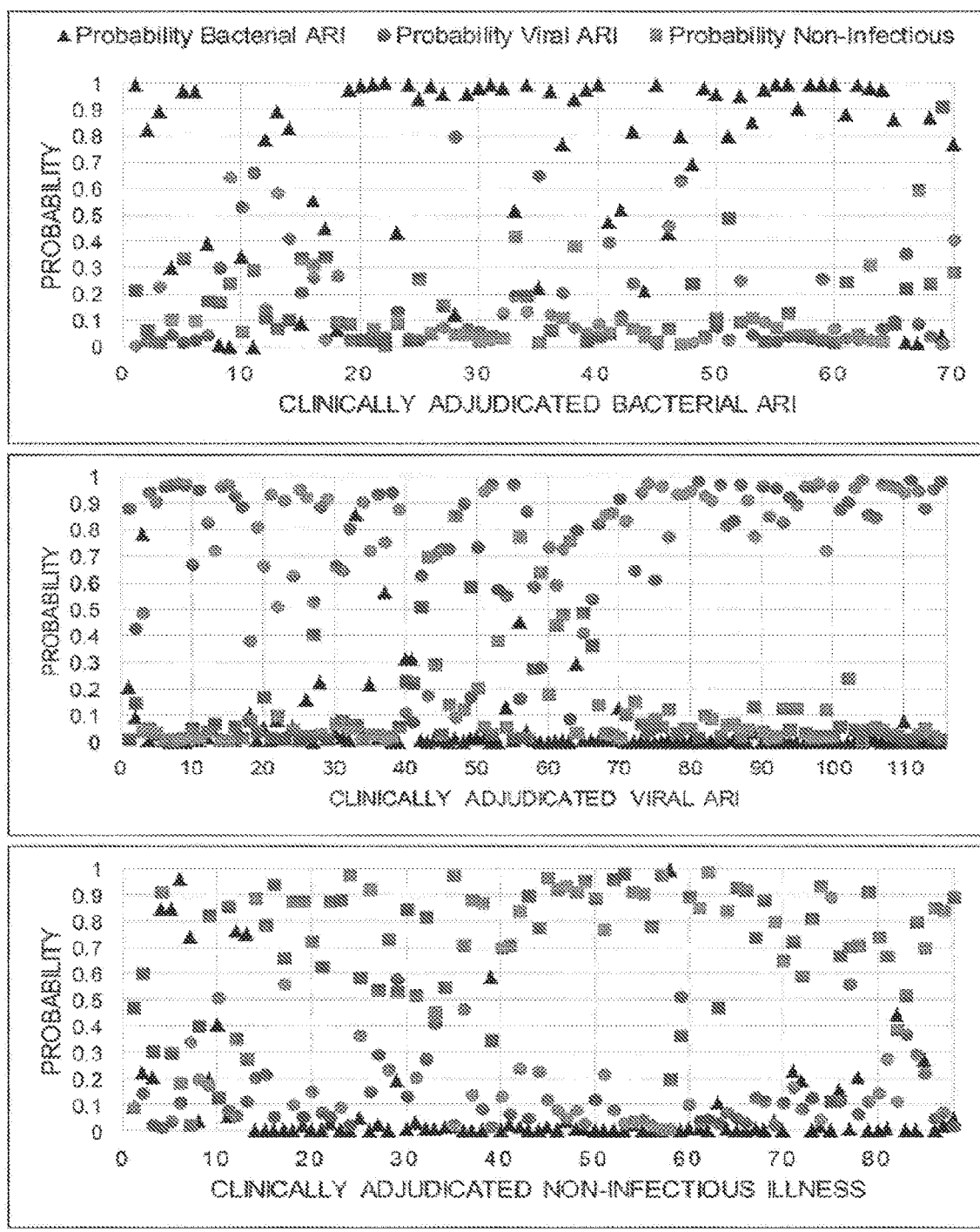
FIG. 6 presents graphs showing the results of leave-one-out cross-validation of three classifiers (bacterial ARI, viral ARI and noninfectious illness) according an example training method presented in Example 1. Each patient is assigned probabilities of having bacterial ARI (triangle), viral ARI (circle), and non-infectious illness (square). Patients clinically adjudicated as having bacterial ARI, viral ARI, or non-infectious illness, are presented in the top, center, and bottom panels, respectively. Overall classification accuracy was 87%.

Clinical decision making is infrequently binary, requiring the simultaneous distinction of multiple diagnostic possibilities. We applied all three classifiers, collectively defined as the ARI classifier, using leave-one-out cross-validation to assign probabilities of bacterial ARI, viral ARI, and non-infectious illness (FIG. 6). These conditions are not mutually exclusive. For example, the presence of a bacterial ARI does not preclude a concurrent viral ARI or non-infectious disease. Moreover, the assigned probability represents the extent to which the patient's gene expression response matches that condition's canonical signature. Since each signature intentionally functions independently of the others, the probabilities are not expected to sum to one. To simplify classification, the highest predicted probability determined class assignment. Overall classification accuracy was 87% (238/273 were concordant with adjudicated phenotype).

Figure 8:
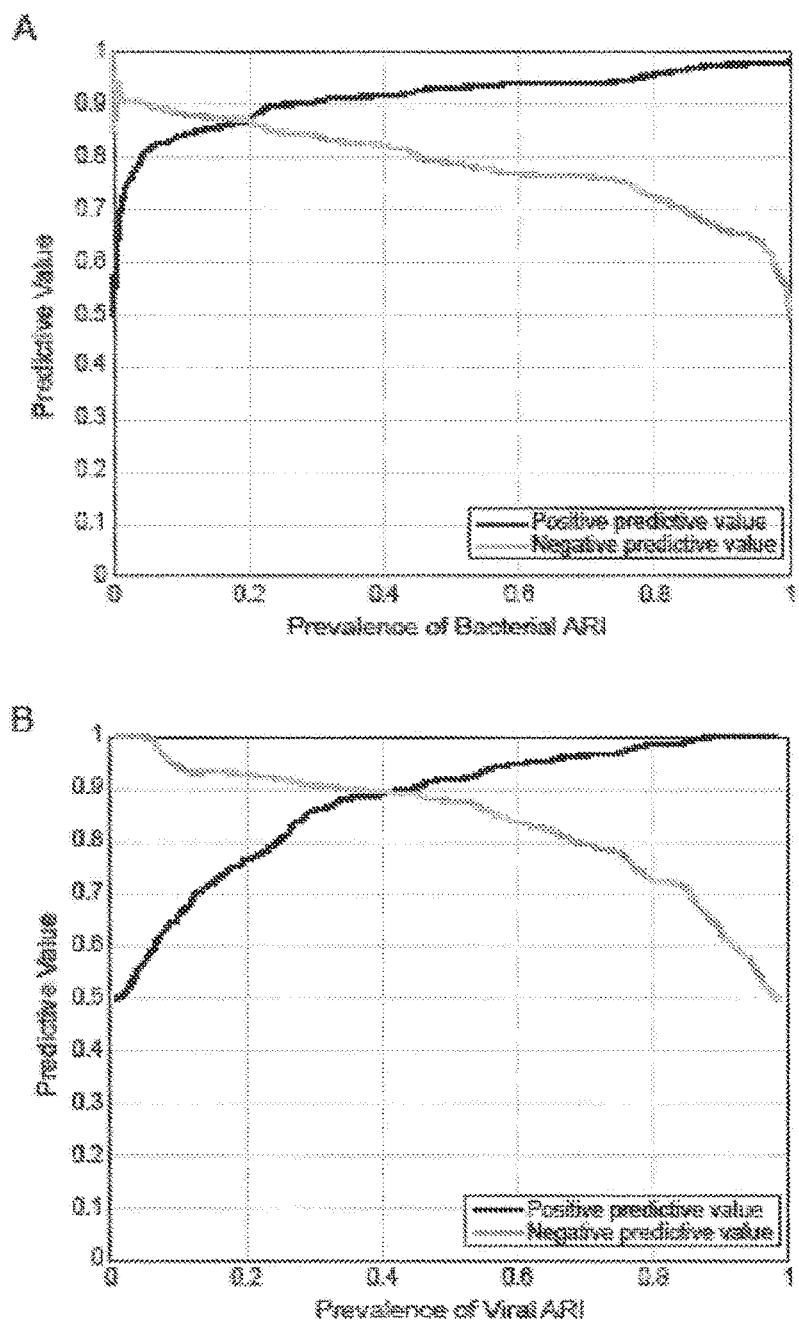
FIG. 8 shows the positive and negative predictive values for A) Bacterial and B) Viral ARI classification as a function of prevalence.

Bacterial ARI was identified in 58/70 (83%) patients and excluded 179/191 (94%) without bacterial infection. Viral ARI was identified in 90% (104/115) and excluded in 92% (145/158) of cases. Using the non-infectious illness classifier, infection was excluded in 86% of cases (76/88). Sensitivity analyses was performed for positive and negative predictive values for all three classifiers given that prevalence can vary for numerous reasons including infection type, patient characteristics, or location (FIG. 8). For both bacterial and viral classification, predictive values remained high across a range of prevalence estimates, including those typically found for ARI.

To determine if there was any effect of age, we included it as a variable in the classification scheme. This resulted in two additional correct classifications, likely due to the over-representation of young people in the viral ARI cohort. However, we observed no statistically significant differences between correctly and incorrectly classified subjects due to age (Wilcoxon rank sum p=0.17).

We compared this performance to procalcitonin, a widely used biomarker specific for bacterial infection. Procalcitonin concentrations were determined for the 238 subjects where samples were available and compared to ARI classifier performance for this subgroup. Procalcitonin concentrations >0.25 µg/L assigned patients as having bacterial ARI, whereas values 50.25 µg/L assigned patients as non-bacterial, which could be either viral ARI or non-infectious illness. Procalcitonin correctly classified 186 of 238 patients (78%) compared to 204/238 (86%) using the ARI classifier (p=0.03). However, accuracy for the two strategies varied depending on the classification task. For example, performance was similar in discriminating viral from bacterial ARI. Procalcitonin correctly classified 136/155 (AUC 0.89) compared to 140/155 for the ARI classifier (p-value-0.65 using McNemar's test with Yates correction). However, the ARI classifier was significantly better than procalcitonin in discriminating bacterial ARI from non-infectious illness [105/124 vs. 79/124 (AUC 0.72); p-value<0.001], and discriminating bacterial ARI from all other etiologies including viral and non-infectious etiologies [215/238 vs. 186/238 (AUC 0.82); p-value=0.02].

We next compared the ARI classifier to three published gene expression classifiers of bacterial vs. viral infection, each of which was derived without uninfected ill controls. These included a 35-probe classifier (Ramilo) derived from children with influenza or bacterial sepsis[11]; a 33-probe classifier (Hu) derived from children with febrile viral illness or bacterial infection[14]; and a 29-probe classifier (Parnell) derived from adult ICU patients with community-acquired pneumonia or influenza[12]. We hypothesized that classifiers generated using only patients with viral or bacterial infection would perform poorly when applied to a clinically relevant population that included ill but uninfected patients. Specifically, when presented with an individual with neither a bacterial nor a viral infection, the previously published classifiers would be unable to accurately assign that individual to a third, alternative category. We therefore applied the derived as well as published classifiers to our 273-patient cohort. Discrimination between bacterial ARI, viral ARI, and non-infectious illness was better with the derived ARI classifier (McNemar's test with Yates correction, p=0.002 vs. Ramilo; p=0.0001 vs. Parnell; and p=0.08 vs. Hu) (Table 6).[24,25] This underscores the importance of deriving gene-expression classifiers in a cohort representative of the intended use population, which in the case of ARI should include non-infectious illness.[15]

Discordant Classifications

To better understand ARI classifier performance, we individually reviewed the 35 discordant cases. Nine adjudicated bacterial infections were classified as viral and three as non-infectious illness. Four viral infections were classified as bacterial and seven as non-infectious. Eight non-infectious cases were classified as bacterial and four as viral. We did not observe a consistent pattern among discordant cases, however, notable examples included atypical bacterial infections. One patient with *M. pneumoniae* based on serological conversion and one of three patients with *Legionella* pneumonia were classified as viral AR. Of six patients with non-infectious illness due to autoimmune or inflammatory diseases, only one adjudicated to have Still's disease was classified as having bacterial infection. See also eTable 3 of Tsalik et al. (2016) *Sci Transl Med* 9(322):1-9, which is incorporated by reference herein.

External Validation

Generating classifiers from high dimensional, gene expression data can result in over-fitting. We therefore validated the ARI classifier in silico using gene expression data from 328 individuals, represented in five available datasets (GSE6269, GSE42026, GSE40396, GSE20346, and GSE42834). These were chosen because they included at least two relevant clinical groups, varying in age, geographic distribution, and illness severity (Table 7). Applying the ARI classifier to four datasets with bacterial and viral ARI, AUC ranged from 0.90-0.99. Lastly, GSE42834 included patients with bacterial pneumonia (n=19), lung cancer (n=16), and sarcoidosis (n=68). Overall classification accuracy was 96% (99/103) corresponding to an AUC of 0.99. GSE42834 included five subjects with bacterial pneumonia pre- and post-treatment. All five demonstrated a treatment-dependent resolution of the bacterial infection. See also eFigures 3-8 of Tsalik et al. (2016) *Sci Transl Med* 9(322):1-9, which is incorporated by reference herein.

Biological Pathways

Figure 9:
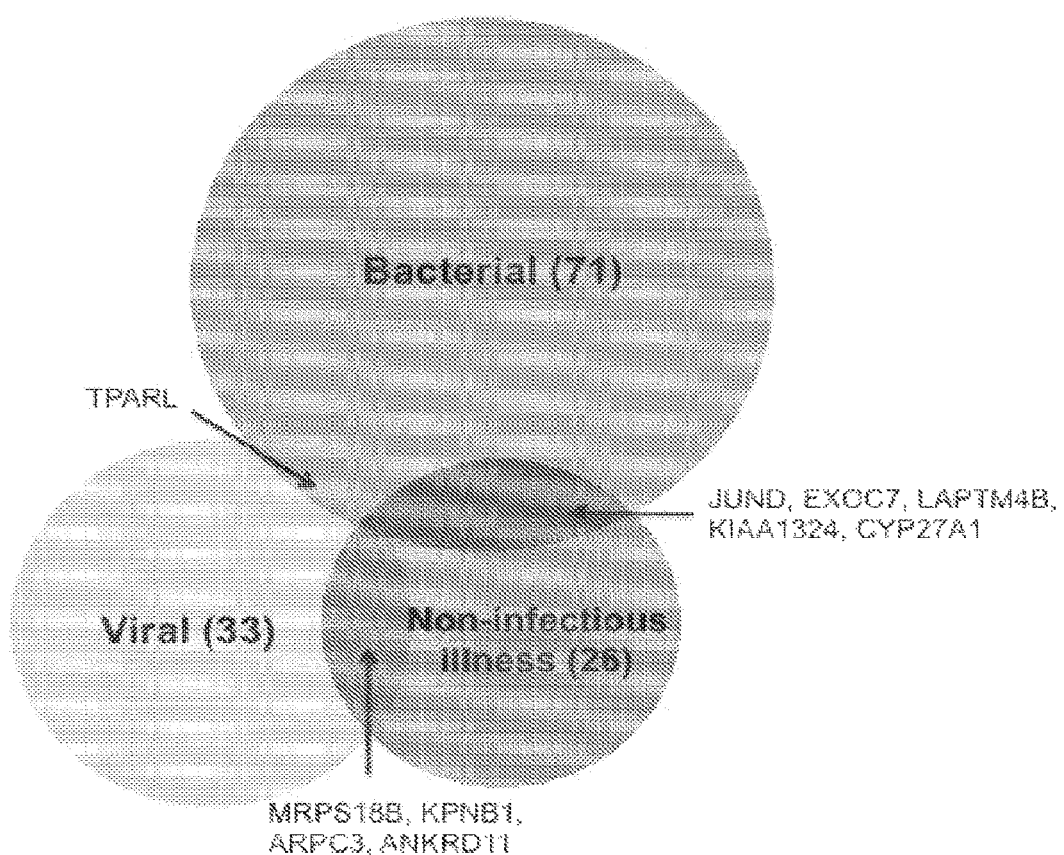
FIG. 9 is a Venn diagram representing overlap in the Bacterial ARI, Viral ARI, and Non-infectious Illness Classifiers. There are 71 genes in the Bacterial ARI Classifier, 33 in the Viral ARI Classifier, and 26 in the Non-infectious Illness Classifier. One gene overlaps between the Bacterial and Viral ARI Classifiers. Five genes overlap between the Bacterial ARI and Non-infectious Illness Classifiers. Four genes overlap between the Viral ARI and Non-infectious Illness Classifiers.

The sparse logistic regression model that generated the classifiers penalizes selection of genes from a given pathway if there is no additive diagnostic value. Consequently, conventional gene enrichment pathway analysis is not appropriate to perform. Moreover, such conventional gene enrichment analyses have been described.[9,12,14,28,29] Instead a literature review was performed for all classifier genes (Table 10). Overlap between Bacterial, Viral, and Non-infectious Illness Classifiers is shown in FIG. 9.

The Viral classifier included known anti-viral response categories such as interferon response, T-cell signaling, and RNA processing. The Viral classifier had the greatest representation of RNA processing pathways such as KPNB1, which is involved in nuclear transport and is co-opted by viruses for transport of viral proteins and genomes.[26,27] Its downregulation suggests it may play an antiviral role in the host response.

The Bacterial classifier encompassed the greatest breadth of cellular processes, notably cell cycle regulation, cell growth, and differentiation. The Bacterial classifier included genes important in T-, B-, and NK-cell signaling. Unique to the Bacterial classifier were genes involved in oxidative stress, and fatty acid and amino acid metabolism, consistent with sepsis-related metabolic perturbations.[28]

Summary of Clinical Applicability

We determined that host gene expression changes are exquisitely specific to the offending pathogen class and can be used to discriminate common etiologies of respiratory illness. This creates an opportunity to develop and utilize gene expression classifiers as novel diagnostic platforms to combat inappropriate antibiotic use and emerging antibiotic resistance. Using sparse logistic regression, we developed host gene expression profiles that accurately distinguished between bacterial and viral etiologies in patients with acute respiratory symptoms (external validation AUC 0.90-0.99). Deriving the ARI classifier with a non-infectious illness control group imparted a high negative predictive value across a wide range of prevalence estimates.

Respiratory tract infections caused 3.2 million deaths worldwide and 164 million disability-adjusted life years lost in 2011, more than any other cause.[1,2] Despite a viral etiology in the majority of cases, 73% of ambulatory care patients in the U.S. with acute respiratory infection (ARI) are prescribed an antibiotic, accounting for 41% of all antibiotics prescribed in this setting.[3,4] Even when a viral pathogen is microbiologically confirmed, this does not exclude a possible concurrent bacterial infection leading to antimicrobial prescribing "just in case". This empiricism drives antimicrobial resistance[5,6], recognized as a national security priority.[7] The encouraging metrics provided in this example provide an opportunity to provide clinically actionable results which will optimize treatment and mitigate emerging antibiotic resistance.

Several studies made notable inroads in developing host-response diagnostics for ARI. This includes response to respiratory viruses[8,10-12,14], bacterial etiologies in an ICU population[12,30], and tuberculosis[31-33]. Typically, these define host response profiles compared to the healthy state, offering valuable insights into host biology.[16,34,35] However, these gene lists are suboptimal with respect to a diagnostic application because the gene expression profiles that are a component of the diagnostic is not representative of the population for which the test will be applied.[15] Healthy individuals do not present with acute respiratory complaints, thus they are excluded from the host-response diagnostic development reported herein.

Including patients with bacterial and viral infections allows for the distinction between these two states but does not address how to classify non-infectious illness. This phenotype is important to include because patients present with infectious and non-infectious etiologies that may share symptoms. That is, symptoms may not provide a clinician with a high degree of diagnostic certainty. The current approach, which uniquely appreciates the necessity of including the three most likely states for ARI symptoms, can be applied to an undifferentiated clinical population where such a test is in greatest need.

The small number of discordant classifications occurred may have arisen either from errors in classification or clinical phenotyping. Errors in clinical phenotyping can arise from a failure to identify causative pathogens due to limitations in current microbiological diagnostics. Alternatively, some non-infectious disease processes may in fact be infection-related through mechanisms that have yet to be discovered. Discordant cases were not clearly explained by a unifying variable such as pathogen type, syndrome, or patient characteristic. As such, the gene expression classifiers presented herein may be impacted by other factors including patient-specific variables (e.g., treatment, comorbidity, duration of illness); test-specific variables (e.g., sample processing, assay conditions, RNA quality and yield); or as-of-yet unidentified variables.

Example 2: Classification Performance in Patients with Co-Infection Defined by the Identification of Bacterial and Viral Pathogens In addition to determining that age did not significantly impact classification accuracy, we assessed whether severity of illness or etiology of SIRS affected classification. Patients with viral ARI tended to be less ill, as evidenced by lower rate of hospitalization. In the various cohorts, hospitalization was used as a marker of disease severity and its impact on classification performance was assessed. This test revealed no difference (Fisher's exact test p-value of 1). In addition, the SIRS control cohort included subjects with both respiratory and non-respiratory etiologies. We assessed whether classification was different in subjects with respiratory vs. non-respiratory SIRS and determined it was not (Fisher's exact test p-value of 0.1305).

Figure 10:
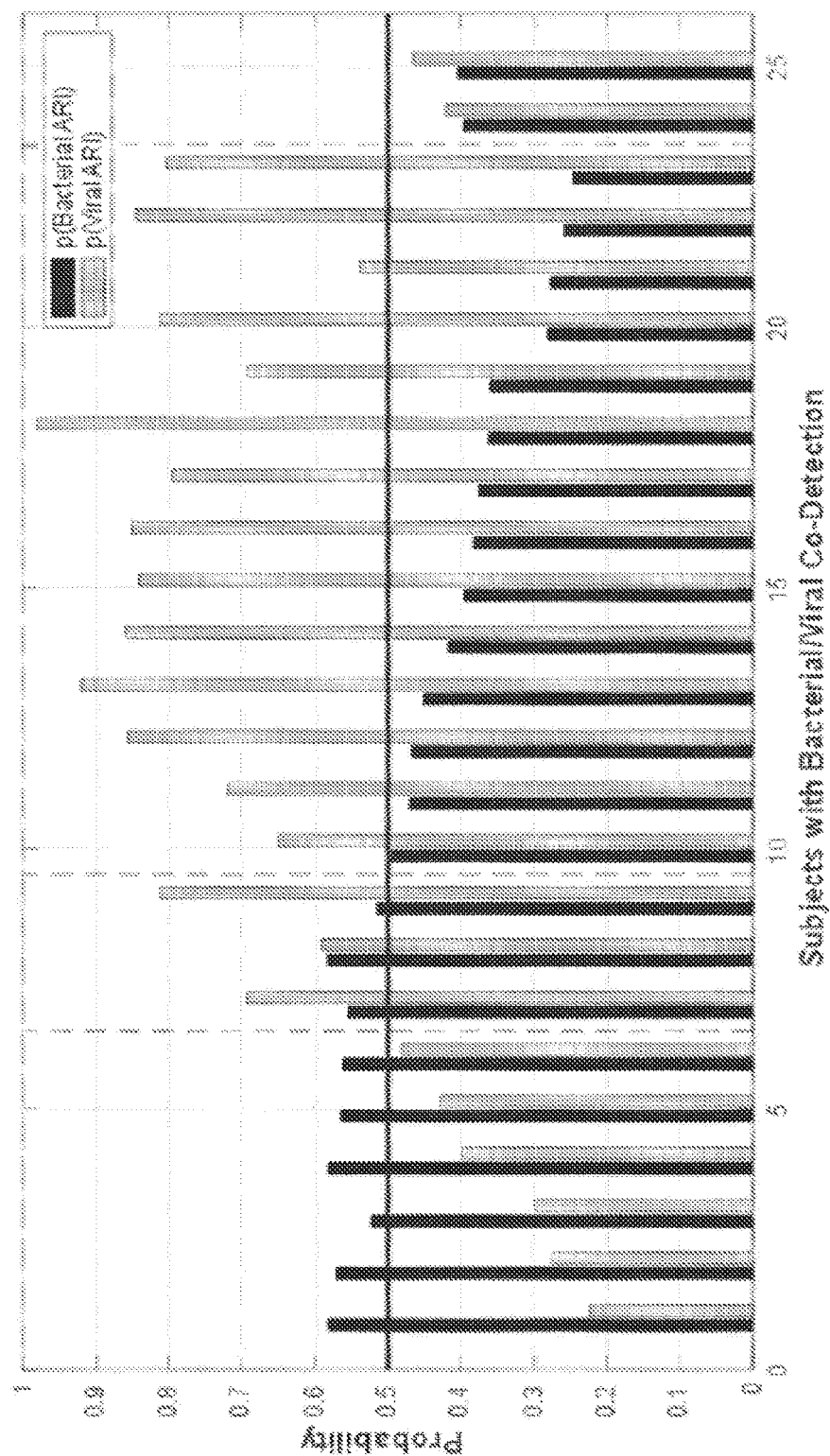
FIG. 10 is a graph showing Classifier performance in patients with co-infection by the identification of bacterial and viral pathogens. Bacterial and Viral ARI classifiers were trained on subjects with bacterial (n=22) or viral (n=71) infection (GSE60244). This same dataset also included 25 subjects with bacterial/viral co-infection. Bacterial and viral classifier predictions were normalized to the same scale, as shown in the figure. Each subject receives two probabilities: that of a bacterial ARI host response and a viral ARI host response. A probability score of 0.5 or greater was considered positive. Subjects 1-6 have a bacterial host response. Subjects 7-9 have both bacterial and viral host responses which may indicate true co-infection. Subjects 10-23 have a viral host response. Subjects 24-25 do not have bacterial or viral host responses.

Some patients with ARI will have both bacterial and viral pathogens identified, often termed co-infection. However, it is unclear how the host responds in such situations. Illness may be driven by the bacteria, the virus, both, or neither at different times in the patient's clinical course. We therefore determined how the bacterial and viral ARI classifiers performed in a population with bacterial and viral co-identification. GSE60244 included bacterial pneumonia (n=22), viral respiratory tract infection (n=71), and bacterial/viral co-identification (n=25). The co-identification group was defined by the presence of both bacterial and viral pathogens without further subcategorization as to the likelihood of bacterial or viral disease. We trained classifiers on subjects in GSE60244 with bacterial or viral infection and then validated in those with co-identification (FIG. 10). A host response was considered positive above a probability threshold of 0.5. We observed all four possible categories. Six of 25 subjects had a positive bacterial signature; 14/25 had a viral response; 3/25 had positive bacterial and viral signatures; and 2/25 had neither.

The major clinical decision faced by clinicians is whether or not to prescribe antibacterials. A simpler diagnostic strategy might focus only on the probability of bacterial ARI according to the result from the Bacterial ARI classifier. However, there is value in providing information about viral or non-infectious alternatives. For example, the confidence to withhold antibacterials in a patient with a low probability of bacterial ARI can be enhanced by a high probability of an alternative diagnosis. Further, a full diagnostic report could identify concurrent illness that a single classifier would miss. We observed this when validating in a population with bacterial and viral co-identification. These patients are more commonly referred to as "co-infected." To have infection, there must be a pathogen, a host, and a maladaptive interaction between the two. Simply identifying bacterial and viral pathogens should not imply co-infection. Although we cannot know the true infection status in the 25 subjects tested, who had evidence of bacterial/viral co-identification, the host response classifiers suggest the existence of multiple host-response states. FIG. 10 is an informative representation of infection status, which could be used by a clinician to diagnose the etiology of ARI.

REFERENCES

1. Organization. WH. Global health estimates summary tables: Deaths by cause, age and sex. 2013. Accessed May 14, 2014.
2. Organization. WH. Global Health Estimates Summary Tables: DALYs by cause, age and sex. 2013. Accessed May 14, 2014.
3. Shapiro et al. Antibiotic prescribing for adults in ambulatory care in the USA, 2007-09. *J Antimicrob Chemother.* 2014; 69(1):234-240.
4. Lee et al. Outpatient antibiotic prescribing in the United States: 2000 to 2010. *BMC Medicine.* 2014; 12:96.
5. Gould. Antibiotic resistance: the perfect storm. *Int J Antimicrob Ag.* 2009; 34, Supplement 3(0):S2-S5.
6. Kim and Gallis. Observations on spiraling empiricism: its causes, allure, and perils, with particular reference to antibiotic therapy. *Am J Med.* 1989; 87(2):201-206.
7. Obama B. Executive Order—Combating Antibiotic-Resistant Bacteria. In: House TW, ed: Office of the Press Secretary; 2014.
8. Zaas et al. Gene expression signatures diagnose influenza and other symptomatic respiratory viral infections in humans. *Cell host & microbe.* 2009; 6(3):207-217.
9. Woods et al. A Host Transcriptional Signature for Presymptomatic Detection of Infection in Humans Exposed to Influenza H1N1 or H3N2. *PLoS ONE.* 2013; 8(1):e52198.
10. Mejias et al. Whole Blood Gene Expression Profiles to Assess Pathogenesis and Disease Severity in Infants with Respiratory Syncytial Virus Infection. *PLoS medicine.* 2013; 10(11):e1001549.
11. Ramilo et al. Gene expression patterns in blood leukocytes discriminate patients with acute infections. *Blood.* 2007; 109(5):2066-2077.
12. Parnell et al. A distinct influenza infection signature in the blood transcriptome of patients who presented with severe community acquired pneumonia. *Crit Care.* 2012; 16(4):R157.
13. Zaas et al. A host-based RT-PCR gene expression signature to identify acute respiratory viral infection. *Sci trans med.* 2013; 5(203):203ra126.
14. Hu et al. Gene expression profiles in febrile children with defined viral and bacterial infection. *Proc Natl Acad Sci U S.A.* 2013.
15. Lytkin et al. Expanding the understanding of biases in development of clinical-grade molecular signatures: a case study in acute respiratory viral infections. *PLoS One.* 2011; 6(6):e20662.
16. Ahn et al. Gene expression-based classifiers identify *Staphylococcus aureus* infection in mice and humans. *PLoS One.* 2013; 8(1):e48979.
17. Glickman et al. Disease progression in hemodynamically stable patients presenting to the emergency department with sepsis. *Acad Emerg Med.* 2010; 17(4):383-390.
18. Tsalik et al. Discriminative value of inflammatory biomarkers for suspected sepsis. *J Emerg Med.* 2012; 43(1):97-106.
19. Tsalik et al. Multiplex PCR to diagnose bloodstream infections in patients admitted from the emergency department with sepsis. *J Clin Microbiol.* 2010; 48(1):26-33.
20. Bone et al. Definitions for sepsis and organ failure and guidelines for the use of innovative therapies in sepsis. The ACCP/SCCM Consensus Conference Committee. American College of Chest Physicians/Society of Critical Care Medicine. *Chest.* 1992; 101(6):1644-1655.
21. Bishop. *Pattern Recognition and Machine Learning (Information Science and Statistics).* Springer-Verlag New York, Inc.; 2006.
22. Friedman et al. Regularization Paths for Generalized Linear Models via Coordinate Descent. *J. Stat. Softw.* 2010; 33(1):1-22.
23. Fawcett. An introduction to ROC analysis. *Pattern Recognition Letters.* 2006; 27(8):861-874.
24. McNemar. Note on the sampling error of the difference between correlated proportions or percentages. *Psychometrika.* 1947; 12(2):153-157.
25. Yates. Contingency Tables Involving Small Numbers and the $\chi 2$ Test. *Supplement to the Journal of the Royal Statistical Society.* 1934; 1(2):217-235.

26. Bukrinsky et al. Active nuclear import of human immunodeficiency virus type 1 preintegration complexes. *Proc Natl Acad Sci USA*. 1992; 89(14):6580-6584.
27. Ghildyal et. al.. Nuclear import of the respiratory syncytial virus matrix protein is mediated by importin beta1 independent of importin alpha. *Biochemistry*. 2005; 44(38):12887-12895.
28. Langley et al. An Integrated Clinico-Metabolomic Model Improves Prediction of Death in Sepsis. *Sci Trans Med*. 2013; 5(195):195ra195.
29. Schappert and Rechisteiner. Ambulatory medical care utilization estimates for 2007. In: Stat VH, ed. Vol 132011.
30. Severino et al. Patterns of Gene Expression in Peripheral Blood Mononuclear Cells and Outcomes from Patients with Sepsis Secondary to Community Acquired Pneumonia. *PLoS ONE*. 2014; 9(3):e91886.
31. Anderson et al. Diagnosis of Childhood Tuberculosis and Host RNA Expression in Africa. *N Engl J Med*. 2014; 370(18):1712-1723.
32. Berry et al. An interferon-inducible neutrophil-driven blood transcriptional signature in human tuberculosis. *Nature*. 2010; 466(7309):973-977.
33. Kaforou et al. Detection of tuberculosis in HIV-infected and -uninfected African adults using whole blood RNA expression signatures: a case-control study. *PLoS medicine*. 2013; 10(10):e1001538.
34. Banchereau et al. Host immune transcriptional profiles reflect the variability in clinical disease manifestations in patients with *Staphylococcus aureus* infections. *PLoS One*. 2012; 7(4):e34390.
35. Herberg et al. Transcriptomic Profiling in Childhood H1N1/09 Influenza Reveals Reduced Expression of Protein Synthesis Genes. *J Infect Dis*. 2013; 208(10):1664-1668.
36. Bloom et al. Transcriptional blood signatures distinguish pulmonary tuberculosis, pulmonary sarcoidosis, pneumonias and lung cancers. *PLoS One*. 2013; 8(8):e70630.

TABLE 6

Performance characteristics of the derived ARI classifier.

| | | Clinical Assignment | | | |
|---|---|---|---|---|---|
| | | Bacterial | Viral | NI | |
| Ramilo et al. | Bacterial | 54 (77.1)* | 4 (3.5) | 12 (13.6) | Classifier-Predicted Assignment |
| | Viral | 6 (8.6) | 101 (87.8)* | 12 (13.6) | |
| | Non-infectious illness | 12 (14.3) | 12 (8.7) | 64 (72.7)* | |
| Hu et al. | Bacterial | 53 (75.7)* | 4 (3.5) | 9 (10.2) | |
| | Viral | 9 (12.9) | 104 (90.4)* | 9 (10.2) | |
| | Non-infectious illness | 8 (11.4) | 7 (6.1) | 70 (79.5)* | |
| Parnell et al. | Bacterial | 51 (72.8)* | 8 (7.0) | 11 (12.5) | |
| | Viral | 13 (18.6) | 94 (81.7)* | 10 (11.4) | |
| | Non-infectious illness | 6 (8.6) | 13 (11.3) | 67 (76.1)* | |
| Derived ARI Classifier | Bacterial | 58 (82.8)* | 4 (3.4) | 8 (9.0) | |
| | Viral | 9 (12.8) | 104 (90.4)* | 4 (4.5) | |
| | Non-infectious illness | 3 (4.2) | 7 (6.0) | 76 (86.3)* | |

A combination of the Bacterial ARI, Viral ARI, and Non-Infectious Illness classifiers were validated using leave-one-out cross-validation in a population of bacterial ARI (n = 70), viral ARI (n = 115), or non-infectious illness (NI, n = 88). Three published bacterial vs. viral classifiers were identified and applied to this same population as comparators. Data are presented as number (%).
Asterisks indicate correct classifications.

TABLE 7

| | | Clinical Assignment | | | |
|---|---|---|---|---|---|
| | | Bacterial | Viral | NI | AUC |
| GSE6269: Hospitalized children with Influenza A or bacterial infection | Classifier-Predicted Assignment | Bacterial | 84 | 1 | 0.95 |
| | | Viral | 2 | 26 | |
| GSE42026: Hospitalized children with Influenza H1N1/09, RSV, or bacterial infection | | Bacterial | 15 | 3 | 0.90 |
| | | Viral | 6 | 35 | |
| GSE40396: Children with adenovirus, HHV-6, enterovirus, or bacterial infection | | Bacterial | 7 | 1 | 0.93 |
| | | Viral | 3 | 32 | |
| GSE20346: Hospitalized adults with bacterial pneumonia or Influenza A | | Bacterial | 26 | 0 | 0.99 |
| | | Viral | 1 | 18 | |
| GSE42834: Adults with bacterial pneumonia, lung cancer, or sarcoidosis | | Bacterial | 18 | | 3 | 0.99 |
| | | SIRS | 1 | | 81 | |

External validation of the ARI classifier (combined bacterial ARI, viral ARI, and non-infectious classifiers).

Five Gene Expression Omnibus datasets were identified based on the inclusion of at least two of the relevant clinical groups: Viral ARI, Bacterial ARI, non-infectious illness (NI).

TABLE 8

Etiological causes of illness for subjects with viral ARI, bacterial ARI, and non-nfectious illness.

| | Number of subjects |
|---|---|
| Total Cohort | 273 |
| All Viral ARI | 115 |
| Coronavirus | 7 |
| Coxsackievirus/Echovirus | 3 |
| Cytomegalovirus | 1 |
| Enterovirus | 20 |
| Human Metapneumovirus | 9 |
| Influenza, non-typed | 7 |
| Influenza A, non-subtyped | 6 |
| Influenza A, 2009 H1N1 | 37 |
| Parainfluenza | 1 |
| Polymicrobial (Coronavirus, Rhinovirus, Coxsackievirus/Echovirus) | 1 |
| Rhinovirus | 19 |
| Respiratory Syncitial Virus | 6 |
| All Bacterial ARI | 70 |
| *Bacillus* species[a] | 1 |
| *Bordetella bronchiseptica* | 1 |
| *Enterobacter aerogenes* | 1 |
| *Escherichia coli* | 1 |
| *Haemophilus influenza* | 3 |
| *Legionella* sp. | 3 |
| *Mycoplasma pneumoniae* | 1 |
| *Pasteurella multocida* | 1 |
| Polymicrobial | 11 |
| *Pantoea* sp.; Coagulase negative *Staphylococcus* | 1 |
| *Pseudomonas aeruginosa*; *Alcaligenes xylosoxidans* | 1 |
| *Pseudomonas aeruginosa*; *Serratia marcescens* | 1 |
| *Staphylococcus aureus*; *Haemophilus influenzae* | 2 |
| *Staphylococcus aureus*; *Proteus mirabilis* | 1 |
| *Staphylococcus aureus*; *Viridans* Group *Streptococcus*; *Escherichia coli* | 1 |
| *Streptococcus pneumoniae*; *Haemophilus* sp. | 1 |
| *Streptococcus pneumoniae*; *Staphylococcus aureus* | 3 |
| *Proteus mirabilis* | 1 |
| *Pseudomonas aeruginosa* | 4 |
| *Staphylococcus aureus* | 7 |
| *Streptococcus pneumoniae* | 30 |
| *Streptococcus pyogenes* | 4 |
| Viridans Group *Streptococcus* | 1 |
| All Non-Infectious Illness | 88 |
| Acute Renal Failure; Hypovolemia | 1 |
| Alcohol intoxication; Spinal cord stenosis; Hyperglycemia | 1 |
| Arrhythmia | 2 |
| Asthma | 1 |
| AV Graft Pseudoaneurysm and Thrombus | 1 |
| Brain Metastases with Vasogenic Edema | 1 |
| Cerebrovascular Accident | 1 |
| Chest Pain | 2 |
| Cocaine Intoxication | 1 |
| Congestive Heart Failure | 13 |
| Congestive Heart Failure; Amiodarone Toxicity | 1 |
| Congestive Heart Failure; Arrhythmia | 1 |
| Chronic Obstructive Pulmonary Disease | 5 |
| Cryptogenic Organizing Pneumonia | 1 |
| Emphysema | 1 |
| Gastrointestinal Hemorrhage | 3 |
| Hematoma in Leg | 1 |
| Hemochromatosis; Abdominal Pain and Peritoneal Dialysis | 1 |
| Hemothorax | 1 |
| Heroin Overdose | 1 |
| Hyperglycemia | 2 |
| Hypertensive Emergency | 3 |
| Hypertensive Emergency with Pulmonary Edema | 1 |
| Hypovolemia | 2 |
| Infarcted Uterine Fibroid | 1 |
| Lung Cancer; Coronary Artery Disease | 1 |
| Lung Cancer; Hemoptysis | 1 |
| Mitochondrial Disorder; Acidosis | 1 |
| Myocardial Infarction | 2 |
| Myocardial Infarction; Hypovolemia | 1 |
| Nephrolithiasis | 2 |
| Pancreatitis | 4 |
| Post-operative Vocal Cord Paralysis | 1 |
| Hyperemesis Gravidarum; Allergic Rhinitis | 1 |
| Pulmonary Edema | 2 |
| Pulmonary Edema; Hypertensive Crisis | 1 |
| Pulmonary Embolism | 5 |
| Pulmonary Embolism; Myocardial Infarction | 1 |
| Pulmonary Embolism; Pulmonary Artery Hypertension | 1 |
| Pulmonary Fibrosis | 2 |
| Pulmonary Mass | 1 |
| Reactive Arthritis | 1 |
| Rhabdomyolysis | 1 |
| Ruptured Aneurysm; Hypovolemic Shock | 1 |
| Severe Aortic Stenosis | 1 |
| Small Bowel Obstruction | 1 |
| Stills Disease | 1 |
| Pulmonary Artery Hypertension; Congestive Heart Failure | 1 |
| Systemic Lupus Erythematosis | 1 |
| Tracheobronchomalacia | 1 |
| Transient Ischemic Attack | 1 |
| Ulcerative Colitis | 1 |
| Urethral Obstruction | 1 |

[a]This patient was adjudicated as having a bacterial ARI with *Bacillus* species identified as the etiologic agent. We later recognized *Bacillus* species was not the correct microbiological etiology although the clinical history was otherwise consistent with bacterial pneumonia. As this error was identified after model derivation, we included the subject in all subsequent analyses.

TABLE 9

Probes selected for the Bacterial ARI, Viral ARI, and Non-infectious Illness Classifiers. Probe names are presented as Affymetrix probe IDs. Values for each probe represent the weight of each probe in the specified classifier.

| Affymetrix Probe ID | Bacterial ARI Classifier | Viral ARI Classifier | Non-Infectious Illness Classifier | Gene Symbol | RefSeq ID | Gene Name |
|---|---|---|---|---|---|---|
| 200042_at | 0 | 0.038998 | 0 | HSPC117 | NM_014306 | chromosome 22 open reading frame 28 |
| 200947_s_at | 1.78944 | 0 | 0 | GLUD1 | NM_005271 | glutamate dehydrogenase 1 |
| 201055_s_at | 0 | 0 | 1.25363 | HNRPA0 | NM_006805 | heterogeneous nuclear ribonucleoprotein A0 |
| 201188_s_at | 0.606326 | 0 | 0 | ITPR3 | NM_002224 | inositol 1,4,5-triphosphate receptor, type 3 |
| 201341_at | 0.109677 | 0 | 0 | ENC1 | NM_003633 | ectodermal-neural cortex (with BTB-like domain) |
| 202005_at | −0.68053 | 0 | 0 | ST14 | NM_021978 | suppression of tumorigenicity 14 (colon carcinoma) |
| 202145_at | 0 | 0.166043 | 0 | LY6E | NM_002346; NM_001127213 | lymphocyte antigen 6 complex, locus E |
| 202284_s_at | −0.35646 | 0 | 0 | CDKN1A | NM_078467; NM_000389 | cyclin-dependent kinase inhibitor 1A (p21, Cip1) |
| 202411_at | −0.05224 | 0 | 0 | IFI27 | NM_005532; NM_001130080 | interferon, alpha-inducible protein 27 |
| 202509_s_at | 0 | 0 | 0.416714 | TNFAIP2 | NM_006291 | tumor necrosis factor, alpha-induced protein 2 |
| 202644_s_at | 0.340624 | 0 | 0 | TNFAIP3 | NM_006290 | tumor necrosis factor, alpha-induced protein 3 |
| 202688_at | 0 | 0.005084 | 0 | TNFSF10 | NM_003810 | tumor necrosis factor (ligand) superfamily, member 10 |
| 202709_at | 0.427849 | 0 | 0 | FMOD | NM_002023 | fibromodulin |
| 202720_at | 0 | 0.07874 | 0 | TES | NM_152829; NM_015641 | testis derived transcript (3 LIM domains) |
| 202864_s_at | 0 | 0.02937 | 0 | SP100 | NM_003113; NM_001080391 | SP100 nuclear antigen |
| 202973_x_at | −0.11208 | 0 | 0 | FAM13A1 | NM_014883; NM_001015045 | family with sequence similarity 13, member A |
| 203045_at | −0.8509 | 0 | 0 | NINJ1 | NM_004148 | ninjurin 1 |
| 203153_at | −0.13374 | 0 | 0 | IFIT1 | NM_001548 | interferon-induced protein with tetratricopeptide repeats 1 |
| 203275_at | 0 | 0.074576 | 0 | IRF2 | NM_002199 | interferon regulatory factor 2 |
| 203313_s_at | −1.09463 | 0 | 0 | TGIF | NM_173211; NM_173210; NM_003244; NM_174886; NM_173209; NM_173208; NM_173207; NM_170695 | TGFB-induced factor homeobox 1 |
| 203392_s_at | 0 | −0.01392 | 0 | CTBP1 | NM_001328; NM_001012614 | C-terminal binding protein 1 |
| 203455_s_at | 0 | 0 | −0.0805395 | SAT | NM_002970 | spermidine/spermine N1-acetyltransferase 1 |
| 203882_at | 0 | 0.034534 | 0 | ISGF3G | NM_006084 | interferon regulatory factor 9 |
| 203979_at | −0.00999 | 0 | 0.301178 | CYP27A1 | NM_000784 | cytochrome P450, family 27, subfamily A, polypeptide 1 |
| 204392_at | 0 | 0.111394 | 0 | CAMK1 | NM_003656 | calcium/calmodulin-dependent protein kinase I |
| 204490_s_at | 0.007328 | 0 | 0 | CD44 | NM_000610; NM_001001389; NM_001001390; NM_001001391; NM_001001392 | CD44 molecule (Indian blood group) |
| 204545_at | 0.342478 | 0 | 0 | PEX6 | NM_000287 | peroxisomal biogenesis factor 6 |
| 204750_s_at | 0.537475 | 0 | 0 | DSC2 | NM_004949; NM_024422 | desmocollin 2 |
| 205001_s_at | 0 | −0.06712 | 0 | DDX3Y | NM_001122665; NM_004660 | DEAD (Asp-Glu-Ala-Asp) box polypeptide 3, Y-linked |
| 205008_s_at | 0 | 0.223868 | 0 | CIB2 | NM_006383 | calcium and integrin binding family member 2 |
| 205033_s_at | 0 | −0.08786 | 0 | DEFA1 /// DEFA3 | NM_004084; NM_001042500 | defensin, alpha 1 |
| 205048_s_at | −0.01145 | 0 | 0 | PSPH | NM_004577 | phosphoserine phosphatase-like; phosphoserine phosphatase |
| 205098_at | −0.11641 | 0 | 0 | CCR1 | NM_001295 | chemokine (C-C motif) receptor 1 |
| 205153_s_at | 0.132886 | 0 | 0 | CD40 | NM_152854; NM_001250 | CD40 molecule, TNF receptor superfamily member 5 |
| 205164_at | 0.46638 | 0 | 0 | GCAT | NM_014291; NM_001171690 | glycine C-acetyltransferase (2-amino-3-ketobutyrate coenzyme A ligase) |

TABLE 9-continued

Probes selected for the Bacterial ARI, Viral ARI, and Non-infectious Illness Classifiers. Probe names are presented as Affymetrix probe IDs. Values for each probe represent the weight of each probe in the specified classifier.

| Affymetrix Probe ID | Bacterial ARI Classifier | Viral ARI Classifier | Non-Infectious Illness Classifier | Gene Symbol | RefSeq ID | Gene Name |
|---|---|---|---|---|---|---|
| 205200_at | 0.87833 | 0 | 0 | CLEC3B | NM_003278 | C-type lectin domain family 3, member B |
| 205312_at | 0 | 0 | −0.394304 | SPI1 | NM_001080547; NM_003120 | spleen focus forming virus (SFFV) proviral integration oncogene spi1 |
| 206207_at | −0.08529 | 0 | 0 | CLC | NM_001828 | Charcot-Leyden crystal protein |
| 206371_at | 0.043902 | 0 | 0 | FOLR3 | NM_000804 | folate receptor 3 (gamma) |
| 206647_at | 0.065039 | 0 | 0 | HBZ | NM_005332 | hemoglobin, zeta |
| 206676_at | 0 | 0 | 0.0774651 | CEACAM8 | NM_001816 | carcinoembryonic antigen-related cell adhesion molecule 8 |
| 206896_s_at | 0.482822 | 0 | 0 | GNG7 | NM_052847 | guanine nucleotide binding protein (G protein), gamma 7 |
| 206918_s_at | 1.00926 | 0 | 0 | CPNE1 | NM_152929; NM_152928; NM_152927; NM_003915; NM_152931; NM_152930; NM_006047; NM_152925; NM_152926; NM_152838 | copine I |
| 206934_at | 0.151959 | 0 | 0 | SIRPB1 | NM_001135844; NM_006065; NM_001083910 | signal-regulatory protein beta 1 |
| 207075_at | −0.06273 | 0 | 0 | CIAS1 | NM_004895; NM_001079821; NM_001127462; NM_001127461; NM_183395 | NLR family, pyrin domain containing 3 |
| 207194_s_at | 0.3162 | 0 | 0 | ICAM4 | NM_022377; NM_001544; NM_001039132 | intercellular adhesion molecule 4 (Landsteiner-Wiener blood group) |
| 207244_x_at | 1.30636 | 0 | 0 | CYP2A6 | NM_000762 | cytochrome P450, family 2, subfamily A, polypeptide 6 |
| 207606_s_at | 0.299775 | 0 | 0 | ARHGAP12 | NM_018287 | Rho GTPase activating protein 12 |
| 207718_x_at | 0.039296 | 0 | 0 | CYP2A6 /// CYP2A7 /// CYP2A7P1 /// CYP2A13 | NM_000764; NM_030589 | cytochrome P450, family 2, subfamily A, polypeptide 7 |
| 207840_at | 0 | 0.118889 | 0 | CD160 | NM_007053 | CD160 molecule |
| 207860_at | 0.376517 | 0 | 0 | NCR1 | NM_001145457; NM_001145458; NM_004829 | natural cytotoxicity triggering receptor 1 |
| 208029_s_at | −0.02051 | 0 | 0.394049 | LAPTM4B | NM_018407 | lysosomal protein transmembrane 4 beta |
| 208545_x_at | 0.265408 | 0 | 0 | TAF4 | NM_003185 | TAF4 RNA polymerase II, TATA box binding protein (TBP)-associated factor, 135 kDa |
| 208601_s_at | −0.27058 | 0 | 0 | TUBB1 | NM_030773 | tubulin, beta 1 |
| 208702_x_at | 0 | 0 | 0.0426262 | APLP2 | NM_001642; NM_001142277; NM_001142278; NM_001142276 | amyloid beta (A4) precursor-like protein 2 |
| 208736_at | 0 | 0.582264 | −0.0862941 | ARPC3 | NM_005719 | similar to actin related protein 2/3 complex subunit 3; hypothetical LOC729841; actin related protein 2/3 complex, subunit 3, 21 kDa |
| 208886_at | 0.149103 | 0 | 0 | H1F0 | NM_005318 | H1 histone family, member 0 |
| 208974_x_at | 0 | 0.742946 | 0 | KPNB1 | NM_002265 | karyopherin (importin) beta 1 |
| 209031_at | 0 | 0 | 0.237916 | IGSF4 | NM_014333; NM_001098517 | cell adhesion molecule 1 |
| 209360_s_at | 0.303561 | 0 | 0 | RUNX1 | NM_001122607; NM_001001890; NM_001754 | runt-related transcription factor 1 |
| 209396_s_at | 0 | 0 | 0.0355749 | CHI3L1 | NM_001276 | chitinase 3-like 1 (cartilage glycoprotein-39) |
| 209511_at | 0 | −0.03119 | 0 | POLR2F | NM_021974 | polymerase (RNA) II (DNA directed) polypeptide F |
| 209605_at | −0.49934 | 0 | 0 | TST | NM_003312 | thiosulfate sulfurtransferase (rhodanese) |

TABLE 9-continued

Probes selected for the Bacterial ARI, Viral ARI, and Non-infectious Illness Classifiers. Probe names are presented as Affymetrix probe IDs. Values for each probe represent the weight of each probe in the specified classifier.

| Affymetrix Probe ID | Bacterial ARI Classifier | Viral ARI Classifier | Non-Infectious Illness Classifier | Gene Symbol | RefSeq ID | Gene Name |
|---|---|---|---|---|---|---|
| 209919_x_at | 0.613197 | 0 | 0 | GGT1 | XM_001129425; NM_013430; NM_001032365; NM_005265; NM_001032364; XM_001129377 | gamma-glutamyltransferase light chain 3; gamma-glutamyltransferase 4 pseudogene; gamma-glutamyltransferase 2; gamma-glutamyltransferase 1; gamma-glutamyltransferase light chain 5 pseudogene |
| 210365_at | 0.576935 | 0 | 0 | RUNX1 | NM_001122607; NM_001001890; NM_001754 | runt-related transcription factor 1 |
| 210724_at | 0 | 0 | 0.482166 | EMR3 | NM_032571 | egf-like module containing, mucin-like, hormone receptor-like 3 |
| 210797_s_at | 0 | 0.185097 | 0 | OASL | NM_198213; NM_003733 | 2-5'-oligoadenylate synthetase-like |
| 212035_s_at | 2.0241 | 0 | −1.26034 | EXOC7 | NM_001145298; NM_001145299; NM_015219; NM_001145297; NM_001145296; NM_001013839 | exocyst complex component 7 |
| 212162_at | 0 | −0.01023 | 0 | KIDINS220 | NM_020738 | kinase D-interacting substrate, 220 kDa |
| 212657_s_at | 0 | 0 | −0.254507 | IL1RN | NM_000577; NM_173841; NM_173842; NM_173843 | interleukin 1 receptor antagonist |
| 212697_at | 0 | 0 | −1.02451 | LOC162427 | NM_178126 | family with sequence similarity 134, member C |
| 212708_at | 0.032564 | 0 | 0 | LOC339287 | NM_001012241 | male-specific lethal 1 homolog (Drosophila) |
| 212914_at | 0 | 0 | 0.0099678 | CBX7 | NM_175709 | chromobox homolog 7 |
| 212947_at | 0.286979 | 0 | 0 | SLC9A8 | NM_015266 | solute carrier family 9 (sodium/hydrogen exchanger), member 8 |
| 213223_at | 0.686657 | 0 | 0 | RPL28 | NM_001136134; NM_000991; NM_001136137; NM_001136135; NM_001136136 | ribosomal protein L28 |
| 213300_at | −0.5783 | 0 | 0 | KIAA0404 | NM_015104 | ATG2 autophagy related 2 homolog A (S. cerevisiae) |
| 213573_at | 0 | 0 | −0.497655 | KPNB1 | NM_002265 | karyopherin (importin) beta 1 |
| 213633_at | −1.01336 | 0 | 0 | SH3BP1 | NM_018957 | SH3-domain binding protein 1 |
| 214085_x_at | −0.36761 | 0 | 0 | GLIPR1 | NM_006851 | GLI pathogenesis-related 1 |
| 214097_at | 0.00915 | −0.5768 | 0 | RPS21 | NM_001024 | ribosomal protein S21 |
| 214175_x_at | 0 | 0 | −0.266628 | PDLIM4 | NM_003687; NM_001131027 | PDZ and LIM domain 4 |
| 214326_x_at | −0.69811 | 0 | 0.261075 | JUND | NM_005354 | jun D proto-oncogene |
| 214582_at | 0 | 0 | 0.0377349 | PDE3B | NM_000922 | phosphodiesterase 3B, cGMP-inhibited |
| 214617_at | −0.26196 | 0 | 0 | PRF1 | NM_005041; NM_001083116 | perforin 1 (pore forming protein) |
| 214800_x_at | 0 | 0.103261 | 0 | BTF3 /// LOC345829 | NM_001037637; NM_001207 | basic transcription factor 3; basic transcription factor 3, like 1 pseudogene |
| 214955_at | −0.10065 | 0 | 0 | TMPRSS6 | NM_153609 | transmembrane protease, serine 6 |
| 215184_at | 0 | −0.06503 | 0 | DAPK2 | NM_014326 | death-associated protein kinase 2 |
| 215268_at | 0.038178 | 0 | 0 | KIAA0754 | NM_015038 | hypothetical LOC643314 |
| 215606_s_at | 0.479765 | 0 | 0 | RAB6IP2 | NM_178040; NM_015064; NM_178037; NM_178038; NM_178039 | ELKS/RAB6-interacting/CAST family member 1 |
| 215804_at | 1.94364 | 0 | 0 | EPHA1 | NM_005232 | EPH receptor A1 |
| 215848_at | 0 | 0.326241 | 0 | ZNF291 | NM_001145923; NM_020843 | S-phase cyclin A-associated protein in the ER |
| 216289_at | 0 | −0.00075 | 0 | | XM_002347085; NM_002342934; XM_002346195; NM_001161808 | G protein-coupled receptor 144 |

TABLE 9-continued

Probes selected for the Bacterial ARI, Viral ARI, and Non-infectious Illness Classifiers. Probe names are presented as Affymetrix probe IDs. Values for each probe represent the weight of each probe in the specified classifier.

| Affymetrix Probe ID | Bacterial ARI Classifier | Viral ARI Classifier | Non-Infectious Illness Classifier | Gene Symbol | RefSeq ID | Gene Name |
|---|---|---|---|---|---|---|
| 216303_s_at | 0.31126 | 0 | 0 | MTMR1 | NM_003828 | myotubularin related protein 1 |
| 216473_x_at | 0 | −0.0343 | 0 | DUX4 /// LOC399839 /// LOC401650 /// LOC444013 /// LOC444014 /// LOC444015 /// LOC444016 /// LOC444017 /// LOC441056 | XM_927996; XM_001720078; XM_001722088; NM_001164467; XM_928023; XM_495858; XM_941455; NM_001127386; XM_001720082; XM_001720798; XM_496731; NM_001127387; XM_495854; XM_495855; NM_001127388; NM_033178; NM_001127389; XM_001724713 | double homeobox, 4-like; similar to double homeobox 4c; similar to double homeobox, 4; double homeobox, 4 |
| 216713_at | 0.510039 | 0 | 0 | KRIT1 | NM_194454; NM_001013406; NM_004912; NM_194456; NM_194455 | KRIT1, ankyrin repeat containing |
| 216867_s_at | −0.05347 | 0 | 0 | PDGFA | NM_033023; NM_002607 | platelet-derived growth factor alpha polypeptide |
| 217143_s_at | −0.3891 | 0 | 0 | TRA@ /// TRD@ | | ambiguous (pending) |
| 217408_at | 0 | 1.07798 | −0.0690681 | MRPS18B | NM_014046 | mitochondrial ribosomal protein S18B |
| 217593_at | −0.07475 | 0 | 0 | ZNF447 | NM_001145542; NM_001145543; NM_001145544; NM_023926 | zinc finger and SCAN domain containing 18 |
| 217717_s_at | 0.638943 | 0 | 0 | YWHAB | NM_139323; NM_003404 | tyrosine 3-monooxygenase/tryptophan 5-monooxygenase activation protein, beta polypeptide |
| 218095_s_at | 0 | −0.61377 | 0 | TPARL | NM_018475 | transmembrane protein 165 |
| 218306_s_at | 0 | 0 | 0.784894 | HERC1 | NM_003922 | hect (homologous to the E6-AP (UBE3A) carboxyl terminus) domain and RCC1 (CHC1)-like domain (RLD) 1 |
| 218595_s_at | 0 | 0 | −0.411708 | HEATR1 | NM_018072 | HEAT repeat containing 1 |
| 218812_s_at | −0.96799 | 0 | 0 | C7orf19 | NM_032831; NM_001126340 | ORAI calcium release-activated calcium modulator 2 |
| 219055_at | −0.08524 | 0 | 0 | FLJ10379 | NM_018079 | S1 RNA binding domain 1 |
| 219066_at | 0 | 0.221446 | 0 | PPCDC | NM_021823 | phosphopantothenoylcysteine decarboxylase |
| 219130_at | 0 | −0.15077 | 0 | FLJ10287 | NM_019083 | coiled-coil domain containing 76 |
| 219382_at | 0.866643 | 0 | 0 | SERTAD3 | NM_013368; NM_203344 | SERTA domain containing 3 |
| 219437_s_at | 0 | −0.40545 | 0.198273 | ANKRD11 | XM_001720760; NM_013275; XM_001721661; XM_001721649 | ankyrin repeat domain 11; hypothetical protein LOC100128265 |
| 219523_s_at | 0 | 0 | −0.0236667 | ODZ3 | NM_001080477 | odz, odd Oz/ten-m homolog 3 (Drosophila) |
| 219777_at | −0.86817 | 0.25509 | 0 | GIMAP6 | NM_024711 | GTPase, IMAP family member 6 |
| 220059_at | 0.399475 | 0 | 0 | BRDG1 | NM_012108 | signal transducing adaptor family member 1 |
| 220122_at | 0 | 0 | 0 | MCTP1 | NM_024717; NM_001002796 | multiple C2 domains, transmembrane 1 |
| 220308_at | 0 | −0.03456 | 0 | CCDC19 | NM_012337 | coiled-coil domain containing 19 |
| 221491_x_at | −0.65143 | 0 | 0 | HLA-DRB1 /// HLA-DRB3 /// HLA-DRB4 | XM_002346768; NM_022555; XM_002346769 | major histocompatibility complex, class II, DR beta 3 |
| 221874_at | −0.40581 | 0 | 0.017015 | KIAA1324 | NM_020775 | KIAA1324 |
| 222059_at | 0 | −0.11226 | 0 | ZNF335 | NM_022095 | zinc finger protein 335 |
| 44673_at | −0.0308 | 0 | 0 | SN | NM_023068 | sialic acid binding Ig-like lectin 1, sialoadhesin |
| 216571_at | 0.878426 | 0 | 0 | | NM_000543; NM_001007593 | sphingomyelin phosphodiesterase 1, acid lysosomal |
| 216943_at | −0.91643 | 0 | 0 | | | |
| 207436_x_at | 0 | 0.243737 | 0 | KIAA0894 | | ambiguous (pending) |

TABLE 10

Genes in the Bacterial ARI, Viral ARI, and Non-infectious Illness (NI) Classifiers, grouped by biologic process. Gene accession numbers are provided in Table 9.

| Biologic process | Bacterial | Viral | NI |
|---|---|---|---|
| Cell cycle regulation | JUND* (−), NINJ1, IFI27, CDKN1A, C7orf19, SERTAD3 | ZNF291 | JUND* (+) |
| Regulation of cell growth | YWHAB, PDGFA | | APLP2 |
| Development/ Differentiation | GLIPR1, RUNX1, ST14, TGIF, EPHA1 | CTBP1 | SP1, CEACAM8, ODZ3 |
| RNA transcription, processing | FLJ10379, RPS21* (+), RPL28, TAF4, RPP25 | DDX3Y, POLR2F, RPS21* (−), BTF3, MRPS18B* (+), HSPC117, FLJ10287 | HEATR1, MRPS18B* (−) |
| Role in nuclear transport | | KPNB1 | KPNB1 |
| Role in cell and membrane trafficking | RAB6IP2, SH3BP1, EXOC7* (+), LAPTM4B, CPNE1, GNG7, TPARL, KIAA1324 | TPARL | EXOC7* (−), HERC1, LAPTM4B, KIAA1324, APLP2 |
| Cell structure/adhesion | TMPRSS6, TUBB1, ARHGAP12, ICAM4, DSC2, FMOD | TES, ARPC3* (+), KIDINS220 | PDLIM4, IGSF4, PDE3B, ARPC3* (−), CHI3L1 |
| Role in cell stress response | KIAA1324, KRIT1, ENC1 | | CBX7, APLP2, KIAA1324 |
| Role in autophagy | LAPTM4B* (−), KIAA1324* (−) | | KIAA1324* (+), LAPTM4B* (+) |
| Role in apoptosis | KRIT1, GLIPR1, CIAS1 | DAPK2, TNFSF10 | |
| General Inflammatory response | TNFAIP3, FMOD, ITPR3, CIAS1, GNG7, CLC, IFI27, CCR1 | TNFSF10 | HNRPAO, EMR3, IL1RN, TNFAIP2, CHI3L1 |
| Interferon response | IFIT1 | SP100, IRF2, OASL, ISGF3G | |
| Cytotoxic response | PRF1 | DefA1/3 | |
| Toxin response | P450 gene cluster, CYP2A6, ENC1, GGT1, TST | | |
| T-cell signaling | TRA/D@, CD44 | Ly6E, CAMK1, CD160 | |
| B-cell signaling | BRDG1, HLA-DRB1/3/4, CD40 | | |
| NK-cell response | NCR1 | CD160 | |
| Phospholipid and calcium signaling | MTMR1, CPNE1, PSPH, ITPR3, CLC, MCTP1 | | |
| Fatty acid metabolism | PEX6, GLUD1 | | |
| Cholesterol metabolism | CYP27A1* (−) | | CYP27A1* (+) |
| Amino acid metabolism | GLUD1, PSPH, GCAT | | |

*Genes listed in more than one classifier. In cases where such overlapping genes have different directions of expression, increased expression is denoted by (+) and decreased expression is denoted by (−).

Example 3: The Bacterial/Viral/SIRS Assay Contemplated on a TLDA Platform

We will develop a custom multianalyte, quantitative real-time PCR (RT-PCR) assay on the 384 well TaqMan Low Density Array (TLDA, Applied Biosystems) platform. TLDA cards will be manufactured with one or more TaqMan primer/probe sets specific for agene mRNA transcript in the classifier(s) in each well, along with multiple endogenous control RNA targets (primer/probe sets) for data normalization. For each patient sample, purified total RNA is reverse transcribed into cDNA, loaded into a master well and distributed into each assay well via centrifugation through microfluidic channels. TaqMan hydrolysis probes rely on 5' to 3' exonuclease activity to cleave the dual-labeled probe during hybridization to complementary target sequence with each amplification round, resulting in fluorescent signal production. In this manner, quantitative detection of the accumulated PCR products in "real-time" is possible. During exponential amplification and detection, the number of PCR cycles at which the fluorescent signal exceeds a detection threshold is the threshold cycle ($C_t$) or quantification cycle ($C_q$)—as determined by commercial software for the RT-PCR instrument. To quantify gene expression, the $C_t$ for a target RNA is subtracted from the $C_t$ of endogenous normalization RNA (or the geometric mean of multiple normalization RNAs), providing a delta$C_t$ value for each RNA target within a sample which indicates relative expression of a target RNA normalized for variability in amount or quality of input sample RNA or cDNA.

The data for the quantified gene signatures are then processed using a computer and according to the probit classifier described above (equation 1) and reproduce here. Normalized gene expression levels of each gene of the signature are the explanatory or independent variables or features used in the classifier, in this example the general form of the classifier is a probit regression formulation:

$$P(\text{having condition}) = \Phi(\beta_1 X_1 + \beta_2 X_2 + \ldots + \beta_d X_d) \quad \text{(equation 1)}$$

where the condition is bacterial ARI, viral ARI, or non-infection illness; $\Phi(\cdot)$ is the probit link function; $\{\beta_1, \beta_2, \ldots, \beta_d\}$ are the coefficients obtained during training; $\{X_1, X_2, \ldots, X_d\}$ are the normalized genes expression values of the signature; and d is the size of the signature (number of genes). The value of the coefficients for each explanatory variable are specific to the technology platform used to measure the expression of the genes or a subset of genes used in the probit regression model. The computer program computes a score, or probability, and compares the score to a threshold value. The sensitivity, specificity, and overall accuracy of each classifier is optimized by changing the threshold for classification using receiving operating characteristic (ROC) curves.

A preliminary list of genes for the TLDA platform based on the signature from the Affymetrix platform (Affy signature) as well as from other sources is provided below in Table 1A. Weights appropriate for the TLDA platform for the respective classifiers were thereafter determined as described below in Example 4.

TABLE 1A

Preliminary list of genes for development of classifiers for TLDA platform.

| Original Affy ID | Alternate Affy ID | GROUP | Bacterial | Viral | Non-infectious | GENE | TLDA assay identifier |
|---|---|---|---|---|---|---|---|
| 219437_s_at | 212332_at | Affy signature | — | — | — | ANKRD11 | Hs00331872_s1 |
| 208702_x_at | 201642_at | Affy signature | — | — | — | APLP2 | Hs00155778_m1 |
| 207606_s_at | 212633_at | Affy signature | — | — | — | ARHGAP12 | Hs00367895_m1 |
| 201659_s_at | 209444_at | Affy signature | — | — | — | ARL1 | Hs01029870_m1 |
| 208736_at | 201132_at | Affy signature | — | — | — | ARPC3 | Hs00855185_g1 |
| 205965_at | 218695_at | Affy signature | — | — | — | BATF | Hs00232390_m1 |
| 214800_x_at | 209876_at | Affy signature | — | — | — | BTF3 | Hs00852566_g1 |
| 209031_at | 209340_at | Affy signature | — | — | — | CADM1 | Hs00296064_s1 |
| 204392_at | 214054_at | Affy signature | — | — | — | CAMK1 | Hs00269334_m1 |
| 201949_x_at | 37012_at | Affy signature | — | — | — | CAPZB | Hs00191827_m1 |
| 207840_at | 213830_at | Affy signature | — | — | — | CD160 | Hs00199894_m1 |
| 200663_at | 203234_at | Affy signature | — | — | — | CD63 | Hs00156390_m1 |
| 220935_s_at | 219271_at | Affy signature | — | — | — | CDK5RAP2 | Hs01001427_m1 |
| 206676_at | 207269_at | Affy signature | — | — | — | CEACAM8 | Hs00266198_m1 |
| 209396_s_at | 209395_at | Affy signature | — | — | — | CHI3L1 | Hs01072230_g1 |
| 205008_s_at | 58900_at | Affy signature | — | — | — | CIB2 | Hs00197280_m1 |
| 205200_at | 206034_at | Affy signature | — | — | — | CLEC3B | Hs00162844_m1 |
| 203979_at | 49111_at | Affy signature | — | — | — | CYP27A1 | Hs01017992_g1 |
| 207244_x_at | 209280_at | Affy signature | — | — | — | CYP2A13 | Hs00711162_s1 |
| 215184_at | 217521_at | Affy signature | — | — | — | DAPK2 | Hs00204888_m1 |
| 205001_s_at | 214131_at | Affy signature | — | — | — | DDX3Y | Hs00965254_gH |
| 205033_s_at | 207269_at | Affy signature | — | — | — | DEFA3 | Hs00414018_m1 |
| 204750_s_at | 205418_at | Affy signature | — | — | — | DSC2 | Hs00951428_m1 |
| 216473_x_at | 221660_at | Affy signature | — | — | — | DUX4 | Hs03037970_g1 |
| 210724_at | 220246_at | Affy signature | — | — | — | EMR3 | Hs01128745_m1 |
| 215804_at | 206903_at | Affy signature | — | — | — | EPHA1 | Hs00975876_g1 |
| 212035_s_at | 200935_at | Affy signature | — | — | — | EXOC7 | Hs01117053_m1 |
| 212697_at | 46665_at | Affy signature | — | — | — | FAM134C | Hs00738661_m1 |
| 209919_x_at | 218695_at | Affy signature | — | — | — | GGT1 | Hs00980756_m1 |
| 219777_at | 202963_at | Affy signature | — | — | — | GIMAP6 | Hs00226776_m1 |
| 200947_s_at | 202126_at | Affy signature | — | — | — | GLUD1 | Hs03989560_s1 |
| 218595_s_at | 217103_at | Affy signature | — | — | — | HEATR1 | Hs00985319_m1 |
| 218306_s_at | 212232_at | Affy signature | — | — | — | HERC1 | Hs01032528_m1 |
| 221491_x_at | 203290_at | Affy signature | — | — | — | HLA-DRB3 | Hs00734212_m1 |
| 201055_s_at | 37012_at | Affy signature | — | — | — | HNRNPA0 | Hs00246543_s1 |
| 203153_at | 219863_at | Affy signature | — | — | — | IFIT1 | Hs01911452_s1 |
| 214022_s_at | 35254_at | Affy signature | — | — | — | IFITM1 | Hs00705137_s1 |
| 212657_s_at | 202837_at | Affy signature | — | — | — | IL1RN | Hs00893626_m1 |
| 203275_at | 213038_at | Affy signature | — | — | — | IRF2 | Hs01082884_m1 |
| 203882_at | 201649_at | Affy signature | — | — | — | IRF9 | Hs00196051_m1 |
| 215268_at | 200837_at | Affy signature | — | — | — | KIAA0754 | Hs03055204_s1 |
| 221874_at | 203063_at | Affy signature | — | — | — | KIAA1324 | Hs00381767_m1 |
| 213573_at | 31845_at | Affy signature | — | — | — | KPNB1 | Hs00158514_m1 |
| 208029_s_at | 212573_at | Affy signature | — | — | — | LAPTM4B | Hs00363282_m1 |
| 202145_at | 204972_at | Affy signature | — | — | — | LY6E | Hs03045111_g1 |
| 220122_at | 218323_at | Affy signature | — | — | — | MCTP1 | Hs01115711_m1 |
| 217408_at | 212846_at | Affy signature | — | — | — | MRPS18B | Hs00204096_m1 |
| 207860_at | 212318_at | Affy signature | — | — | — | NCR1 | Hs00950814_g1 |
| 203045_at | 213038_at | Affy signature | — | — | — | NINJ1 | Hs00982607_m1 |
| 210797_s_at | 205660_at | Affy signature | — | — | — | OASL | Hs00984390_m1 |
| 214175_x_at | 204600_at | Affy signature | — | — | — | PDGFA | Hs00184792_m1 |
| 219066_at | 217497_at | Affy signature | — | — | — | PPCDC | Hs00222418_m1 |
| 214617_at | 212070_at | Affy signature | — | — | — | PRF1 | Hs00169473_m1 |
| 218700_s_at | 203816_at | Affy signature | — | — | — | RAB7L1 | Hs00187510_m1 |
| 215342_s_at | 218695_at | Affy signature | — | — | — | RABGAP1L | Hs02567906_s1 |
| 219143_s_at | 204683_at | Affy signature | — | — | — | RPP25 | Hs00706565_s1 |
| 214097_at | 201094_at | Affy signature | — | — | — | RPS21 | Hs00963477_g1 |
| 210365_at | 222307_at | Affy signature | — | — | — | SAT1 | Hs00971739_g1 |
| 215848_at | 81811_at | Affy signature | — | — | — | SCAPER | Hs02569575_s1 |
| 212900_at | 204496_at | Affy signature | — | — | — | SEC24A | Hs00378456_m1 |
| 44673_at | 219211_at | Affy signature | — | — | — | SIGLEC1 | Hs00988063_m1 |
| 201802_at | 206361_at | Affy signature | — | — | — | SLC29A1 | Hs01085704_g1 |
| 202864_s_at | 202863_at | Affy signature | — | — | — | SP100 | Hs00162109_m1 |
| 205312_at | 205707_at | Affy signature | — | — | — | SPI1 | Hs00231368_m1 |
| 202005_at | 205418_at | Affy signature | — | — | — | ST14 | Hs04330394_g1 |
| 220059_at | 202478_at | Affy signature | — | — | — | STAP1 | Hs01038134_m1 |
| 219523_s_at | 206903_at | Affy signature | — | — | — | TENM3 | Hs01111787_m1 |
| 202720_at | 201344_at | Affy signature | — | — | — | TES | Hs00210319_m1 |
| 203313_s_at | 212232_at | Affy signature | — | — | — | TGIF1 | Hs00820148_g1 |
| 218095_s_at | 219157_at | Affy signature | — | — | — | TMEM165 | Hs00218461_m1 |

TABLE 1A-continued

Preliminary list of genes for development of classifiers for TLDA platform.

| Original Affy ID | Alternate Affy ID | GROUP | Bacterial | Viral | Non-infectious | GENE | TLDA assay identifier |
|---|---|---|---|---|---|---|---|
| 202509_s_at | 212603_at | Affy signature | — | — | — | TNFAIP2 | Hs00196800_m1 |
| 219130_at | 200685_at | Affy signature | — | — | — | TRMT13 | Hs00219487_m1 |
| 208601_s_at | 205127_at | Affy signature | — | — | — | TUBB1 | Hs00258236_m1 |
| 217717_s_at | 205037_at | Affy signature | — | — | — | YWHAB | Hs00793604_m1 |
| 217593_at | 222141_at | Affy signature | — | — | — | ZSCAN18 | Hs00225073_m1 |
| 213300_at | 219014_at | Affy signature | — | — | — | ATG2A | Hs00390076_m1 |
| 212914_at | 211938_at | Affy signature | — | — | — | CBX7 | Hs00545603_m1 |
| 220308_at | 202452_at | Affy signature | — | — | — | CCDC19 | Hs01099244_m1 |
| 205098_at | 213361_at | Affy signature | — | — | — | CCR1 | Hs00928897_s1 |
| 205153_s_at | 215346_at | Affy signature | — | — | — | CD40 | Hs01002913_g1 |
| 204490_s_at | 205026_at | Affy signature | — | — | — | CD44 | Hs00153304_m1 |
| 202284_s_at | 213324_at | Affy signature | — | — | — | CDKN1A | Hs00355782_m1 |
| 206207_at | 206361_at | Affy signature | — | — | — | CLC | Hs01055743_m1 |
| 206918_s_at | 200964_at | Affy signature | — | — | — | CPNE1 | Hs00537765_m1 |
| 203392_s_at | 222265_at | Affy signature | — | — | — | CTBP1 | Hs00972289_g1 |
| 207718_x_at | 44702_at | Affy signature | — | — | — | CYP2A6 | Hs00711162_s1 |
| 207718_x_at | 44702_at | Affy signature | — | — | — | CYP2A7 | Hs00711162_s1 |
| 201341_at | 209717_at | Affy signature | — | — | — | ENC1 | Hs00171580_m1 |
| 215606_s_at | 211999_at | Affy signature | — | — | — | ERC1 | Hs00327390_s1 |
| 202973_x_at | 201417_at | Affy signature | — | — | — | FAM13A | Hs01040170_m1 |
| 202709_at | 222265_at | Affy signature | — | — | — | FMOD | Hs00157619_m1 |
| 206371_at | 205844_at | Affy signature | — | — | — | FOLR3 | Hs01549264_m1 |
| 205164_at | 209391_at | Affy signature | — | — | — | GCAT | Hs00606568_gH |
| 214085_x_at | 203799_at | Affy signature | — | — | — | GLIPR1 | Hs00199268_m1 |
| 206896_s_at | 206126_at | Affy signature | — | — | — | GNG7 | Hs00192999_m1 |
| 216289_at | 206338_at | Affy signature | — | — | — | GPR144 | Hs01369282_m1 |
| 208886_at | 213096_at | Affy signature | — | — | — | H1F0 | Hs00961932_s1 |
| 206647_at | 40850_at | Affy signature | — | — | — | HBZ | Hs00744391_s1 |
| 207194_s_at | 218225_at | Affy signature | — | — | — | ICAM4 | Hs00169941_m1 |
| 202411_at | 213797_at | Affy signature | — | — | — | IFI27 | Hs01086373_g1 |
| 201188_s_at | 213958_at | Affy signature | — | — | — | ITPR3 | Hs00609948_m1 |
| 212162_at | 210148_at | Affy signature | — | — | — | KIDINS220 | Hs01057000_m1 |
| 216713_at | 213049_at | Affy signature | — | — | — | KRIT1 | Hs01090981_m1 |
| 212708_at | 202897_at | Affy signature | — | — | — | MSL1 | Hs00290567_s1 |
| 216303_s_at | 222265_at | Affy signature | — | — | — | MTMR1 | Hs01021250_m1 |
| 207075_at | 203906_at | Affy signature | — | — | — | NLRP3 | Hs00366465_m1 |
| 214582_at | 222317_at | Affy signature | — | — | — | ORAI2 | Hs01057217_m1 |
| 216867_s_at | 202909_at | Affy signature | — | — | — | PDE38 | Hs00236997_m1 |
| 204545_at | 320_at | Affy signature | — | — | — | PDLIM4 | Hs00165457_m1 |
| 209511_at | 218333_at | Affy signature | — | — | — | POLR1C | Hs00191646_m1 |
| 209511_at | 218333_at | Affy signature | — | — | — | POLR2F | Hs00222679_m1 |
| 213633_at | 204632_at | Affy signature | — | — | — | PSG4 | Hs00978711_m1 |
| 213633_at | 204632_at | Affy signature | — | — | — | PSG4 | Hs01652476_m1 |
| 205048_s_at | 203303_at | Affy signature | — | — | — | PSPH | Hs00190154_m1 |
| 213223_at | 210607_at | Affy signature | — | — | — | RPL28 | Hs00357189_g1 |
| 200042_at | 212247_at | Affy signature | — | — | — | RTCB | Hs00204783_m1 |
| 209360_s_at | 203916_at | Affy signature | — | — | — | RUNX1 | Hs00231079_m1 |
| 219382_at | 209575_at | Affy signature | — | — | — | SERTAD3 | Hs00705989_s1 |
| 213633_at | 204632_at | Affy signature | — | — | — | SH3BP1 | Hs00978711_m1 |
| 213633_at | 204632_at | Affy signature | — | — | — | SH3BP1 | Hs01652476_m1 |
| 206934_at | 202545_at | Affy signature | — | — | — | SIRPB1 | Hs01092173_m1 |
| 212947_at | 220404_at | Affy signature | — | — | — | SLC9A8 | Hs00905708_m1 |
| 216571_at | 202396_at | Affy signature | — | — | — | SMPD1 | Hs01086851_m1 |
| 219055_at | 219439_at | Affy signature | — | — | — | SRBD1 | Hs01005222_m1 |
| 208545_x_at | 204600_at | Affy signature | — | — | — | TAF4 | Hs01122669_m1 |
| 214955_at | 217162_at | Affy signature | — | — | — | TMPRSS6 | Hs00541789_s1 |
| 202644_s_at | 55692_at | Affy signature | — | — | — | TNFAIP3 | Hs01568119_m1 |
| 202688_at | 219684_at | Affy signature | — | — | — | TNFSF10 | Hs00234356_m1 |
| 209605_at | 212897_at | Affy signature | — | — | — | TST | Hs04187383_m1 |
| 222059_at | 216076_at | Affy signature | — | — | — | ZNF335 | Hs00223060_m1 |
| 202509_s_at | NA | InTxAlternate | — | — | — | TNFAIP2 | Hs00969305_m1 |
| 202672_s_at | NA | PanViralArray | — | — | — | ATF3 | Hs00910173_m1 |
| 218943_s_at | NA | PanViralArray | — | — | — | DDX58 | Hs01061436_m1 |
| 219863_at | NA | PanViralArray | — | — | — | HERC5 | Hs01061821_m1 |
| 214059_at | NA | PanViralArray | — | — | — | IFI44 | Hs00951349_m1 |
| 204439_at | NA | PanViralArray | — | — | — | IFI44L | Hs00915294_g1 |
| 204415_at | NA | PanViralArray | — | — | — | IFI6 | Hs00242571_m1 |
| 203153_at | NA | PanViralArray | — | — | — | IFIT1 | Hs03027069_s1 |
| 217502_at | NA | PanViralArray | — | — | — | IFIT2 | Hs01922738_s1 |
| 204747_at | NA | PanViralArray | — | — | — | IFIT3 | Hs01922752_s1 |
| 205483_s_at | NA | PanViralArray | — | — | — | ISG15 | Hs01921425_s1 |
| 205569_at | NA | PanViralArray | — | — | — | LAMP3 | Hs00180880_m1 |
| 202145_at | NA | PanViralArray | — | — | — | LY6E | Hs03045111_g1 |
| 202086_at | NA | PanViralArray | — | — | — | MX1 | Hs00182073_m1 |
| 205552_s_at | NA | PanViralArray | — | — | — | OAS1 | Hs00973637_m1 |

TABLE 1A-continued

Preliminary list of genes for development of classifiers for TLDA platform.

| Original Affy ID | Alternate Affy ID | GROUP | Bacterial | Viral | Non-infectious | GENE | TLDA assay identifier |
|---|---|---|---|---|---|---|---|
| 202869_at | NA | PanViralArray | — | — | — | OAS2 | Hs00973637_m1 |
| 218400_at | NA | PanViralArray | — | — | — | OAS3 | Hs00934282_g1 |
| 205660_at | NA | PanViralArray | — | — | — | OASL | Hs00984390_m1 |
| 213797_at | NA | PanViralArray | — | — | — | RSAD2 | Hs00369813_m1 |
| 219684_at | NA | PanViralArray | — | — | — | RTP4 | Hs00223342_m1 |
| 210657_s_at | NA | PanViralArray | — | — | — | SEPT4 | Hs00910209_g1 |
| 200986_at | NA | PanViralArray | — | — | — | SERPING1 | Hs00934330_m1 |
| 222154_s_at | NA | PanViralArray | — | — | — | SPATS2L | Hs01016364_m1 |
| 206026_s_at | NA | PanViralArray | — | — | — | TNFAIP6 | Hs01113602_m1 |
| 219211_at | NA | PanViralArray | — | — | — | USP18 | Hs00276441_m1 |
| 206133_at | NA | PanViralArray | — | — | — | XAF1 | Hs01550142_m1 |
| NA | NA | Reference | — | — | — | FPGS | Hs00191956_m1 |
| NA | NA | Reference | — | — | — | PPIB | Hs00168719_m1 |
| NA | NA | Reference | — | — | — | TRAP1 | Hs00972326_m1 |
| NA | NA | Reference | — | — | — | DECR1 | Hs00154728_m1 |
| NA | NA | Reference | — | — | — | GAPDH | Hs99999905_m1 |
| NA | NA | Reference | — | — | — | 18S | Hs99999901_s1 |
| NA | 203799_at | Replacement | — | — | — | CD302 | Hs00208436_m1 |
| NA | 31845_at | Replacement | — | — | — | ELF4 | Hs01086126_m1 |
| NA | 204600_at | Replacement | — | — | — | EPHB3 | Hs01082563_g1 |
| NA | 206903_at | Replacement | — | — | — | EXOG | Hs01035290_m1 |
| NA | 218695_at | Replacement | — | — | — | EXOSC4 | Hs00363401_g1 |
| NA | 212232_at | Replacement | — | — | — | FNBP4 | Hs01553131_m1 |
| NA | 209876_at | Replacement | — | — | — | GIT2 | Hs00331902_s1 |
| NA | 204683_at | Replacement | — | — | — | ICAM2 | Hs01015796_m1 |
| NA | 201642_at | Replacement | — | — | — | IFNGR2 | Hs00985251_m1 |
| NA | 203799_at | Replacement | — | — | — | LY75-CD302 | Hs00208436_m1 |
| NA | 209280_at | Replacement | — | — | — | MRC2 | Hs00195862_m1 |
| NA | 212603_at | Replacement | — | — | — | MRPS31 | Hs00960912_m1 |
| NA | 221660_at | Replacement | — | — | — | MYL10 | Hs00540809_m1 |
| NA | 203290_at | Replacement | — | — | — | PEX6 | Hs00165457_m1 |
| NA | 201417_at | Replacement | — | — | — | SOX4 | Hs00268388_s1 |
| NA | 44702_at | Replacement | — | — | — | SYDE1 | Hs00973080_m1 |
| NA | 222261_at | Replacement | — | — | — | TLDC1 | Hs00297285_m1 |
| NA | 202452_at | Replacement | — | — | — | ZER1 | Hs01115240_m1 |

Example 4: Bacterial/Viral/SIRS Classification Using Gene Expression Measured by RT-qPCR Implemented on the TLDA Platform The genes of the three signatures that compose the Host Response-ARI (HR-ARI) test were transitioned to a Custom TaqMan® Low Density Array Cards from ThermoFisher Scientific (Waltham, MA). Expression of these gene signatures were measured using custom multianalyte quantitative real time PCR (RT-qPCR) assays on the 384-well TaqMan Low Density Array (TLDA; Thermo-Fisher) platform. TLDA cards were designed and manufactured with one or more TaqMan primer/probe sets per well, each representing a specific RNA transcript in the ARI signatures, along with multiple endogenous control RNA targets (TRAP1, PPIB, GAPDH, FPGS, DECR1 and 18S) that are used to normalize for RNA loading and to control for plate-to-plate variability. In practice, two reference genes (out of five available), which have the smallest coefficient of variation across samples for the normalization procedure, were selected and primer/probe sets with more than 33% missing values (below limits of quantification) were discarded. The remaining missing values (if any), are set to 1+max(Cq), where Cq is the quantification cycle for RT-qPCR. Normalized expression values were then calculated as the average of the selected references minus the observed Cq values for any given primer/probe set. See Hellemans et al. (2007) *Genome Biol* 2007; 8(2):R19.

A total of 174 unique primer/probe sets were assayed per sample. Of these primer/probes, 144 primer/probe sets measure gene targets representative of the 132 previously described Affymetrix (microarray) probes of the three ARI gene signatures (i.e., the genes in the bacterial gene expression signature, the viral gene expression signature and the non-infectious gene expression signature); 6 probe sets are for reference genes, and we additionally assayed 24 probe sets from a previously-discovered pan-viral gene signature. See U.S. Pat. No. 8,821,876; Zaas et al. *Cell Host Microbe* (2009) 6(3):207-217. In addition, a number of primer/probe sets for "replacement" genes were added for training, the expression of these genes being correlated with the expression of some genes from the Affymetrix signature. Some genes are replaced because the RT-qPCR assays for these genes, when performed using TLDA probes, did not perform well.

For each sample, total RNA was purified from PAXgene Blood RNA tubes (PreAnalytix) and reverse transcribed into cDNA using the Superscript VILO cDNA synthesis kit (Thermo-Fisher) according to the manufacturer's recommended protocol. A standard amount of cDNA for each sample was loaded per master well, and distributed into each TaqMan assay well via centrifugation through microfluidic channels. The TaqMan hydrolysis probes rely on 5' to 3' exonuclease activity to cleave the dual-labeled probe during hybridization to complementary target sequence with each amplification round, resulting in fluorescent signal production. Quantitative detection of the fluorescence indicates accumulated PCR products in "real-time." During exponential amplification and detection, the number of PCR cycles at which the fluorescent signal exceeds a detection threshold is the threshold cycle (C) or quantification cycle ($C_q$)—as determined by commercial software for the RT-qPCR instrument.

Sample/Cohort Selection:

Under an IRB-approved protocol, we enrolled patients presenting to the emergency department with acute respiratory illness (See Table 11, below). The patients in this cohort are a subset of those reported in Table 1 of Tsalik et al. (2016) *Sci Transl Med* 9(322):1-9, which is incorporated by reference herein. Retrospective clinical adjudication of the clinical and other test data for these patients leads to one of three assignments: bacterial ARI, viral ARI, or non-infectious illness.

Similar to the array-based classifier, we build three binary classifiers: (1) bacterial ARI vs. viral ARI and non-infectious illness; (2) viral ARI vs. bacterial ARI and non-infectious illness; and (3) non-infectious illness vs. bacterial and viral ARI. After having fitted the three classifiers, we have estimates for p(bacterial ARI), p(viral ARI) and p(non-infectious illness). The thresholds for each of the classifiers are selected from Receiving Operating Characteristic (ROC) curves using a symmetric cost function (expected sensitivity and specificity are approximately equal) (Fawcett (2006) *Pattern Recogn Lett* 27:861-874). As a result, a subject is predicted as bacterial ARI if p(bacterial ARI)>$t_b$, where $t_b$ is the threshold for the bacterial ARI classifier. We similarly

TABLE 11

Demographic information for the enrolled cohort

| Cohort | Number of subject[a] | Gender (M/F) | Mean age, years (Range)[b] | Ethnicity (B/W/O) | Admitted | # Samples (Viral/ Bacterial/Non- Infectious Illness) |
|---|---|---|---|---|---|---|
| Enrolled Derivation Cohort | 317 | 122/151 | 45 (6-88) | 135/116/22 | 61% | 115/70/88 |
| Viral | 115 | 44/71 | 45 (6-88) | 40/59/16 | 21% | |
| Bacterial | 70 | 35/35 | 49 (14-88) | 46/22/2 | 94% | |
| Non-infectious Illness[c] | 88 | 43/45 | 49 (14-88) | 49/35/4 | 88% | |
| Healthy | 44 | 23/21 | 30 (20-59) | 8/27/6[d] | 0% | |

[a]Only subjects with viral, bacterial, or non-infectious illness were included (when available) from each validation cohort.
[b]When mean age was unavailable or could not be calculated, data is presented as either Adult or Pediatric.
[c]Non-infectious illness was defined by the presence of SIRS criteria, which includes at least two of the following four features; Temperature <36° or >38° C.; Heart rate >90 beats per minute; Respiratory rate >20 breaths per minute or arterial partial pressure of $CO_2$ <32 mmHg; and white blood cell count <4000 or >12,000 cells/$mm^3$ or >10% band form neutrophils.
[d]Three subjects did not report ethnicity.
M, Male.
F, Female.
B, Black.
W, White.
O, Other/Unknown.
GSE numbers refer to NCBI Gene Expression Omnibus datasets.
N/A, Not available based on published data.

Data Analysis Methods:

During the data preprocessing stage, we select a subset of at least two reference gene targets (out of five available) with the smallest coefficient of variation across samples and plates. We discard targets with more than 33% missing values (17 targets below the limit of quantification), only if these values are not over represented in any particular class, e.g., bacterial ARI. Next we impute the remaining missing values to 1+max($C_q$), then normalize the expression values for all targets using the reference combination previously selected. In particular, we compute normalized expression values as the mean of the selected references (DECR1 and PPIB) minus the $C_q$ values of any given target.

Once the data has been normalized, we proceed to build the classification model by fitting a sparse logistic regression model to the data (Friedman et al. (2010) *J. Stat. Softw.* 33, 1-22). This model estimates the probability that a subject belongs to a particular class as a weighted sum of normalized gene targets. Specifically, we write, p(subject is of class)=$\sigma(w_1 x_1 + \ldots + w_p x_p)$, where a is the logistic function, $w_1, \ldots, w_p$ are classification weights estimated during the fitting procedure, $x_1, \ldots, x_p$ represent the p gene targets containing normalized expression values.

select thresholds for the viral ARI and non-infectious illness classifiers, $t_v$ and $t_n$, respectively. If desired, a combined prediction can be made by selecting the most likely condition, i.e., the one with largest probability, specifically we write, argmax{p(bacterial ARI), p(viral ARI), p(non-infectious illness)}.

Results:

During the initial transition of the microarray-discovered genomic classifiers onto the TLDA platform, we assayed 32 samples that also had been assayed by microarray. This group served to confirm that TLDA-based RT-qPCR measurement of the gene transcripts that compose the ARI classifier recapitulates the results obtained for microarray-based measurement of gene transcripts, and is therefore a valid methodology for classifying patients as having bacterial or viral ARI, or having non-infectious illness. We found that from the 32 samples tested both on TLDA and microarray platforms, when assessed using their corresponding classifiers, there is agreement of 84.4%, which means that 27 of 32 subjects had the same combined prediction in both microarray and TLDA-based classification models.

After demonstrating concordance between microarray and TLDA-based classification, we tested an additional 63 samples, using the TLDA-based classification, from patients with clinical adjudication of ARI status but without previously-characterized gene expression patterns. In total, therefore, 95 samples were assessed using the TLDA-based classification test. This dataset from 95 samples allowed us to evaluate how the TLDA-based RT-qPCR platform classifies new patients, using only the clinical adjudication as the reference standard. In this experiment, we observed an overall accuracy of 81.1%, which corresponds to 77/95 correctly classified samples. More specifically, the model yielded bacterial ARI, viral ARI, and non-infectious illness accuracies of 80% (24 correct of 30), 77.4% (24 correct of 31) and 85.3% (29 correct of 34), respectively. In terms of the performance of the individual classifiers, we observed area under the ROC curves of 0.92, 0.86 and 0.91, for the bacterial ARI, viral ARI and non-infectious illness classifier, respectively. Provided that we do not count with a validation dataset for any of the classifiers, yet we want unbiased estimates of classification performance (accuracies and areas under the ROC curve), we are reporting leave-one-out cross-validated performance metrics.

The weights and thresholds for each of the classifiers (bacterial ARI, viral ARI and non-infectious illness) are shown in the Table 12, shown below. Note that this Table lists 151 gene targets instead of 174 gene targets because the reference genes were removed in the preprocessing stage, as described above, as were 17 targets for which there were missing values. These 17 targets were also removed during the preprocessing stage.

If the panviral signature genes are removed, we see a slight decreased performance, no larger than 5% across AUC, accuracies and percent of agreement values.

SUMMARY

The composite host-response ARI classifier is composed of gene expression signatures that are diagnostic of bacterial ARI versus viral ARI, versus non-infectious illness and a mathematical classification framework. The mathematical classifiers provide three discrete probabilities: that a subject has a bacterial ARI, viral ARI, or non-infectious illness. In each case, a cutoff or threshold may be specified above which threshold one would determine that a patient has the condition. In addition, one may modify the threshold to alter the sensitive and specificity of the test.

The measurement of these gene expression levels can occur on a variety of technical platforms. Here, we describe the measurement of these signatures using a TLDA-based RT-qPCR platform. Moreover, the mathematical framework that determines ARI etiology probabilities is adapted to the platform by platform-specific training to accommodate transcript measurement methods (i.e., establishing platform-specific weights, $w_1, \ldots, w_p$). Similar, straightforward, methodology could be conducted to translate the gene signatures to other gene expression detection platforms, and then train the associated classifiers. This Example also demonstrates good concordance between TLDA-based and microarray-based classification of etiology of ARI. Finally, we show the use of the TLDA-based RT-qPCR platform and associated mathematical classifier to diagnose new patients with acute respiratory illness.

TABLE 12

Genes, TLDA probe/primers, and classifier weights for the bacterial, viral and non-infectious illness classifiers.

| TLDA Assay ID | Bacterial | Viral | Non-infectious | Group | Gene Symbol | RefSeq ID | Gene Name |
|---|---|---|---|---|---|---|---|
| Hs00153304_m1 | 0.44206 | −0.19499 | 0 | | CD44 | NM_000610.3; NM_001202555.1; NM_001001392.1; NM_001202556.1; NM_001001391.1; NM_001001390.1; NM_001001389.1 | hCG181182 Celera Annotation; CD44 molecule (Indian blood group) |
| Hs00155778_m1 | 0 | 0 | 0 | | APLP2 | NM_001142278.1; NM_001142277.1; NM_001142276.1; NR_024515.1; NR_024516.1; NM_001642.2; NM_001243299.1 | hCG203871 Celera Annotation; amyloid beta (A4) precursor-like protein 2 |
| Hs00156390_m1 | 0.07707 | −0.15022 | 0 | | CD63 | NM_001780.5; NM_001267698.1; NM_001257389.1; NM_001257390.1; NM_001257391.1 | CD63 molecule; hCG20743 Celera Annotation |
| Hs00158514_m1 | 0 | 0 | 0 | | KPNB1 | NM_002265.5 | hCG1773668 Celera Annotation; karyopherin (importin) beta 1 |
| Hs00162109_m1 | 0 | 0.012558 | 0 | | SP100 | NM_003113.3; NM_001080391.1; NM_001206702.1; NM_001206703.1; NM_001206701.1; NM_001206704.1 | SP100 nuclear antigen; hCG34336 Celera Annotation |
| Hs00165457_m1 | 0.14396 | −0.00784 | 0 | | PEX6 | NM_000287.3 | peroxisomal biogenesis factor 6; hCG17647 Celera Annotation |
| Hs00169473_m1 | 0 | −0.04883 | 0.135154 | | PRF1 | NM_005041.4; NM_001083116.1 | hCG22817 Celera Annotation; perforin 1 (pore forming protein) |
| Hs00169941_m1 | 0 | −0.33225 | 0 | | ICAM4 | NM_001544.4; NM_022377.3 | intercellular adhesion molecule 4 (Landsteiner-Wiener blood group); hCG28480 Celera Annotation |
| Hs00171580_m1 | 0 | −0.04133 | 0 | | ENC1 | NM_001256575.1; NM_001256576.1; NM_003633.3; NM_001256574.1 | hCG37104 Celera Annotation; ectodermal-neural cortex 1 (with BTB domain) |
| Hs00187510_m1 | 0.38204 | −0.19399 | −0.242396 | | RAB7L1 | NM_001135662.1; NM_003929.2 | hCG19156 Celera Annotation; RAB7; member RAS oncogene family-like 1 |
| Hs00190154_m1 | 0.0726 | 0 | −0.128456 | | PSPH | NM_004577.3 | phosphoserine phosphatase; hCG1811513 Celera Annotation |
| Hs00191827_m1 | 0 | 0 | 0 | | CAPZB | NM_001282162.1; NM_044930.4 | capping protein (actin filament) muscle Z-line; beta; hCG41078 Celera Annotation |
| Hs00192999_m1 | 0.08266 | 0 | −0.127277 | | GNG7 | NM_052847.2 | guanine nucleotide binding protein (G protein); gamma 7; hCG20107 Celera Annotation |
| Hs00196051_m1 | 0.05 | −0.4723 | 0 | | IRF9 | NM_006084.4 | interferon regulatory factor 9; hCG40171 Celera Annotation |
| Hs00196800_m1 | 0 | 0 | 0 | | TNFAIP2 | NM_006291.2 | tumor necrosis factor; alpha-induced protein 2; hCG22889 Celera Annotation |
| Hs00197280_m1 | −0.14204 | 0.089619 | 0.147283 | | CIB2 | NM_006383.3; NM_001271888.1 | calcium and integrin binding family member 2; hCG38933 Celera Annotation |
| Hs00199268_m1 | 0 | −0.10536 | 0.38895 | | GLIPR1 | NM_006851.2 | hCG26513 Celera Annotation; GLI pathogenesis-related 1 |
| Hs00199894_m1 | 0 | −0.10571 | 0.02064 | | CD160 | NR_103845.1; NM_007053.3 | hCG1762288 Celera Annotation; CD160 molecule |
| Hs00204096_m1 | 0 | 0 | 0 | | MRPS18B | NM_014046.3 | hCG2039591 Celera Annotation; mitochondrial ribosomal protein S18B |
| Hs00204783_m1 | −0.12369 | 0.330219 | 0 | | RTCB | NM_014306.4 | RNA 2′; 3′-cyclic phosphate and 5′-OH ligase; hCG41412 Celera Annotation |
| Hs00204888_m1 | 0 | 0 | 0 | | DAPK2 | NM_014326.3 | death-associated protein kinase 2; hCG32392 Celera Annotation |
| Hs00210319_m1 | 0 | 0.061489 | 0 | | TES | NM_015641.3; NM_152829.2 | testis derived transcript (3 LIM domains); hCG39086 Celera Annotation |
| Hs00218461_m1 | 0.18667 | 0 | −0.125865 | | TMEM165 | NR_073070.1; NM_018475.4 | hCG20603 Celera Annotation; transmembrane protein 165 |
| Hs00219487_m1 | 0.32643 | 0 | −0.350154 | | TRMT13 | NM_019083.2 | hCG31836 Celera Annotation; tRNA methyltransferase 13 homolog (S. cerevisiae) |
| Hs00222418_m1 | −0.08795 | 0.254466 | 0 | | PPCDC | NM_021823.3 | phosphopantothenoylcysteine decarboxylase; hCG21917 Celera Annotation |

TABLE 12-continued

Genes, TLDA probe/primers, and classifier weights for the bacterial, viral and non-infectious illness classifiers.

| TLDA Assay ID | Bacterial | Viral | Non-infectious | Group | Gene Symbol | RefSeq ID | Gene Name |
|---|---|---|---|---|---|---|---|
| Hs00222679_m1 | 0 | 0.072372 | 0 | | POLR2F; LOC100131530 | NM_021974.3 | polymerase (RNA) II (DNA directed) polypeptide F; hCG41858 Celera Annotation; uncharacterized LOC100131530 |
| Hs00223060_m1 | 0 | -0.12877 | 0.034889 | | ZNF335 | NM_022095.3 | zinc finger protein 335; hCG40026 Celera Annotation |
| Hs00225073_m1 | 0 | 0.661155 | -0.183337 | | ZSCAN18 | NM_001145544.1; NM_001145543.1; NM_023926.4; NM_001145542.1 | hCG201365 Celera Annotation; zinc finger and SCAN domain containing 18 |
| Hs00226776_m1 | 0 | 0.198622 | -0.254653 | | GIMAP6 | NM_001244072.1; NM_001244071.1; NM_024711.5 | hCG1655100 Celera Annotation; GTPase; IMAP family member 6 |
| Hs00231079_m1 | 0.0787 | 0 | -0.089259 | | RUNX1 | NM_001001890.2; NM_001754.4 | runt-related transcription factor 1; hCG2007747 Celera Annotation |
| Hs00231368_m1 | 0.30434 | 0 | -0.130472 | | SPI1 | NM_001080547.1; NM_003120.2 | spleen focus forming virus (SFFV) proviral integration oncogene; hCG25181 Celera Annotation |
| Hs00232390_m1 | 0.22771 | -0.39445 | 0 | | BATF | NM_006399.3 | hCG22346 Celera Annotation; basic leucine zipper transcription factor, ATF-like |
| Hs00234356_m1 | 0 | 0 | -0.005804 | | TNFSF10 | NR_033994.1; NM_003810.3 | tumor necrosis factor (ligand) superfamily; member 10; hCG20249 Celera Annotation |
| Hs00246543_s1 | 0 | 0.096747 | 0 | | HNRNPA0 | NM_006805.3 | hCG1639951 Celera Annotation; heterogeneous nuclear ribonucleoprotein A0 |
| Hs00258236_m1 | 0 | 0.067758 | -0.014686 | | TUBB1 | NM_030773.3 | tubulin; beta 1 class VI; hCG28550 Celera Annotation |
| Hs00259863_m1 | -0.03861 | 0.156335 | 0 | | ORAI2 | NM_001126340.2; NM_001271818.1; NM_032831.3 | hCG1736771 Celera Annotation; ORAI calcium release-activated calcium modulator 2 |
| Hs00266198_m1 | -0.03709 | 0.174789 | 0 | | CEACAM8 | NM_001816.3 | carcinoembryonic antigen-related cell adhesion molecule 8; hCG21882 Celera Annotation |
| Hs00269334_m1 | 0 | 0.11804 | -0.054795 | | CAMK1 | NM_003656.4 | calcium/calmodulin-dependent protein kinase I; hCG21548 Celera Annotation |
| Hs00290567_s1 | 0.10454 | -0.57285 | 0 | | MSL1 | NM_001012241.1 | hCG31740 Celera Annotation; male-specific lethal 1 homolog (Drosophila) |
| Hs00296064_s1 | -0.11096 | 0.162636 | 0 | | CADM1 | NM_014333.3; NM_001098517.1 | cell adhesion molecule 1 |
| Hs00327390_s1 | -0.27728 | 0.219012 | 0.023246 | | ERC1 | NM_178040.2; NR_027949.1; NR_027946.1; NR_027948.1; NM_178039.2 | ELKS/RAB6-interacting/CAST family member 1 |
| Hs00331872_s1 | 0 | -0.04877 | 0 | | ANKRD11 | NM_013275.5; NM_001256182.1; NM_001256183.1 | hCG1980824 Celera Annotation; ankyrin repeat domain 11 |
| Hs00355782_m1 | 0 | 0 | 0 | | CDKN1A | NM_001220778.1; NM_001220777.1; NM_000389.4; NM_000991.4; NM_001136137.1; NM_001136134.1; NM_001136135.1; NM_001136136.1 | cyclin-dependent kinase inhibitor 1A (p21; Cip1); hCG15367 Celera Annotation |
| Hs00357189_g1 | 0 | 0 | 0 | | RPL28 | NM_018407.4 | ribosomal protein L28; hCG38234 Celera Annotation |
| Hs00363282_m1 | 0 | -0.39826 | 0.298323 | | LAPTM4B | NM_001127461.2; NM_001079821.2; NM_001243133.1; NM_004895.4; NM_001127462.2; NM_183395.2 | lysosomal protein transmembrane 4 beta; hCG2008559 Celera Annotation |
| Hs00366465_m1 | 0 | 0 | 0 | | NLRP3 | NM_001270698.1; NM_001270697.1; NM_018287.6; NM_001270699.1; NM_001270696.1; NM_001270695.1 | NLR family; pyrin domain containing 3; hCG1982559 Celera Annotation |
| Hs00367895_m1 | 0 | 0 | 0 | | ARHGAP12 | NM_021982.2; NM_001252231.1 | Rho GTPase activating protein 12; hCG2017264 Celera Annotation |
| Hs00378456_m1 | 0 | 0 | 0 | | SEC24A | NR_049774.1; NM_020775.4; NM_001267049.1; NM_001267048.1 | SEC24 family; member A (S. cerevisiae); hCG1981418 Celera Annotation |
| Hs00381767_m1 | -0.08167 | -0.02155 | 0.251085 | | KIAA1324 | | hCG1997600 Celera Annotation; KIAA1324 |

TABLE 12-continued

Genes, TLDA probe/primers, and classifier weights for the bacterial, viral and non-infectious illness classifiers.

| TLDA Assay ID | Bacterial | Viral | Non-infectious | Group | Gene Symbol | RefSeq ID | Gene Name |
|---|---|---|---|---|---|---|---|
| Hs00390076_m1 | −0.4019 | 0 | 0.306895 | | ATG2A | NM_015104.2 | hCG2039982 Celera Annotation; autophagy related 2A |
| Hs00414018_m1 | 0 | 0 | 0 | | DEFA3; DEFA1; DEFA1B | NM_004084.3; NM_005217.3; NM_001042500.1 | defensin; alpha 3; neutrophil-specific; defensin; alpha 1; defensin; alpha 1B |
| Hs00537765_m1 | 0.12016 | 0 | −0.311567 | | CPNE1 | NM_001198863.1; NM_152926.2; NR_037188.1; NM_152927.2; NM_152925.2; NM_152928.2; NM_003915.5 | copine I; hCG38213 Celera Annotation |
| Hs00541789_s1 | 0 | 0 | 0 | | TMPRSS6 | NM_153609.2 | hCG2011224 Celera Annotation; transmembrane protease; serine 6 |
| Hs00545603_m1 | −0.15652 | 0 | 0.157219 | | CBX7 | NM_175709.3 | chromobox homolog 7; hCG41710 Celera Annotation |
| Hs00600568_gH | 0 | 0.024977 | 0 | | GCAT | NM_014291.3; NM_001171690.1 | hCG41842 Celera Annotation; glycine C-acetyltransferase |
| Hs00609948_m1 | −0.1261 | 0 | 0.132035 | | ITPR3 | NM_002224.3 | hCG40301 Celera Annotation; inositol 1; 4; 5-trisphosphate receptor; type 3 |
| Hs00705137_s1 | 0 | 0.190805 | −0.207955 | | IFITM1 | NM_003641.3 | interferon induced transmembrane protein 1; hCG1741134 Celera Annotation |
| Hs00705989_m1 | 0 | 0.264586 | −0.237834 | | SERTAD3 | NM_203344.2; NM_013368.3 | SERTA domain containing 3; hCG2014133 Celera Annotation |
| Hs00706565_m1 | 0 | 0.247956 | −0.127891 | | RPP25 | NM_017793.2 | ribonuclease P/MRP 25 kDa subunit; hCG1643228 Celera Annotation |
| Hs00711162_s1 | −0.01602 | 0.105815 | 0 | | CYP2A13; CYP2A7; CYP2A6 | NM_000764.2; NM_030589.2; NM_000766.4; NM_000762.5 | cytochrome P450; family 2; subfamily A; polypeptide 13; cytochrome P450; family 2; subfamily A; polypeptide 7; cytochrome P450; family 2; subfamily A; polypeptide 6; hCG2039740 Celera Annotation |
| Hs00734212_m1 | 0.03633 | −0.10881 | 0 | | HLA-DRB3; HLA-DRB1 | NM_022555.3 | hCG2001518 Celera Annotation; major histocompatibility complex; class II; DR beta 3; major histocompatibility complex; class II; DR beta 1 |
| Hs00738661_m1 | −0.2813 | 0 | 0.255274 | | FAM134C | NR_026697.1; NM_178126.3 | family with sequence similarity 134; member C; hCG2043027 Celera Annotation |
| Hs00793604_m1 | 0 | 0 | −0.392469 | | YWHAB | NM_003404.4; NM_139323.3 | hCG38378 Celera Annotation; tyrosine 3-monooxygenase/tryptophan 5-monooxygenase activation protein; beta polypeptide |
| Hs00820148_g1 | 0 | 0 | 0.082524 | | TGIF1 | NM_173207.2; NM_003244.3; NM_001278682.1; NM_170695.3; NM_001278686.1; NM_001278684.1; NM_173210.2; NM_173209.2; NM_173208.2; NM_174886.2; NM_173211.1 | TGFB-induced factor homeobox 1; hCG1994498 Celera Annotation |
| Hs00852566_g1 | 0 | 0 | 0.090784 | | BTF3 | NM_001207.4; NM_001037637.1 | hCG37844 Celera Annotation; basic transcription factor 3 |
| Hs00855185_g1 | 0.22884 | −0.16129 | 0 | | ARPC3 | NM_001285556.1; NM_005719.2 | hCG1787850 Celera Annotation; hCG1730237 Celera Annotation; actin related protein 2/3 complex; subunit 3; 21 kDa |
| Hs00893626_m1 | 0 | 0 | −0.131321 | | IL1RN | NM_000577.4; NM_173841.2; NM_173842.2; NM_173843.2 | hCG1733963 Celera Annotation; interleukin 1 receptor antagonist |
| Hs00905708_m1 | 0 | 0 | 0 | | SLC9A8 | NM_001260491.1; NR_048537.1; NR_048538.1; NR_048539.1; NR_048540.1; NM_015266.2 | solute carrier family 9; subfamily A (NHE8; cation proton antiporter 8); member 8; hCG37890 Celera Annotation |
| Hs00928897_s1 | 0 | 0 | 0 | | CCR1 | NM_001295.2 | hCG15324 Celera Annotation; chemokine (C-C motif) receptor 1 |
| Hs00950814_g1 | 0 | 0 | 0.035502 | | NCR1 | NM_001145457.2; NM_001242356.2; NM_004829.6 | hCG19670 Celera Annotation; natural cytotoxicity triggering receptor 1 |
| Hs00951428_m1 | 0 | 0.113402 | 0 | | DSC2 | NM_024422.3; NM_004949.3 | hCG24896 Celera Annotation; desmocollin 2 |
| Hs00961932_s1 | 0 | 0 | 0 | | H1F0 | NM_005318.3 | hCG1641126 Celera Annotation; H1 histone family; member 0 |

TABLE 12-continued

Genes, TLDA probe/primers, and classifier weights for the bacterial, viral and non-infectious illness classifiers.

| TLDA Assay ID | Bacterial | Viral | Non-infectious | Group | Gene Symbol | RefSeq ID | Gene Name |
|---|---|---|---|---|---|---|---|
| Hs00963477_g1 | 0 | −0.00884 | 0 | | RPS21 | NM_001024.3 | hCG41768 Celera Annotation; ribosomal protein S21 |
| Hs00971739_g1 | 0 | 0.128754 | 0 | | SAT1 | NR_027783.1; NM_002970.2 | hCG17885 Celera Annotation; spermidine/spermine N1-acetyltransferase 1 |
| Hs00972289_g1 | −0.36317 | 0.301793 | 0.148178 | | CTBP1 | NM_001012614.1; NM_001328.2 | hCG1981976 Celera Annotation; C-terminal binding protein 1 |
| Hs00978711_m1 | 0 | −0.19534 | 0.079881 | | SH3BP1 | NM_018957.3 | hCG41861 Celera Annotation; SH3-domain binding protein 1 |
| Hs00980756_m1 | 0 | −0.27613 | 0.042497 | | GGT1 | NM_001032364.2; NM_001032365.2; NM_005265.2; NM_013430.2 | gamma-glutamyltransferase 1; hCG2010666 Celera Annotation |
| Hs00982607_m1 | 0 | 0 | 0 | | NINJ1 | NM_004148.3 | ninjurin 1; hCG18015 Celera Annotation |
| Hs00984390_m1 | 0 | 0.074028 | −0.022201 | | OASL | NM_198213.2; NM_003733.3 | hCG27362 Celera Annotation; 2′-5′-oligoadenylate synthetase-like |
| Hs00985319_m1 | −0.01147 | 0.079048 | 0 | | HEATR1 | NM_018072.5 | HEAT repeat containing 1; hCG25461 Celera Annotation |
| Hs00988063_m1 | −0.08452 | 0.168519 | 0 | | SIGLEC1 | NM_023068.3 | hCG39260 Celera Annotation; sialic acid binding Ig-like lectin 1; sialoadhesin |
| Hs01001427_m1 | 0.04332 | −0.60556 | 0 | | CDK5RAP2 | NR_073558.1; NR_073554.1; NR_073555.1; NR_073556.1; NM_001272039.1; NR_073557.1; NM_001011649.2; NM_018249.5 | hCG27455 Celera Annotation; CDK5 regulatory subunit associated protein 2 |
| Hs01002913_g1 | 0 | 0 | 0 | | CD40 | NM_152854.2; NM_001250.4 | hCG40016 Celera Annotation; CD40 molecule; TNF receptor superfamily member 5 |
| Hs01005222_m1 | 0 | 0.326033 | 0 | | SRBD1 | NM_018079.4 | S1 RNA binding domain 1; hCG1987258 Celera Annotation |
| Hs01017992_m1 | 0 | 0 | 0.179899 | | CYP27A1 | NM_000784.3 | hCG15569 Celera Annotation; cytochrome P450; family 27; subfamily A; polypeptide 1 |
| Hs01021250_m1 | 0.01799 | 0.196899 | −0.140181 | | MTMR1 | NM_003828.2 | hCG1640369 Celera Annotation; myotubularin related protein 1 |
| Hs01029870_m1 | 0 | −0.58215 | 0.22929 | | ARL1 | NM_001177.4 | hCG178029 Celera Annotation; ADP-ribosylation factor-like 1 |
| Hs01032528_m1 | 0 | −0.36595 | 0.410577 | | HERC1 | NM_003922.3 | hCG1818283 Celera Annotation; HECT and RLD domain containing E3 ubiquitin protein ligase family member 1 |
| Hs01038134_m1 | −0.13717 | 0.004773 | 0.049685 | | STAP1 | NM_012108.2 | signal transducing adaptor family member 1; hCG640344 Celera Annotation |
| Hs01040170_m1 | 0.04344 | −0.17845 | −0.052769 | | FAM13A | NM_014883.3; NM_001265578.1; NM_001015045.2; NM_001265580.1; NM_001265579.1 | hCG39059 Celera Annotation; family with sequence similarity 13; member A |
| Hs01055743_m1 | −0.30697 | 0 | 0.257693 | | CLC | NM_001828.5 | hCG43348 Celera Annotation; Charcot-Leyden crystal galectin |
| Hs01057000_m1 | 0 | −0.68353 | 0.082116 | | KIDINS220 | NM_020738.2 | hCG23067 Celera Annotation; kinase D-interacting substrate; 220 kDa |
| Hs01057217_m1 | −0.45125 | 0.327746 | 0.070281 | | PDE3B | NM_000922.3 | phosphodiesterase 3B; cGMP-inhibited; hCG23682 Celera Annotation |
| Hs01072230_g1 | 0 | −0.00364 | 0.169878 | | CHI3L1 | NM_001276.2 | chitinase 3-like 1 (cartilage glycoprotein-39); hCG24326 Celera Annotation |
| Hs01082884_m1 | 0.29147 | −0.1223 | 0 | | IRF2 | NM_002199.3 | hCG16244 Celera Annotation; interferon regulatory factor 2 |
| Hs01085704_m1 | 0 | 0 | 0 | | SLC29A1 | NM_001078174.1; NM_004955.2; NM_001078177.1; NM_001078176.2; NM_001078175.2 | hCG19000 Celera Annotation; solute carrier family 29 (equilibrative nucleoside transporter); member 1 |
| Hs01086373_g1 | −0.11199 | 0.274551 | −0.063877 | | IFI27 | NM_005532.3; NM_001130080.1 | interferon; alpha-inducible protein 27; hCG22330 Celera Annotation |
| Hs01086851_m1 | 0.37999 | −0.28298 | 0 | | SMPD1 | NM_001007593.2; NM_000543.4 | sphingomyelin phosphodiesterase 1; acid lysosomal; hCG24080 Celera Annotation |

TABLE 12-continued

Genes, TLDA probe/primers, and classifier weights for the bacterial, viral and non-infectious illness classifiers.

| TLDA Assay ID | Bacterial | Viral | Non-infectious | Group | Gene Symbol | RefSeq ID | Gene Name |
|---|---|---|---|---|---|---|---|
| Hs01090981_m1 | 0 | 0 | 0 | | KRIT1 | NM_194456.1; NM_194454.1; NM_049912.3; NM_001013406.1; NM_194455.1 | hCG1812017 Celera Annotation; KRIT1; ankyrin repeat containing |
| Hs01092173_m1 | 0.09825 | 0 | 0 | | SIRPB1 | NM_001083910.2; NM_006065.3 | signal-regulatory protein beta 1; hCG39419 Celera Annotation |
| Hs01099244_m1 | 0.01588 | −0.22063 | 0.055484 | | CCDC19 | NM_012337.2 | hCG39740 Celera Annotation; coiled-coil domain containing 19 |
| Hs01115711_m1 | 0.2568 | 0 | −0.127859 | | MCTP1 | NM_001002796.2; NM_024717.4 | multiple C2 domains; transmembrane 1; hCG1811111 Celera Annotation |
| Hs01117053_m1 | 0 | 0 | 0 | | EXOC7 | NR_028133.1 | exocyst complex component 7; hCG40887 Celera Annotation |
| Hs01122669_m1 | 0 | −0.03893 | 0.06677 | | TAF4 | NM_003185.3 | hCG41771 Celera Annotation; TAF4 RNA polymerase II; TATA box binding protein (TBP)-associated factor; 135 kDa |
| Hs01128745_m1 | 0 | 0.031228 | 0 | | EMR3 | NM_032571.3 | hCG95683 Celera Annotation; egf-like module containing; mucin-like; hormone receptor-like 3 |
| Hs01549264_m1 | 0.02825 | −0.12496 | 0 | | KIAA0300 | NM_000804.2 | hCG1640300 Celera Annotation; folate receptor 3 (gamma) |
| Hs01568119_m1 | 0 | 0.181259 | −0.076525 | | TNFAIP3 | NM_001270508.1; NM_006290.3; NM_001270507.1 | hCG16787 Celera Annotation; tumor necrosis factor; alpha-induced protein 3 |
| Hs01911452_s1 | 0 | 0 | 0 | | IFIT1 | NM_001548.4; NM_001270928.1; NM_001270927.1; NM_001270930.1; NM_001270929.1 | hCG24571 Celera Annotation; interferon-induced protein with tetratricopeptide repeats 1 |
| Hs02567906_s1 | −0.22881 | 0.019641 | 0 | | RABGAP1L | NM_001243763.1; NM_014857.4; NM_001035230.2 | hCG2024869 Celera Annotation; RAB GTPase activating protein 1-like |
| Hs02569575_s1 | 0 | 0 | −0.12916 | | SCAPER | NM_001145923.1; NM_020843.2 | hCG40799 Celera Annotation; S-phase cyclin A-associated protein in the ER |
| Hs03037970_g1 | 0 | 0 | 0 | | DUX4L7; DUX4L5; DUX4L6; DUX4L2; DUX2; DUX4; LOC100653046; DUX4L; DUX4L4; DUX4L3 | NM_001278056.1; NM_001164467.2; NR_038191.1; NM_001177376.2; NM_012147.4; NM_001127389.2; NM_001127388.2; NM_001127387.2; NM_033178.4; NM_001127386.2 | double homeobox 4 like 7; double homeobox 4 like 5; double homeobox 4 like 2; double homeobox 4 like 6; double homeobox 4; double homeobox protein 4-like; double homeobox 4-like; double homeobox 4 like 4; double homeobox 4 like 3 |
| Hs03045111_g1 | −0.02913 | 0.054676 | 0 | | LY6E | NM_002346.2; NM_001127213.1 | hCG1765592 Celera Annotation; lymphocyte antigen 6 complex; locus E |
| Hs03055204_s1 | 0 | 0 | 0 | | KIAA0754 | NM_015038.1 | KIAA0754 |
| Hs03989560_s1 | −0.28689 | 0.169135 | 0.040358 | | GLUD1 | NM_005271.3 | glutamate dehydrogenase 1 |
| Hs04187383_m1 | 0 | 0 | 0 | | TST | NM_003312.5; NM_001270483.1 | thiosulfate sulfurtransferase (rhodanese); hCG41451 Celera Annotation |
| Hs00969305_m1 | 0 | −0.50526 | 0 | InTxAlternate | TNFAIP2 | NM_006291.2 | tumor necrosis factor; alpha-induced protein 2; hCG22889 Celera Annotation |
| Hs00180880_m1 | 0 | 0 | 0 | PanViral | LAMP3 | NM_014398.3 | lysosomal-associated membrane protein 3; hCG16067 Celera Annotation |
| Hs00182073_m1 | 0 | 0.043305 | 0 | PanViral | MX1 | NM_002462.3; NM_001144925.1; NM_001178046.1 | myxovirus (influenza virus) resistance 1; interferon-inducible protein p78 (mouse); hCG401239 Celera Annotation |
| Hs00213443_m1 | 0 | 0.009468 | −0.051318 | PanViral | OAS2 | NM_016817.2 | 2′-5′-oligoadenylate synthetase 2; 69/71 kDa; hCG38536 Celera Annotation |
| Hs00223342_m1 | 0 | 0 | 0 | PanViral | RTP4 | NM_022147.2 | hCG1653633 Celera Annotation; receptor (chemosensory) transporter protein 4 |

TABLE 12-continued

Genes, TLDA probe/primers, and classifier weights for the bacterial, viral and non-infectious illness classifiers.

| TLDA Assay ID | Bacterial | Viral | Non-infectious | Group | Gene Symbol | RefSeq ID | Gene Name |
|---|---|---|---|---|---|---|---|
| Hs00242571_m1 | 0 | 0 | −0.078103 | PanViral | IFI6 | NM_022873.2; NM_002038.3; NM_022872.2 | interferon; alpha-inducible protein 6; hCG1727099 Celera Annotation |
| Hs00276441_m1 | 0 | 0.033981 | −0.048548 | PanViral | USP18 | NM_017414.3 | ubiquitin specific peptidase 18; hCG21533 Celera Annotation |
| Hs00369813_m1 | −0.02854 | 0 | 0 | PanViral | RSAD2 | NM_080657.4 | hCG23898 Celera Annotation; radical S-adenosyl methionine domain containing 2 |
| Hs00910173_m1 | 0 | 0.065635 | −0.003951 | PanViral | ATF3 | NM_001030287.3; NM_001206484.2; NM_001206488.2; NM_001674.3 | hCG37734 Celera Annotation; activating transcription factor 3 |
| Hs00910209_g1 | −0.00172 | 0.07212 | 0 | PanViral | SEP4 | NM_080416.2; NM_004574.3; NM_001256822.1; NM_080415.2; NM_001256782.1; NR_037155.1; NM_001198713.1 | septin 4; hCG30696 Celera Annotation |
| Hs00915294_g1 | 0 | 0 | 0 | PanViral | IFI44L | NM_006820.2 | hCG24062 Celera Annotation; interferon-induced protein 44-like |
| Hs00934282_g1 | 0 | 0 | 0 | PanViral | OAS3 | NM_006187.2 | 2′-5′-oligoadenylate synthetase 3; 100 kDa; hCG40370 Celera Annotation |
| Hs00934330_m1 | 0 | 0.065027 | 0 | PanViral | SERPING1 | NM_000062.2; NM_001032295.1 | serpin peptidase inhibitor; clade G (C1 inhibitor); member 1; hCG39766 Celera Annotation |
| Hs00951349_m1 | 0 | 0 | 0 | PanViral | IFI44 | NM_006417.4 | interferon-induced protein 44; hCG24065 Celera Annotation |
| Hs00973637_m1 | 0 | 0 | −0.060351 | PanViral | OAS1 | NM_001032409.1; NM_016816.2; NM_002534.2 | 2′-5′-oligoadenylate synthetase 1; 40/46 kDa; hCG40366 Celera Annotation |
| Hs01016364_m1 | 0 | 0 | 0 | PanViral | SPATS2L | NM_001100422.1; NM_015535.2; NM_001100424.1; NM_001100423.1 | spermatogenesis associated; serine-rich 2-like; hCG1811464 Celera Annotation |
| Hs01061436_m1 | 0 | 0.01828 | −0.042268 | PanViral | DDX58 | NM_014314.3 | DEAD (Asp-Glu-Ala-Asp) box polypeptide 58; hCG1811781 Celera Annotation |
| Hs01061821_m1 | 0 | 0 | 0 | PanViral | HERC5 | NM_016323.3 | HECT and RLD domain containing E3 ubiquitin protein ligase 5; hCG1813153 Celera Annotation |
| Hs01113602_m1 | 0.05847 | 0 | −0.206842 | PanViral | TNFAIP6 | NM_007115.3 | hCG41965 Celera Annotation; tumor necrosis factor; alpha-induced protein 6 |
| Hs01550142_m1 | 0 | −0.06086 | 0 | PanViral | XAF1 | NR_046398.1; NM_199139.2; NM_017523.3; NR_046396.1; NR_046397.1 | hCG1777063 Celera Annotation; XIAP associated factor 1 |
| Hs01921425_s1 | 0 | 0.018167 | −0.032153 | PanViral | ISG15 | NM_005101.3 | ISG15 ubiquitin-like modifier; hCG1771418 Celera Annotation |
| Hs01922738_s1 | −0.0409 | 0.185197 | −0.007029 | PanViral | IFIT2 | NM_001547.4 | interferon-induced protein with tetratricopeptide repeats 2; hCG1643352 Celera Annotation |
| Hs01922752_s1 | 0 | 0 | 0 | PanViral | IFIT3 | NM_001549.4; NM_001031683.2 | hCG24570 Celera Annotation; interferon-induced protein with tetratricopeptide repeats 3 |
| Hs03027069_s1 | −0.00733 | 0 | 0 | PanViral | IFIT1 | NM_001548.4; NM_001270928.1; NM_001270927.1; NM_001270930.1; NM_001270929.1 | interferon-induced protein with tetratricopeptide repeats 1; hCG24571 Celera Annotation |
| Hs00191646_m1 | 0 | 0 | 0 | Replacement | POLR1C | NM_203290.2 | polymerase (RNA) I polypeptide C; 30 kDa; hCG18995 Celera Annotation |
| Hs00208436_m1 | 0 | 0.013116 | 0 | Replacement | CD302; LY75-CD302 | NM_014880.4; NM_001198763.1; NM_001198760.1; NM_001198759.1 | CD302 molecule; hCG40834 Celera Annotation; LY75-CD302 readthrough |
| Hs00297285_m1 | 0 | −0.46905 | 0 | Replacement | TLDC1 | NM_020947.3 | TBC/LysM-associated domain containing 1; hCG39793 Celera Annotation |

TABLE 12-continued

Genes, TLDA probe/primers, and classifier weights for the bacterial, viral and non-infectious illness classifiers.

| TLDA Assay ID | Bacterial | Viral | Non-infectious | Group | Gene Symbol | RefSeq ID | Gene Name |
|---|---|---|---|---|---|---|---|
| Hs00331902_s1 | 0 | −0.45598 | 0.236611 | Replacement | GIT2 | NM_057170.3; NM_014776.3; NM_001135213.1; NM_001135214.1; NM_057169.3 | hCG38510 Celera Annotation; G protein-coupled receptor kinase interacting ArfGAP 2 |
| Hs00363401_g1 | 0 | 0 | −0.077823 | Replacement | EXOSC4 | NM_019037.2 | hCG1747868 Celera Annotation; exosome component 4 |
| Hs00960912_m1 | 0 | 0.26766 | 0 | Replacement | MRPS31 | NM_005830.3 | mitochondrial ribosomal protein S31; hCG32763 Celera Annotation |
| Hs00985251_m1 | 0.10711 | −0.17404 | 0 | Replacement | IFNGR2 | NM_005534.3 | interferon gamma receptor 2 (interferon gamma transducer 1); hCG401179 Celera Annotation |
| Hs01015796_m1 | 0 | 0.189857 | 0 | Replacement | ICAM2 | NM_001099786.1; NM_001099787.1; NM_001099788.1; NM_001099789.1; NM_000873.3 | intercellular adhesion molecule 2; hCG41817 Celera Annotation |
| Hs01035290_m1 | −0.05606 | 0.248968 | 0 | Replacement | EXOG | NM_005107.3; NM_001145464.1 | endo/exonuclease (5'-3'); endonuclease G-like; hCG40337 Celera Annotation |
| Hs01086126_m1 | 0 | 0 | 0 | Replacement | ELF4 | NM_001421.3; NM_001127197.1 | E74-like factor 4 (ets domain transcription factor); hCG21000 Celera Annotation |
| Hs01115240_m1 | 0 | −0.79464 | 0.589673 | Replacement | ZER1 | NM_006336.3 | zyg-11 related; cell cycle regulator; hCG1788209 Celera Annotation |
| Hs01553131_m1 | 0 | −0.26139 | 0.697495 | Replacement | FNBP4 | NM_015308.2 | formin binding protein 4; hCG25190 Celera Annotation |

Any patents or publications mentioned in this specification are indicative of the levels of those skilled in the art to which the invention pertains. These patents and publications are herein incorporated by reference to the same extent as if each individual publication was specifically and individually indicated to be incorporated by reference. In case of conflict, the present specification, including definitions, will control.

One skilled in the art will readily appreciate that the present invention is well adapted to carry out the objects and obtain the ends and advantages mentioned, as well as those inherent therein. The present disclosures described herein are presently representative of preferred embodiments, are exemplary, and are not intended as limitations on the scope of the invention. Changes therein and other uses will occur to those skilled in the art which are encompassed within the spirit of the invention as defined by the scope of the claims.

We claim:

1. A method of processing a blood sample of a subject, comprising:
    (a) providing said blood sample of said subject having or suspected of having a viral or bacterial infection, wherein said blood sample comprises a plurality of host messenger ribonucleic acid (mRNA) molecules from said subject;
    (b) subjecting said plurality of host mRNA molecules to reverse transcription to generate a plurality of complementary deoxyribonucleic acid (cDNA) molecules;
    (c) optically detecting said plurality of cDNA molecules or derivative thereof, wherein optically detecting comprises measuring expression levels of said plurality of host mRNA molecules;
    (d) processing said expression levels or a derivative of said expression levels using a classifier to detect a presence of said viral infection or said bacterial infection in said subject,
        wherein said classifier comprises an algorithm trained using data from a first set of subjects known to have said viral infection, a second set of subjects known to have said bacterial infection, and a third set of uninfected subjects displaying symptoms of a non-infectious illness, wherein said data comprises expression levels of host mRNA molecules from samples from said first set of subjects known to have said viral infection, said second set of subjects known to have said bacterial infection, and said third set of uninfected subjects displaying symptoms of said non-infectious illness,
        wherein said symptoms of said non-infectious illness include two or more systemic inflammatory response syndrome (SIRS) criteria selected from the group consisting of (i) temperature <36° or >38° C., (ii) heart rate >90 beats per minute, (iii) respiratory rate >20 breaths per minute or arterial partial pressure of $CO_2$<32 mmHg, and (iv) white blood cell count <4000 or >12,000 cells/mm$^3$ or >10% band form neutrophils,
        wherein said classifier is capable of differentiating (i) said bacterial infection from said viral infection or said non-infectious illness, (ii) said viral infection from said bacterial infection or said non-infectious illness, and (iii) said non-infectious illness from said bacterial infection or said viral infection, and wherein said classifier is generated by a method comprising:
            (A) obtaining said host mRNA molecules from samples from said first set of subjects known to have said viral infection, said second set of subjects known to have said bacterial infection, and said third set of uninfected subjects displaying symptoms of said non-infectious illness:
            (B) subjecting said host mRNA molecules of (A) to reverse transcription to generate cDNA molecules;
            (C) optically detecting said cDNA molecules of (B) or derivative thereof to measure expression levels of said host mRNA molecules of (A);
            (D) based on said expression levels of (C), generating a bacterial classifier by estimating a probability of said bacterial infection versus said viral infection and said non-infectious illness, a viral classifier by estimating a probability of said viral infection versus said bacterial infection and said non-infectious illness, and a non-infectious illness classifier by estimating a probability of said non-infectious illness versus said bacterial infection and said viral infection; and
            (E) combining said bacterial classifier, said viral classifier and said non-infectious illness classifier into a single decision model, thereby generating said classifier; and
    (e) upon detecting said presence of said bacterial infection or said viral infection in (d), administering to said subject a therapeutically effective amount of an antibiotic treatment for said bacterial infection or a therapeutically effective amount of an antiviral treatment for said viral infection.

2. The method of claim 1, further comprising, prior to (b), separating said plurality of host mRNA molecules from said blood sample.

3. The method of claim 1, further comprising, prior to (c), subjecting said plurality of cDNA molecules to nucleic acid amplification.

4. The method of claim 3, wherein said nucleic acid amplification comprises polymerase chain reaction (PCR) or isothermal amplification.

5. The method of claim 4, wherein said PCR comprises subjecting said plurality of cDNA molecules to thermocycling.

6. The method of claim 4, wherein said isothermal amplification comprises subjecting said plurality of cDNA molecules to heating at a constant temperature.

7. The method of claim 1, wherein said plurality of host mRNA molecules comprises at least five different mRNA molecules.

8. The method of claim 1, wherein said optically detecting in (c) comprises detecting an optical signal from a probe coupled to a cDNA molecule of said plurality of cDNA molecules or derivative thereof.

9. The method of claim 8, wherein said optical signal is a fluorescent signal.

10. The method of claim 1, wherein (c) comprises detecting an optical signal from a cDNA molecule of said plurality of cDNA molecules or derivative thereof in a sequencing reaction.

11. The method of claim 1, wherein said classifier is capable of differentiating the bacterial infection and the viral infection without being limited by one or more specific species of viruses or bacteria.

12. The method of claim 1, wherein said bacterial classifier comprises expression levels of BATF, MCTP1, or IFI27.

13. The method of claim 1, wherein said viral classifier comprises expression levels of CTBP1, BATF, or USP18.

14. The method of claim 1, wherein said bacterial classifier is generated with a comparison of accuracy for a clinical state of bacterial infection versus clinical states of viral infection and non-infectious illness.

15. The method of claim 1, wherein said viral classifier is generated with a comparison of accuracy for a clinical state of viral infection versus clinical states of bacterial infection and non-infectious illness.

16. The method of claim 1, wherein said bacterial classifier, said viral classifier, and said non-infectious illness classifier are generated with a comparison of accuracy for each of the clinical states of bacterial infection, viral infection, and non-infectious illness, versus the other two clinical states.

17. The method of claim 1, wherein upon detecting said presence of said bacterial infection, the method comprises administering to said subject said therapeutically effective amount of said antibiotic treatment for said bacterial infection.

18. The method of claim 1, wherein said classifier comprises a weighted sum of said expression levels of said plurality of host mRNA molecules or a subset thereof.

19. The method of claim 18, wherein said plurality of host mRNA molecules comprises at least five different host mRNA molecules, and wherein said weighted sum comprises a pre-defined weighting value for each of said at least five different host mRNA molecules.

20. The method of claim 19, wherein said pre-defined weighting value is a non-zero value.

21. The method of claim 1, wherein said plurality of host mRNA molecules comprises CTBP1.

22. The method of claim 21, wherein said plurality of host mRNA molecules further comprises IFI27.

23. The method of claim 21, wherein said plurality of host mRNA molecules further comprises USP18.

24. The method of claim 21, wherein said plurality of host mRNA molecules further comprises BATF or MCTP1.

25. The method of claim 1, wherein said subject is suffering from acute respiratory illness symptoms.

26. The method of claim 1, further comprising electronically outputting a report that identifies said subject as having or being at risk of having said bacterial infection, said viral infection, a combination of said bacterial infection and said viral infection, or neither said bacterial infection nor said viral infection.

27. The method of claim 1, wherein said bacterial classifier is generated with a comparison of accuracy for a clinical state of bacterial infection versus clinical states of viral infection and non-infectious illness, and wherein said viral classifier is generated with a comparison of accuracy for a clinical state of viral infection versus clinical states of bacterial infection and non-infectious illness.

28. The method of claim 1, wherein upon detecting said presence of said viral infection, the method comprises administering to said subject said therapeutically effective amount of said antiviral treatment for said viral infection.

29. The method of claim 1, wherein said antibiotic treatment is selected from the group consisting of penicillins, cephalosporins, fluroquinolones, tetracyclines, macrolides, aminoglycosides, and any combination thereof.

30. The method of claim 1, wherein said antiviral treatment is selected from the group consisting of oseltamivir, RNAi antivirals, inhaled ribavirin, monoclonal antibody respigam, zanamivir, neuraminidase blocking agents, and any combination thereof.

31. The method of claim 1, wherein said bacterial infection comprises an infection caused by a bacterial species selected from the group consisting of *Bordetella bronchiseptica, Enterobacter aerogenes, Escherichia coli, Haemophilus influenza, Legionella* sp., *Mycoplasma pneumoniae, Pasteurella multocida, Pantoea* sp.; Coagulase negative *Staphylococcus, Pseudomonas aeruginosa; Alcaligenes xylosoxidans, Serratia marcescens, Staphylococcus aureus; Haemophilus influenzae, Proteus mirabilis, Viridans* Group *Streptococcus, Streptococcus pneumoniae; Haemophilus* sp., *Streptococcus pyogenes*, and any combination thereof.

32. The method of claim 1, wherein said viral infection comprises an infection caused by a virus selected from the group consisting of coronavirus, coxsackievirus, echovirus, cytomegalovirus, enterovirus, human metapneumovirus, influenza non-typed, influenza A non-subtyped, influenza A, 2009 H1N1, parainfluenza, rhinovirus, respiratory syncytial virus, and any combination thereof.

* * * * *